United States Patent [19]
Toyouchi et al.

[11] Patent Number: 6,006,251
[45] Date of Patent: *Dec. 21, 1999

[54] SERVICE PROVIDING SYSTEM FOR PROVIDING SERVICES SUITABLE TO AN END USER REQUEST BASED ON CHARACTERISTICS OF A REQUEST, ATTRIBUTES OF A SERVICE AND OPERATING CONDITIONS OF A PROCESSOR

[75] Inventors: Junichi Toyouchi, Sagamihara; Kinji Mori, Machida; Katsumi Kawano, Kawasaki; Yoshinori Honda, Yokohama; Shigeki Hirasawa, Sagamihara, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/776,717

[22] PCT Filed: Jul. 5, 1996

[86] PCT No.: PCT/JP96/01868

§ 371 Date: Jan. 29, 1997

§ 102(e) Date: Jan. 29, 1997

[87] PCT Pub. No.: WO97/03404

PCT Pub. Date: Jan. 30, 1997

Related U.S. Application Data

[60] Provisional application No. 60/001,060, Jul. 11, 1995.

[30] Foreign Application Priority Data

Feb. 28, 1996 [JP] Japan .................................. 8-067300

[51] Int. Cl.⁶ ............................ G06F 13/00; G06F 17/30; G06F 15/16
[52] U.S. Cl. ......................... 709/203; 709/219; 709/218; 709/223; 709/230; 709/100; 709/104; 709/105

[58] Field of Search ..................... 395/200.33, 200.56, 395/200.53, 200.48, 200.49, 200.59, 200.62, 200.76, 200.72, 200.74, 200.79, 200.9; 709/203, 226, 223, 218, 219, 232, 246, 242, 244, 249, 230, 100, 104, 105

[56] References Cited

U.S. PATENT DOCUMENTS

| | | | |
|---|---|---|---|
| 4,823,122 | 4/1989 | Mann et al. | 395/200.33 |
| 5,329,619 | 7/1994 | Page et al. | 395/200.33 |
| 5,341,477 | 8/1994 | Pitkin et al. | 395/200.33 |
| 5,379,383 | 1/1995 | Yunoki | 395/200.33 |
| 5,434,852 | 7/1995 | La Porta et al. | 370/401 |
| 5,446,896 | 8/1995 | Hegarty et al. | 395/650 |
| 5,459,837 | 10/1995 | Caccavale | 395/184.01 |

(List continued on next page.)

*Primary Examiner*—Ahmad F. Matar
*Assistant Examiner*—William D. Thomson
*Attorney, Agent, or Firm*—Antonelli, Terry, Stout & Kraus, LLP

[57] ABSTRACT

In a service providing system, a plurality of information acquiring computers for acquiring informations are connected via a network to a plurality of information providing computers for providing information. A service providing computer for executing an information providing service with respect to apparatuses for acquiring information is interposed between a plurality of in information acquiring apparatuses and a plurality of information providing apparatuses. The service providing computer receives a content of a request of the information acquiring computer, and determines a sort of information to be provided with a user based upon a quality of this request content, individual information and past historical information of the user, and also various sorts of conditions when the request is received. The service providing computer requests at least one of these information providing computers to provide the information. The information obtained from the request result is integrated by the service providing computer to be transmitted to the information acquiring computer.

4 Claims, 43 Drawing Sheets

U.S. PATENT DOCUMENTS

| | | | |
|---|---|---|---|
| 5,475,819 | 12/1995 | Miller et al. | 395/650 |
| 5,506,984 | 4/1996 | Miller | 395/600 |
| 5,544,320 | 8/1996 | Konrad | 395/200.9 |
| 5,548,724 | 8/1996 | Akizawa et al. | 395/200.33 |
| 5,548,726 | 8/1996 | Pettus | 395/200.9 |
| 5,715,397 | 2/1998 | Ogawa et al. | 395/200.9 |
| 5,717,923 | 2/1998 | Dedrick | 395/613 |
| 5,758,078 | 5/1998 | Kurita et al. | 395/200.33 |
| 5,758,194 | 5/1998 | Kuzma | 395/200.76 |

| USER ID | VARIABLE | VALUE |
|---------|----------|-------|
| 100 | SERVICE ATTRIBUTE | INFORMATION RETRIEVE WITH PAYMENT |
|  | AMOUNT OF MONEY | 1,000 YEN |
|  | QUANTITY | 1 |
|  | ⋮ | ⋮ |

| USER ID | VARIABLE | VALUE |
|---------|----------|-------|
| 100 | DATE | 1996/02/11 |
|  | LOG-IN TIME INSTANT | 11:35 |
|  | SERVICE REQUEST TIME INSTANT | 11:50 |
|  | WEATHER(TOKYO) | FINE |
|  | WEATHER(YOKOHAMA) | CLOUDY |
|  | TERMINAL LOCATION |  |
|  | NETWORK LOAD, OWN SERVER LOAD | 2.5<br>10.3 |
|  | DEATH/ALIVE OF INFORMATION PROVIDING COMPUTER A | alive |
|  | LOAD OF INFORMATION PROVIDING COMPUTER A | 1.6 |
|  | ⋮ | ⋮ |

FIG.5

| USER ID | VARIABLE | | VALUE |
|---|---|---|---|
| 100 | MEMBER LEVEL | | gold |
| | NAME | KANJI | 坂井 茂樹 (SHIGEKI SAKAI) |
| | | FURIGANA | さかい しげき (SAKAI SHIGEKI) |
| | | ROMAN CHARACTER | sakai shigeki |
| | ADDRESS | POSTCODE | 100 |
| | | THE ADMINISTRATIVE DIVISIONS OF JAPAN | TOKYO |
| | | CITY/ WARD | MINATO KU |
| | HOUSE NUMBER | | AKASAKA1-2-3 |
| | TELEPHONE NUMBER | HOME | 03-3453-1233 |
| | | OFFICE | 03-3212-9762 |
| | BIRTHDAY (YEAR) | | 1968 |
| | BIRTHDAY(MONTH) | | 11 |
| | BIRTHDAY(DAY) | | 22 |
| | SEX | | MALE |
| | OCCUPATION | | BUSINESS MAN |
| | POST | | NONE |
| | YEARLY INCOME | | 500 MILLION YEN |
| | HOBBY | | TRAVEL |
| | CREDIT CARD | FIRM | VISTER |
| | | NUMBER | 3432-8575-2944-2828 |
| | | EXPIRATION TERM | 04/98 |
| | PURCHASED ITEM | | WORDPROCESSOR SOFTWARE BY H FIRM |
| | ⋮ | | ⋮ |
| | TERMINAL FUNCTION | | text only |
| | MACHINE NAME | | PC-5NS01-S62DA |
| | CPU TYPE | | SSHH 75MHz |
| | MEMORY CAPACITY | | 24MB |
| | ⋮ | | ⋮ |
| | COMMUNICATION START PLACE | | YOKOHAMA CITY |
| | COMMUNICATION LINE NAME | | ISDN |
| | PROTOCOL | | PPP |
| | ⋮ | | ⋮ |

| USER ID | SERVICE SORT | PURCHASED DATE | DETAILED INFORMATION | RESERVATION NUMBER | INFORMATION PROVIDING COMPUTER |
|---|---|---|---|---|---|
| 100 | TICKET SELLING | 1995/11/13 | 1996/3/8 NNN HALL ¥ 4500 | 143846 | df56543 |
| | BOOK SELLING | 1995/12/01 | ISBN2-4473-5874-6 | hyuj789 | kjh8987a |
| | OVERSEAS TRAVEL | 1996/01/07 | STAY IN ITALY/6DAYS ¥ 134,000 | 345632 | ahyq356 |
| | | | 1996/02/05 DEPARTURE FROM NARITA,STAY IN ROMA 1996/02/12 DEPARTURE FROM ROMA | kjh8987 | oiu0987 |

| USER ID | VARIABLE | VALUE | TIMES |
|---|---|---|---|
| 100 | SERVICE SORT | OVERSEAS TRAVEL | 5 |
| | SERVICE SORT | DOMESTIC TRAVEL | 1 |
| | SERVICE SORT | BOOK SELLING | 2 |
| | ⋮ | ⋮ | ⋮ |
| | OVERSEAS TRAVEL/TERM | SHORT TERM(1 DAY) | 0 |
| | OVERSEAS TRAVEL/TERM | MEDIUM TERM(2-6 DAYS) | 0 |
| | OVERSEAS TRAVEL/TERM | LONG TERM(7 DAYS-) | 5 |
| | ⋮ | ⋮ | ⋮ |
| | OVERSEAS TRAVEL/PLACE/FEE RANGE | HAWAII DISCOUNT | 1 |
| | OVERSEAS TRAVEL/PLACE/FEE RANGE | HAWAII NORMAL | 0 |
| | OVERSEAS TRAVEL/PLACE/FEE RANGE | HAWAII DELUX | 0 |
| | ⋮ | ⋮ | ⋮ |

| USER ID | VARIABLE | VALUE |
|---|---|---|
| 100 | TOTALL CONNECTION TIMES | 34 |
| | CHANGE AMOUNT | ¥ 12,439 |
| | CREDIT CARD UTILIZATION CONDITION(1996/12) | ¥ 35,000 |
| | ⋮ | ⋮ |

FIG.10

| USER ID | VARIABLE | VALUE |
|---|---|---|
| 100 | SERVICE SORT | OVERSEAS TRAVEL |
| | OVERSEAS TRAVEL/TERM | LONG TERM |
| | OVERSEAS TRAVEL/PLACE/FEE RANGE | |
| | OVERSEAS TRAVEL/REGION/FEE RANGE | |
| | OVERSEAS TRAVEL/PLACE | |
| | OVERSEAS TRAVEL/REGION | |
| | OVERSEAS TRAVEL/FEE RANGE | |
| | OVERSEAS TRAVEL/OPTION | |
| | TICKET DELIVERY | |
| | PAYMENT | |
| | OVERSEAS TRAVEL/AIR LINE | |
| | OVERSEAS TRAVEL/HOTEL | |
| | ⋮ | ⋮ |

| REQUEST CODE | USER ID | NAME OF INFORMATION PROVIDING COMPUTER |
|---|---|---|
| air_tkt-NRT-LAX | all | JL,RG,KE,UA,DL,NW,NH,MH,SQ |
| | default | JL,NH,UA |
| | 100 | JL,NH,KE |
| | 101 | UA |
| | 102 | all |
| | 103 | KE,DL,SQ |
| | ⋮ | ⋮ |

| REQUEST CODE | USER ID | NAME OF INFORMATION PROVIDING COMPUTER | TIME-OUT TIME |
|---|---|---|---|
| air_tkt-NRT-LAX | 101 | UA | 38 |
| hotel-LAX | 243 | LOS,NEW_DAY | 10 |
| RT100-JPN | 187 | RT12,RT23 | 5 |
| Cok RZ-100 | 653 | fdh1 100,fhg234 | 69 |
| air_tkt-NRT-SIN | 231 | NW,JL,UA,NH,KE | 25 |
| ⋮ | ⋮ | ⋮ | ⋮ |

| NAME OF INFORMATION PROVIDING COMPUTER | SERVER ADDRESS | PROTOCOL | TRANSMISSION FORMAT | RECEPTION FORMAT |
|---|---|---|---|---|
| JL | 102.44.44.175 | http | d,f,t,n,w,c | result,no,price,aircraft,dp-time |
| NH | 201.43.56.111 | http | f,t,d,w,n,c | result,no,dp-time,price,aircraft |
| KE | 132.11.234.10 | http | d,f,t,n,w,c | result,no,price,aircraft,dp-time |
| UA | 102.12.67.111 | http | d,f,t,n,w,c | result,no,price,aircraft,dp-time |
| NW | 165,9,87,45 | http | d,f,t,n,c,w | result,no,price,dp-time,arv-time |
| ⋮ | ⋮ | ⋮ | ⋮ | ⋮ |

| USER NAME | REQUEST CODE | FLIGHT NUMBER | FEE | DEPARTURE TIME | AIRCRAFT TYPE |
|---|---|---|---|---|---|
| 100 | air_tkt-NRT-LAX | JL104 | $540 | 14:25 | B747 |
| | | NH322 | $520 | 10:00 | B744 |
| | | | | | |
| | | | | | |
| | | | | | |

| REQUEST CODE | USER ID | SELECTION RULE |
|---|---|---|
| air_tkt-NRT-LAX | default | MINIMUM VALUE |
| | 100 | JL PRIORITY |
| | 101 | UA ONLY |
| | 102 | MINIMUM VALUE |
| | 103 | EVENING DEPARTURE PRIORITY |
| | ⋮ | |

| INVOLVE SOURCE | INVOLVE DESTINATION |
|---|---|
| OVERSEAS TRAVEL/PLACE | OVERSEAS TRAVEL/REGION |
| ENGLAND | EUROPE |
| IRLAND | EUROPE |
| FRANCE | EUROPE |
| SPAIN | EUROPE |
| PORTUGAL | EUROPE |
| ⋮ | ⋮ |
| JAPAN | ASIA |
| KOREA | ASIA |
| THAILAND | ASIA |
| ⋮ | ⋮ |
| CANADA | |
| WESTCOAST OF AMERICA | NORTH AMERICA |
| EASTCOAST OF AMERICA | NORTH AMERICA |
| ⋮ | ⋮ |

| COMBINED ITEM | FORMULA |
|---|---|
| OVERSEAS TRAVEL/ PLACE/FEE RANGE | OVERSEAS TRAVEL/PLACE+ OVERSEAS TRAVEL/FEE RANGE |
| OVERSEAS TRAVEL/ REGION/FEE RANGE | OVERSEAS TRAVEL/REGION+ OVERSEAS TRAVEL/FEE RANGE |

| USER ID | VARIABLE | VALUE 1 | VALUE 2 | VALUE 3 | |
|---|---|---|---|---|---|
| 100 | SERVICE SORT | OVERSEAS TRAVEL | BOOK SELLING | DOMESTIC TRAVEL | ----- |
| | TICKET DELIVERY | FREE | | | ----- |
| | CREDIT CARD IDENTIFICATION | NONE | | | ----- |
| | message1 | on | | | ----- |
| | output | no movie | | | ----- |
| | ⋮ | ⋮ | ⋮ | ⋮ | |

| USER ID | DATE | SERVICE SORT | CONDITION | LOCATION | TIME | FLIGHT NUMBER |
|---|---|---|---|---|---|---|
| 100 | 1996/02/05 | OVERSEAS TRAVEL | DEPARTURE | NARITA | 14:30 DEP. | JL234 |
| | ⋮ | ⋮ | ⋮ | ⋮ | | |
| | 1996/02/11 | OVERSEAS TRAVEL | STAY | ROMA | | |
| | 1996/02/12 | OVERSEAS TRAVEL | DEPARTURE | ROMA | 11:15 DEP. | AZ101 |
| | 1996/02/13 | OVERSEAS TRAVEL | ARRIVAL | TOKYO | 08:45 ANV. | |

FIG.23

| VARIABLE | LOGIC FORMULA | ACTION | EXPIRATION TERM |
|---|---|---|---|
| MEMBER LEVEL | x=gold | TICKET DELIVERY=FREE | — |
| MEMBER LEVEL | x=gold | CREDIT CARD IDENTIFICATION=NONE | — |
| SEX | x=MALE | message1=on | 1996/04/30 |
| BIRTH DAY(YEAR) | x=1954 | message2=on | 1996/12/31 |
| TERMINAL FUNCTION | x=text_only | output=text_only | — |
| TERMINAL FUNCTION | x=no_movie | output=no_movie | — |
| ⋮ | ⋮ | ⋮ | ⋮ |

FIG.24

| VARIABLE | LOGIC FORMULA | ACTION | EXPIRATION TERM |
|---|---|---|---|
| today | x=01/01 | message10+on | |
| ⋮ | ⋮ | ⋮ | ⋮ |

FIG.25

| CONDITION | ACTION | EXPIRATION TERM |
|---|---|---|
| SERVICE ATTRIBUTE= GOODS PURCHASE PROPOSE AND MONEY AMOUNT >100,000 | pri = 3 | - |

FIG.35

| VARIABLE | RESERVATION/ DESIGNATION | AVAILABLE VALUE |
|---|---|---|
| MEMBER LEVEL | RESERVE | GENERAL/GOLD/SILVER |
| NAME | RESERVE | char20 |
| ADDRESS | RESERVE | char80 |
| TELEPHONE NUMBER | RESERVE | char20 |
| BIRTH DAY | RESERVE | char20 |
| SEX | RESERVE | MALE/FEMALE |
| OCCUPATION | RESERVE | BUSINESS MAN/GOVERMENT OFFICER/OWNER |
| YEARLY INCOME | RESERVE | UNIT OF MILLION YEN |
| HOBBY 1 | DESIGNATE | char20 |
| HOBBY 2 | DESIGNATE | char20 |
| FAVOR COLOR | DESIGNATE | char20 |
| LOG-IN DAY/TIME | RESERVE | date-time |
| LOG-IN ADDRESS | RESERVE | char40 |
| : | : | : |

FIG.36

| USER ID | VARIABLE | VALUE |
|---|---|---|
| 100 | MEMBER LEVEL | GOLD |
| 100 | NAME | SAKAI SHIGEKI |
| 100 | ADDRESS | AKASAKA 1-2-3, MINATO-KU, TOKYO |
| 100 | TELEPHONE NUMBER | 03-3453-1233 |
| 100 | BIRTH DAY | 1968/11/22 |
| 100 | SEX | MALE |
| 100 | OCCUPATION | BUSINESS MAN |
| 100 | YEARLY INCOME | 5 MILLION YEN |
| 100 | HOBBY 1 | TRAVEL |
| 100 | HOBBY 2 | SKI |
| 100 | FAVOR COLOR | YELLOW |
| 100 | LOG-IN DAY/TIME | 1996/2/12/13:25:33 |
| 100 | LOG-IN ADDRESS | MINATO-KU TOKYO |
| : | : | : |
| 101 | MEMBER LEVEL | GENERAL |
| 101 | NAME | MATSUMOTO JUNICHI |
| : | : | : |

| VARIABLE | RESERVATION/ DESIGNATION | AVAILABLE VALUE |
|---|---|---|
| SERVICE SORT | RESERVE | MUSIC/TRAVEL/SPORTS/··· |
| MUSIC-SERVICE SORT | DESIGNATE | CD/CONCERT/KARAOKE/··· |
| MUSIC-TYPE | DESIGNATE | CLASSIC/ROCK/POPUS/··· |
| : | : | : |

| USER ID | VARIABLE | VALUE | PRESENT | TIMES |
|---|---|---|---|---|
| 100 | SERVICE SORT | MUSIC | x | 35 |
| 100 | SERVICE SORT | TRAVEL | | 12 |
| 100 | SERVICE SORT | SPORTS | | 10 |
| 100 | MUSIC-SERVICE SORT | CD | | 7 |
| 100 | MUSIC-SERVICE SORT | CONCERT | x | 25 |
| 100 | MUSIC-SERVICE SORT | KARAOKE | | 3 |
| 100 | MUSIC-TYPE | CLASSIC | | 5 |
| 100 | MUSIC-TYPE | ROCK | x | 30 |
| 101 | SERVICE SORT | TRAVEL | x | 31 |
| 101 | SERVICE SORT | SPORTS | | 8 |
| : | : | : | | |

| VARIABLE | RESERVATION/ DESIGNATION | AVAILABLE VALUE |
|---|---|---|
| PROPOSED MONEY AMOUNT | DESIGNATE | INTEGER (UNIT:YEN) |
| PROPOSED QUANTITY | DESIGNATE | INTEGER (UNIT:PIECE) |
| ⋮ | ⋮ | ⋮ |

| USER ID | VARIABLE | VALUE |
|---|---|---|
| 100 | PROPOSED MONEY AMOUNT | 124,500 YEN |
| 100 | PROPOSED QUANTITY | 80 PIECES |
| ⋮ | ⋮ | ⋮ |

| VARIABLE (5801) | RESERVATION/DESIGNATION (5802) | AVAILABLE VALUE (5803) |
|---|---|---|
| PRESENT DAY/TIME | RESERVE | date-time |
| WEATHER-TOKYO | DESIGNATE | FINE/CLOUDY/RAIN/SNOW |
| WEATHER-YOKOHAMA | DESIGNATE | FINE/CLOUDY/RAIN/SNOW |
| NETWORK LOAD | RESERVE | 0.1 UNIT |
| OWN CPU LOAD | RESERVE | 0.1 UNIT |
| ⋮ | ⋮ | ⋮ |

| VARIABLE (5901) | VALUE (5902, 5903) |
|---|---|
| PRESENT DAY/TIME | 1996/02/13/01:12:23 |
| WEATHER-TOKYO | FINE |
| WEATHER-YOKOHAMA | CLOUDY |
| NETWORK LOAD | 2.5 |
| OWN CPU LOAD | 3.5 |
| ⋮ | ⋮ |

FIG.43

| VARIABLE | RESERVATION/ DESIGNATION | AVAILABLE VALUE | ROGIC |
|---|---|---|---|
| DISCOUNT RATE | RESERVE | 0-100% | logic 1 |
| CREDIT IDENTIFICATION | RESERVE | YES/NONE | logic 2 |
| DELIVERY FEE | RESERVE | NONE/UNIT OF 100 YEN | logic 3 |
| ⋮ | ⋮ | ⋮ | |

FIG.44

| USER ID | VARIABLE | VALUE |
|---|---|---|
| 100 | DISCOUNT RATE | 20% |
| 100 | CREDIT IDENTIFICATION | NONE |
| 100 | DELIVERY FEE | NONE |
| 101 | DISCOUNT RATE | 5% |
| 101 | CREDIT IDENTIFICATION | YES |
| 101 | DELIVERY FEE | 1,000 YEN |
| ⋮ | ⋮ | ⋮ |

FIG.45

Table 6200:

| VARIABLE | RESERVATION/DESIGNATION | AVAILABLE VALUE |
|---|---|---|
| APP NAME | RESERVE | char 40 |
| APP CONDITION 1 | RESERVE | VARIABLE=VALUE |
| APP CONDITION 2 | RESERVE | VARIABLE=VALUE |
| APP CONDITION 3 | RESERVE | VARIABLE=VALUE |
| APP CONDITION 4 | RESERVE | VARIABLE=VALUE |
| APP CONDITION COMBINATION | RESERVE | LOGIC FORMULA(&,I) |
| APP ARGUMENT 1 | RESERVE | VARIABLE NAME |
| APP ARGUMENT 2 | RESERVE | VARIABLE NAME |
| APP ARGUMENT 3 | RESERVE | VARIABLE NAME |
| ⋮ | ⋮ | ⋮ |
| | | |
| | | |
| | | |

Table 6300:

| AP-ID | VARIABLE | VALUE |
|---|---|---|
| 30001 | APP NAME | LOG-IN |
| 30001 | APP CONDITION 1 | PRECEDING APPLICATION = N/A |
| 30002 | APP NAME | MUSIC CD IDENTIFICATION |
| 30002 | APP CONDITION 1 | PRECEDING APPLICATION = LOG-IN |
| 30002 | APP CONDITION 2 | SERVICE SORT = MUSIC |
| 30002 | APP CONDITION 3 | MUSIC-SERVICE SORT = CD |
| 30002 | APP CONDITION CONBINATION | 1&2&3 |
| 30002 | APP ARGUMENT 1 | MUSIC - TYPE |
| 30003 | APP NAME | MUSIC CONCERT IDENTIFICATION |
| 30003 | APP CONDITION 1 | PRECEDING APPLICATION = LOG-IN |
| 30003 | APP CONDITION 2 | SERVICE-SORT = MUSIC |
| 30003 | APP CONDITION 3 | *MUSIC-SERVICE SORT = CONCERT* |
| 30003 | APP CONDITION CONBINATION | 1&2&3 |
| 30003 | APP ARGUMENT 1 | MUSIC - TYPE |
| 30003 | APP ARGUMENT 2 | LOG-IN ADDRESS |
| ⋮ | ⋮ | ⋮ |
| | | |
| | | |

| VARIABLE (6401) | RESERVATION/ DESIGNATION (6402) | AVAILABLE VALUE (6403) |
|---|---|---|
| INFORMATION SORT | RESERVE | char40 |
| INFORMATION FEE | RESERVE | FREE/10 YEN/MINUTE/10 YEN/UNIT |
| INFORMATION MODE | RESERVE | RETRIEVE/RESERVE |
| INFORMATION INPUT | RESERVE | MODEL VARIABLE |
| INFORMATION OUTPUT | RESERVE | MODEL VARIABLE |
| INFORMATION ADDRESS | RESERVE | INTERNET ADDRESS |
| INFORMATION ACCESS ID | RESERVE | INTEGER |
| INFORMATION CONVERSION LOGIC | RESERVE | CONVERSION LOGIC NAME |
| : | : | : |
| | | |
| | | |
| | | |
| | | |

| INFORMATION ID (6501) | VARIABLE (6502) | VALUE (6503) |
|---|---|---|
| 20001 | INFORMATION SORT | MUSIC CONCERT IDENTIFICATION |
| 20001 | INFORMATION FEE | FREE |
| 20001 | INFORMATION MODE | RETRIEVE |
| 20001 | INFORMATION INPUT | char genre |
| 20001 | INFORMATION OUTPUT | char singer,char date,int price,char location |
| 20001 | INFORMATION ADDRESS | 133. 144. 8. 176 |
| 20001 | INFORMATION ACCESS ID | 9000 |
| 20001 | INFORMATION CONVERSION LOGIC | 10001 to 20001 |
| 20002 | INFORMATION SORT | MUSIC CONCERT IDENTIFICATION |
| 20002 | INFORMATION FEE | FREE |
| 20002 | INFORMATION MODE | RETRIEVE |
| 20002 | INFORMATION INPUT | char genre,char address |
| 20002 | INFORMATION OUTPUT | char singer,dint date-time,int price,char location |
| 20002 | INFORMATION ADDRESS | 133. 100. 27. 112 |
| 20002 | INFORMATION ACCESS ID | 9020 |
| 20002 | INFORMATION CONVERSION LOGIC | 10001 to 20002 |
| : | : | : |

FIG.49

| VARIABLE | RESERVATION/ DESIGNATION | AVAILABLE VALUE |
|---|---|---|
| AP INFORMATION SORT | RESERVE | char40 |
| AP INFORMATION FEE | RESERVE | FEE/10 YEN/MINUTE/10 YEN/UNIT |
| AP INFORMATION MODE | RESERVE | RETRIEVE/RESERVE |
| AP INFORMATION INPUT | RESERVE | MODEL AND VARIABLE |
| AP INFORMATION OUTPUT | RESERVE | MODEL AND VARIABLE |
| : | : | : |

FIG.50

| APIID | VARIABLE | VALUE |
|---|---|---|
| 10001 | AP INFORMATION SORT | MUSIC CONCERT IDENTIFICATION |
| 10001 | AP INFORMATION FEE | FEE |
| 10001 | AP INFORMATION MODE | RETRIEVE |
| 10001 | AP INFORMATION INPUT | char genre,char address |
| 10001 | AP INFORMATION OUTPUT | char singer,char date,int price,char location |
| : | : | : |

| USER ID | API ID | INFORMATION ID | LOGIC | INTEGRATION LOGIC |
|---------|--------|----------------|----------|-------------------|
| 100 | 10001 | 20001, 2000 | Logic_11 | integ_1 |
| 101 | 10001 | 20001 | Logic_11 | integ_11 |
| : | : | : | : | : |
| 001 | 10001 | 20001, 2000 | Logic_all | integ_12 |

| USER ID | API ID | INFORMATION ID | LOGIC | INTEGRATION LOGIC |
|---------|--------|----------------|----------|-------------------|
| 200 | 10001 | 20011, 20012 | Logic_11 | integ_1 |
| 201 | 10001 | 20012, 20013 | Logic_11 | integ_11 |
| : | : | : | : | : |
| 001 | 10001 | 20011, 20012, 20013 | Logic_all | integ_12 |

SERVICE PROVIDING SYSTEM FOR PROVIDING SERVICES SUITABLE TO AN END USER REQUEST BASED ON CHARACTERISTICS OF A REQUEST, ATTRIBUTES OF A SERVICE AND OPERATING CONDITIONS OF A PROCESSOR

This is continuation under 35 U.S.C. 37 of PCT/JP96/01868 claiming priority based on U.S. provisional application No. 60/001,060 filed Jul. 11, 1995.

TECHNICAL FIELD

This invention relates to a broad-range network system, and more specifically, to a service providing system used to provide information service to information acquiring computers over a wide area.

BACKGROUND ART

Recently, wide-area information services which can be utilized by end users have rapidly increased, since networks are extended and business opportunities through networks have increased, typically through the Internet and personal communications. However, for instance, in interfaces such as WWW (World Wide Web) presently provided in the Internet, end users must know connection destinations of information providing computers, and also cannot be connected to a plurality of information providing computers at the same time. As a consequence, it is rather difficult for end users to find a truly required service from among a huge amount of information and effectively utilize this truly necessary service without having advance knowledge of the service and also without cumbersome operations.

Also, when a personal computer communication system is connected to an information providing computer, this personal computer communication system merely provides a communication path to the information providing computer, or simply lends a database to an information provider. Accordingly, end users should be individually connected with the system of the information provider, should sequentially retrieve contents of services, and should propose the system utilization.

The contents of the present information services are fixedly defined, so that the same services are provided in response to the same requests irrelevant to such a fact, e.g., who is an end user, and conditions of the system when the service is received.

The above-described conventional techniques suffer the following described problems, since there are preconditions, namely, the end users are connected to the information providing computers, and thereafter the end uses can newly retrieve the contents of the provided services and can newly propose to utilize the service; the end user cannot be connected to a plurality of information providing computers at the same time; and also only the information of the service request is sent from the end user, and the information providing computer neither receives, nor holds the personal information of the end user.

(1) It is difficult to find out a service desired by an end user. In other words, even when a certain information providing computer provides a service desired by the end user, if the end user does not know of the existence of this information providing computer and/or connection destinations, then the end user cannot utilize this service. It is practically difficult for the end user to personally grasp a huge number of service contents of information providing computers and a large number of connection destinations. Thus the end user can hardly utilize his truly desirable services.

(2) It is difficult to utilize a suitable service, depending upon a change in conditions. In other words, not only a large number of information providers enter into information service businesses every day, but also the presently available services of the existing information providing computers are frequently changed and/or added with other services every day. End users can hardly, personally grasp all of these changes. As a result, even though is highly likely that better services are newly added, the end users may emd up fixedly utilizing specific services. Also system environments and qualities of information/services may change contents of services which can give higher satisfaction to the requests of the end users. It is practically difficult that the end users systematically evaluate these conditions and thus select the proper services in accordance with this change.

(3) It is difficult to discriminate services from each other based on desires and service utilization histories of end users. The desires and service utilization histories of end users are grasped only by these end users themselves. As a consequence, the information providing computers cannot select the proper services which can provide the higher rate of satisfaction to the requests of the respective end users, but therefore the end users themselves must retrieve their desirable services and also must hold/manage the service utilization histories.

(4) When services of a plurality of information providing computers are integrated to be received, procedures by end users become cumbersome. That is, when a complex service provided by a plurality of information providing computers is received, an end user must be sequentially connected with the respective information providing computers, must retrieve the contents of the individual services, must propose the individual service utilizations, and must adjust these services individually. Also, the end user is required to pay his fee to the received services from the respective information providers. In particular, an abundance of time and workloads on the part of the end user are required so as to adjust combinations of the plural services.

SUMMARY OF THE INVENTION

An object of the present invention is to solve the above-described problems, and provide a service suitable to a request of an end user, and which is capable of realizing more effective information service utilization by end users.

To achieve the above-described object, in accordance with a service providing system of the present invention, when contents of services requested by end users are specified, individual tastes and utilization histories of these end users are evaluated, and then services of information providing computers capable of satisfying such tastes and histories are selected. Preferably, when service of an information providing computer is added and/or changed, the services to be provided with the end users are changed based upon contents of these added/changed services. At the same time, system environments and qualities of services/information are evaluated to thereby change services to be provided. Furthermore, preferably, when services of a plurality of information providing computers are integrated to be received, various workloads, such as service utilization proposals to the information providing computers, adjustments between services, and payment of service fees to information providers may be substituted.

Specifically, according to an aspect of the present invention, in a service providing system, a plurality of apparatuses for acquiring information (information acquiring apparatuses) are connected via a network to a plurality of apparatuses for providing information (information providing apparatuses), with at least one apparatus (intervening apparatus or agent) being interposed between the plurality of information acquiring apparatuses and the plurality of information providing apparatuses. Preferably, the intervening apparatus receives the content of a request from the information acquiring apparatuses, and also transmits an information providing request to at least one of the information providing apparatuses based on the content of the request. Then, the intervening apparatus receives the information provided by at least one of the information providing apparatuses, integrates the received information based on the request content of the information acquiring apparatus, and transmits the integrated information to the information acquiring apparatuses. The request content of the information acquiring apparatus is a code indicative of a content of information required by the information acquiring apparatus.

According to a more preferable aspect of the present invention, the intervening apparatus receives the request content of the information acquiring apparatus, and transmits an information providing request to at least one of the information providing apparatuses based upon at least one of information related to the information acquiring apparatuses, information related to the information providing apparatuses, and environmental condition information regarding the information acquiring apparatuses and the information providing apparatuses. Furthermore, the intervening apparatus receives information provided by at least one of the information providing apparatuses, and integrates the received information based upon at least one of individual information related to the information acquiring apparatuses, individual information related to the information providing apparatuses, and environmental condition information regarding the information acquiring apparatuses and the information providing apparatuses. The individual information related to the information acquiring apparatuses includes at least one of information related to a user of the information acquiring apparatuses, information extractable from a past history, current temporary information, and a future schedule. The individual information related to the information providing apparatuses includes at least one of information related to a user of the information providing apparatuses, information extractable from a past history, current temporary information, and a future schedule. Also, the environmental condition information regarding the information acquiring apparatuses and the information providing apparatuses includes at least one of information of an environment regarding the information acquiring apparatuses and the information providing apparatuses, information extractable from a past history, current temporary information, and a future schedule.

Further, the intervening apparatus is constructed of a service management unit and an application unit for storing at least one application program. The service management unit receives the request content from the information acquiring apparatus to select/initiate the application program of the application unit and transfer a proper value based upon at least one of individual information related to the information acquiring apparatuses, individual information related to the information providing apparatuses, and environmental condition information regarding the information acquiring apparatuses and the information providing apparatuses. Then, the service management unit accepts a request content from the application program to transmit an information providing request to at least one of the information providing apparatuses based upon at least one of individual information related to the information acquiring apparatuses, individual information related to the information providing apparatuses, and environmental condition information regarding the information acquiring apparatuses and the information providing apparatuses. Also, the service management unit receives information provided by at least one of the information providing apparatuses to integrate the received information based upon at least one of individual information related to the information acquiring apparatuses, individual information related to the information providing apparatuses, and environmental condition information regarding the information acquiring apparatuses and the information providing apparatuses. Then, the service management unit selects/initiates the application program of the application unit to transfer the integrated information, and the service management unit accepts processed information from the application program to be transmitted to the information acquiring apparatus.

BRIEF DESCRIPTION OF DRAWINGS

FIG. 3 is a table structural diagram for showing an example of a quality table.

FIG. 4 is a table structural diagram for showing an example of a condition table.

FIG. 5 is a table structural diagram for indicating an example of a static discriminating information table.

FIG. 6 is a table structural diagram for representing an example of a service utilization history table.

FIG. 7 is a table structural diagram for showing an example of a service utilization trend table.

FIG. 8 is a table structural diagram for indicating an example of a system utilization trend table.

FIG. 10 is a table structural diagram for showing an example of a selection variable temporal storage table.

FIG. 11 is a table structural diagram for showing an example of a request conversion management table.

FIG. 12 is a table structural diagram for indicating an example of an information acquiring request record table.

FIG. 13 is a table structural diagram for representing an example of an information providing computer management table.

FIG. 14 is a table structural diagram for showing an example of a reception data temporal storage table.

FIG. 15 is a table structural diagram for indicating an example of an acquired information integration management table.

FIG. 20 is a table structural diagram for indicating an example of a variable value involving relationship table.

FIG. 21 is a table structural diagram for representing a variable combination table.

FIG. 22 is a table structural diagram for showing an example of an action management table.

FIG. 23 is a table structural diagram for representing an example of static discriminating information-to-action corresponding table.

FIG. 24 is a table structural diagram for showing an example of a condition-to-action corresponding table.

FIG. 25 is a table structural diagram for representing an example of a quality-to-action corresponding table.

FIG. 26 is a table structural diagram for indicating one example of a schedule table.

FIG. 35 is a table structural diagram for showing an example of a static discriminating variable definition table.

FIG. 36 is a table structural diagram for indicating an example of a static discriminating variable table.

FIG. 37 is a table structural diagram for showing an example of a dynamic discriminating (history) variable definition table.

FIG. 38 is a table structural diagram for representing an example of a dynamic discriminating (history) variable table.

FIG. 39 is a table structural diagram for denoting an example of a quality variable definition table.

FIG. 40 is a table structural diagram for showing an example of a quality variable table.

FIG. 41 is a table structural diagram for representing an example of a condition variable definition table.

FIG. 42 is a table structural diagram for denoting an example of a condition variable table.

FIG. 43 is a table structural diagram for showing an example of a composite element variable definition table.

FIG. 44 is a table structural diagram for representing an example of a composite element variable table.

FIG. 45 is a table structural diagram for showing an example of an application management variable definition table.

FIG. 46 is a table structural diagram for representing an example of an application management variable table.

FIG. 47 is a table structural diagram for showing an example of an information providing variable definition table.

FIG. 48 is a table structural diagram for representing an example of an information providing variable table.

FIG. 49 is a table structural diagram for showing an example of an application interface variable definition table.

FIG. 50 is a table structural diagram for representing an example of an application interface variable table.

FIG. 51 is a table structural diagram for showing an example of an information provision determination table.

FIG. 52 is a table structural diagram for representing another example of an information provision determination table.

DESCRIPTION OF THE PREFERRED
EMBODIMENTS OF THE INVENTION

[EMBODIMENT 1]

Figure 1:
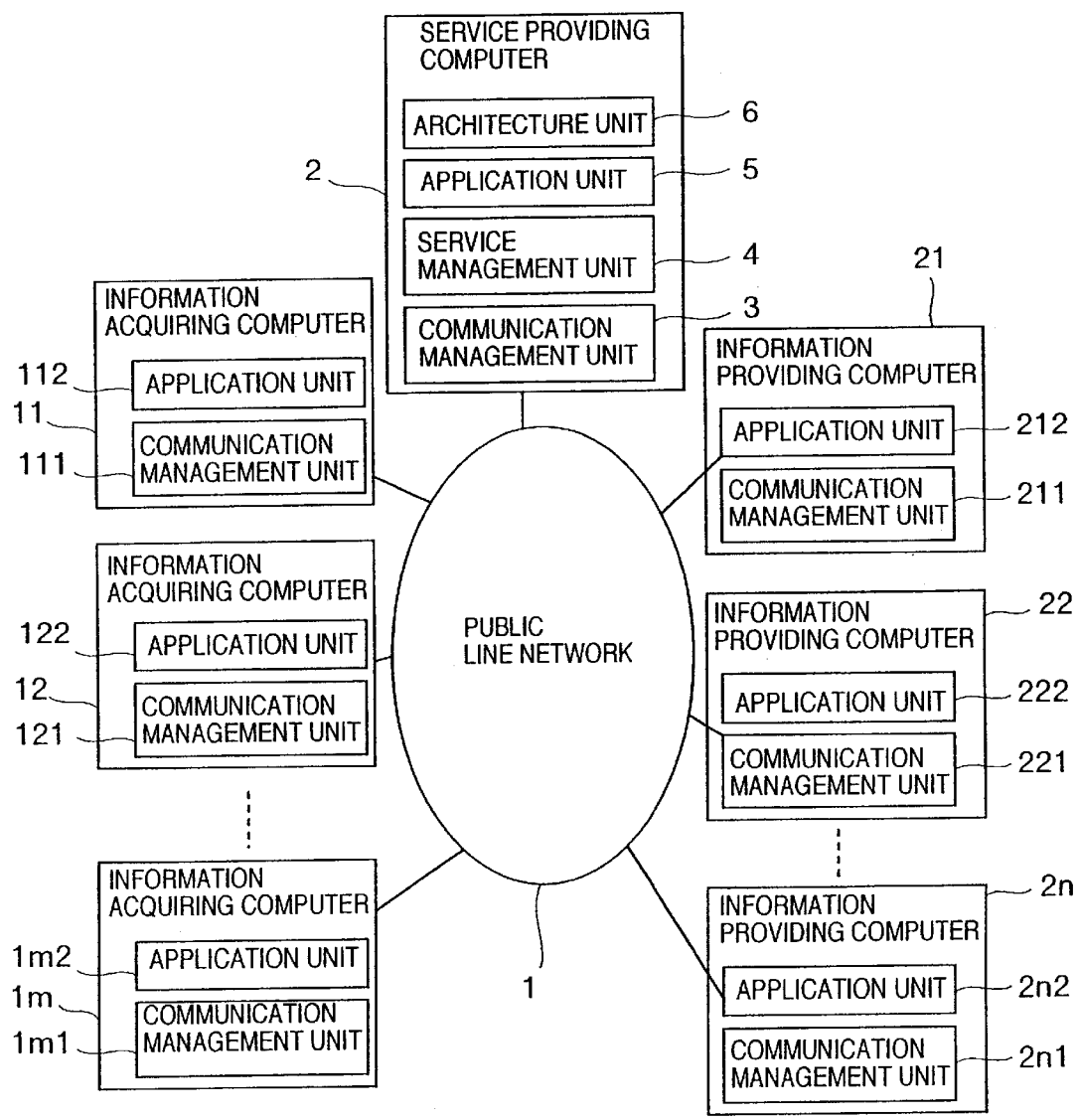
FIG. 1 is a system structural diagram of an information providing system according to a first embodiment of the present invention.

FIG. 1 is a structural diagram of a network system according to a first embodiment, to which an information providing system of the present invention is applied.

As indicated in the drawing, this system includes information 20 acquiring computers 11, 12, . . . , 1m, information providing computers 21, 22, . . . , 2n and a service providing computer 2 connected to a public line network 1.

The information acquiring computer 11 is arranged by a communication management unit 111 and an application unit 112. It should be noted that this arrangement is similar to those of the information acquiring computers 12, . . . , 1m. The information providing computer 21 is arranged by a communication management unit 211 and an application unit 212. It should also be noted that this arrangement is similar to those of the information providing computers 22, . . . , 2n. The service providing computer 2 is a communication management unit 3, a service management unit 4, an application unit 5, and an architecture unit 6.

The information acquiring computers 11 to 1m transmit requests via the public line network 1 to the service providing computer 2, and receive information from the service providing computer 2. As an example of the information acquiring computers 11 to 1m, there are an exclusive-use terminal, a personal computer, a workstation, a multimedia kiosku, a personal portable terminal (PDA) and so on. The information providing computers 21 to 2n receive the information acquiring requests from the service providing computer 2 and transmit the required information to the service providing computer 2. As an example of the information providing computers 21 to 2n, there are a database server, a World Wide Web (WWW) server, an FTP server, a WAIS server, a Gopher server and so on.

The service providing computer 2, for instance, receives a request issued from the information acquiring computer 11, and determines the type of information to be provided to the information acquiring computer 11 based upon a quality of this request content, individual information and past historical information of a user of the information acquiring computer 11 which are previously stored inside the service providing computer 2, and various sorts of conditions when the request is received. The service providing computer 2 transmits an information acquiring request to such an information providing computer capable of acquiring the determined, necessary sort of information among the information providing computers 21, 22, . . . , 2n. Then, the service providing computer 2 determines information to be provided to the information acquiring computer 11 based on the information received from the information providing computers 21, 22, . . . , 2n, and also the owned information, and then transmits this determined information to the information acquiring computer 11.

Figure 2:
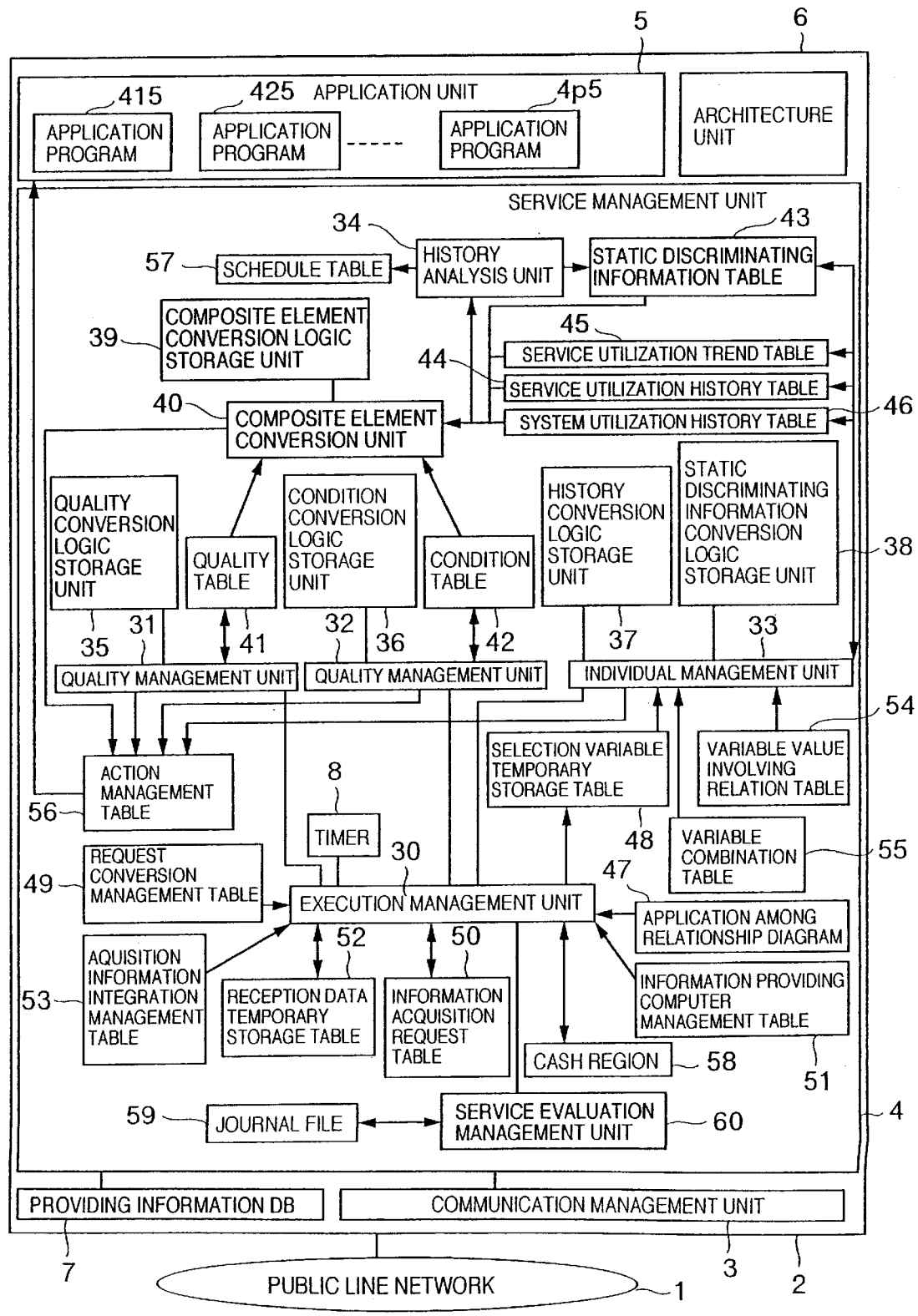
FIG. 2 is a block diagram for representing an arrangement of a service providing computer.

FIG. 2 is a block diagram for showing the arrangement of the service providing computer 2.

The communication management unit 3 is connected to the public line network 1, and receives a message transmitted from the information providing computers 21, 22, . . . , 2n via the public line network 1, and then transfers the message to the service management unit 4 and the application unit 5. The communication management unit 3 transmits via the public line network 1 the message transferred from the service management unit 4 and the application unit 5 to a proper communication counter party.

The service management unit 4 is arranged by process units, and a plurality of tables for storing process results of these process units, and to which these process units refer while executing the process operations. The process units include of an execution management unit 30, a quality management unit 31, a condition management unit 32, an individual management unit 33, a history analysis unit 34, a quality conversion logic storage unit 35, a condition conversion logic storage unit 36, a history conversion logic storage unit 37, a static discriminating information conversion logic storage unit 38, a composite element conversion logic storage unit 39, and a composite element conversion unit 40.

The application unit 5 includes a plurality of application programs 415, 425, . . . , 4p5. The respective application programs are initiated by the execution management unit 30. While a program is executed, various sorts of variable values stored in the action management table 56 are referred to.

The architecture unit 6 performs initial setting operations of the various tables used by the service management unit 4 when the application program is formed.

Providing information DB7 holds a portion of 25 the services provided by the service providing computer 2. As a result, the service managing unit 4 can obtain the information without requesting information from the information providing computers 21, 22, . . . , 2n.

A description will now be made of a quality of a request transmitted by a subject (will be referred to as an "end user" hereinafter) from the information acquiring computer 11, a condition when the request is received, and discriminating information of the end user, which are used as a judgement material when the service management unit 4 manages the providing service.

A quality of a request by the end user refers to an attribute of a service requested by the end user among the services provided by the service providing computer 2. The service management unit 4 changes a priority degree of this process based on the quality of the request and a predetermined rule, and executes an additional process. As examples of the request quality by the end user, there are an information retrieval with payment, an information retrieval without payment, a proposal (offer) to purchase a service, a proposal to purchase goods, a proposal to purchase software, a reservation of a service, a reservation for the purchase a software, a transmission of important data such as a credit card number, a writing operation to an electronic bulletin board system, reading operation from an electronic bulletin board system, a transmission of electronic mail, a reception of electronic mail, a contribution to NETNEWS of the Internet, a purchase of NETNEWS of the Internet, a file transfer, remote loading of a program, a transmission of a business message to the service providing computer 2 a retrieval of self-discriminating information stored in the service providing computer 2, a log-in to the service providing computer 2, a log-out from the service providing computer 2, and the like. Although not equal to the service attribute, degrees of requests such that a payment amount is large and, a purchase quantity is large are equal to the quality of the request. For instance, when a payment amount is large and this payment is made by a credit card, it is possible to add such a process that reliability of the paying end user is investigated. When a purchase quantity is large, this purchaser is recognized as a large purchasing customer, and then the process is carried out with a top priority.

A condition during reception corresponds to an item having no relationship to the end user among items determined when the request of the end user is received from the information acquiring computers 11, 12, . . . , 1m. Also, this condition during reception corresponds to an item having a relation with a day/time, and items related to various states of networks such as the service providing computer 2, the information providing computers 21, 22, . . . , 2n, and the public line network 1. Based upon the condition during reception and a predetermined rule, the service management unit 4 changes the quantities of the information providing computers 21, 22, . . . , 2n, and changes the providing information, or the amount of providing information, limits the providing service, and also changes the priority order of the process. As examples of the condition during reception, there are log-in time, a service request time including morning, noon, or night, a date, a day, a season, a busy season or a non-busy season, a holiday or a week day, a school during long-term vacation, special event day including a festival or a sporting event, present weather, present temperature, present humidity, week weather forecast, long-term weather forecast, snow information, thunder information, whirlwind information, and other various weather information. Further, there are earthquake, fire, and other natural disaster information; social conditions such as riot, dispute, strike, and demonstration; economic information such as exchange rate, stock price, credit rate, and gold rate; operation conditions such as railroad, airplane, boat, bus, taxi; conditions of stations, air ports, normal roads, and highway; social infrastructure conditions such as power generation amount, water storage amount of dam, oil storage amount, and gas storage amount; and also hardware conditions of the service providing computer 2 such as model name (type name), CPU type, memory capacity, and disk capacity. Also, there are software conditions of the service providing computer 2 such as OS name, and middleware name; operation conditions of the service providing computer 2 such as load, memory using amount, and number of end user under connection; services provided by the service providing computer 2; hardware conditions of the information providing computers 21, 22, . . . , 2n such as model name (type name), CPU type, memory capacity, disk capacity; software conditions of the information providing computers 21, 22, . . . , 2n such as OS name, and middleware name; operation conditions of information providing computers 21, 22, . . . , 2n such as load, load in unit of providing service, memory user amount, and active status; operation hour; information sort, providing cost (time unit, information amount unit, information number unit), place of information, information forming time (fresh degree of information), information effective time (information erase time), subject member of information (normal, gold), subject user of information (age range, field, specific region), which are provided by the information providing computers 21, 22, . . . , 2n; and network loads (executed communication speed) of many sorts of networks such as the public line network 1.

The discriminating information of the end user corresponds to information depending upon the end user and the information acquiring computers 11, 12, . . . , 1m, and contains static discriminating information such as fixed information or semi-fixed information, and also the service utilization history information of the end user changes every time the end user utilizes the service. ased upon the above-described discriminating information and a predetermined rule, the service management unit 4 changes the providing information, the number of information providing computers 21, 22, . . . , 2n to be connected, the amount and modes of the providing information, or the priority order of processing. As examples of the static discriminating information related to the user, there are a place of a user, a user ID, name of an end user, birth data, sex, sizes of clothing and shoes, nationality, address, a telephone number, birth place, a member level (general member, or gold member), fee level, credit level (allowable amount), credit card information (firm, number, expiration data), income level, final graduation, specialty, occupation (sort of business, starting year), business post, passport number (number, expiration date), family members, anniversary days (marriage anniversary day, family birthdays), hobby, favorable matters (cooking, fruits, vegetable, meat, alcohol, talent, brand, writer, music, movies, art, sports), smoking/non-smoking, drinking/non-drinking, specific item to be purchased, joint date, and specific contract (content, term) and so on. As examples of the static discriminating information related to the information acquiring computers 11, 12, . . . , 1m, there are model names (type names), CPU types, memory capacities, disk capacities, display capacities, display setting values (pixel number, color number), sound board types, OS names, and middleware name. As examples of the discriminating information related to the communication, there are a title of communication software, a communication starting place, a communication line name (public line, ISDN, private line), a communication speed, a communication quality (echo recovery method), protocol and so on.

As the service utilization historical information of the end user, there are management information in unit of utilized service, statistics information related to utilization frequency every constructional elements of services, and other service utilization historical information. As the management information in unit of utilized service, there are detailed information of providing services (service sort, purchase name, purchase service, purchase information, purchase quantity, utilization date/time, service place, service period, price, service utilized quantity, schedule etc.), payment method, and sorts/places of information acquiring computers 11, 12, . . . , 1m. As the statistics information related to the utilization frequency every constructional element of service, there are sorts of well-utilized services (service sorts, service genre (overseas travel/domestic travel, luxurious/normal/cheap etc.), utilization day/time (month, long-term/medium-term/short-term etc.), places (to which place, at which place), whom (how many persons), how many (quantity), how to travel (which air line, which hotel), how much (cost), well-used date, well-used time range, places of the information acquiring computers 11, 12, . . . , 1m, payment method, and service delivery method.

When statistics data about historical information having continuous values is acquired, this historical information is classified into a finite number of categories for management purposes. For instance, the fee for overseas travel lower than 100,000 yen is "cheap", this fee higher than 300,000 yen and lower than 100,000 yen is "normal", and this fee higher than 300,000 yen is "luxurious". As other service utilization historical information, there are all connection times (log-in times), charging conditions, credit utilization condition and the like.

The service management unit 4 executes the process in conjunction with the application unit 5. The service management unit 4 initiates the properly selected application programs 415, 425, . . . , 4p5 as to the information acquiring request received from the information acquiring computers 11, 12, . . . , 1m based on the quality of this request, the condition during reception, and the discriminating information of the end user. Also, the service management unit 4 provides the conditions for determining the content of the information to be provided with the end user to the application programs 415, 425, . . . , 4p5 based on the above-described quality, condition, and discriminating information.

The initiated application programs 415, 425, . . . , 4p5 determine a content of providing information based upon the conditions for determining the content of the providing information indicated by the service management unit 4. When the application programs 415, 425, . . . , 4p5 do not own the information required to execute the process, the acquisition of this information is requested to the service management unit 4. The service management unit 4 selects at least more than one proper information providing computers 21, 22, . . . , 2n in order to acquire the necessary information based on the above-described quality, condition, and discriminating information, and then transmits the information acquisition request to the selected information providing computers 21, 22, . . . , 2n.

Upon receipt of the information from the information providing computers 21, 22, . . . , 2n, the service management unit 4 combines the acquired information with each other based on the above-described quality, condition, and discriminating information to thereby form the information to be indicated to the end user, and then transfers the formed information to the application programs 415, 425, ..., 4p5. The application programs 415, 425, ..., 4p5 transmits the received information to the information acquiring computers 11, 12, ..., 1m. Now, in a series of the above-explained processes, the service managing unit 4 selects the condition of the information to be indicated to the application programs 415, 425, ..., 4p5 based on the above-explained quality, condition, and discriminating information. Also, the service management unit 4 selects a sort and a total number of information providing computers 21, 22, ..., 2n to be connected. Further, the service management unit 4 changes the priority degrees of these processes.

Upon completion of providing of the information, the service management unit 4 stores the service utilization historical information of the end user into a table within the service management unit 4. This historical information is utilized as one of the discriminating information in the subsequent service providing operations to the end user.

A description will now be made of the tables for constituting the service management unit 4.

In FIG. 3, there is shown an example of the quality table 41. The quality table 41 stores values of qualities of requests with respect to each of the users, which correspond to attributes of services and degrees of services requested by the users. For instance, information retrievals with "payment" are stored as the attributes of the services are stored in the quality table 41 shown in the drawing. Since this is an important request, as compared with the information retrieval without payment, the service management unit 4 may increase the priority degree of the process related to this request. Also, "1,000 yen" is stored with respect to the amount of money. To the contrary, for instance, since a request of "10,000 yen" of an amount of money is more important than the request of "1,000 yen", the service management unit 4 may increase the priority degree of the process concerning the service request of "10,000 yen". As to the quanity, "1" is stored. To the contrary, for example, since such a request that the quantity is 100 is more important than the request of "1", the service management unit 4 can increase the priority degree of the process related to the service request of 100.

The execution management unit 30 requests the quality management unit 31 to store the quality of the request into the quality table 41 upon receipt of the requests issued from the information acquiring computers 11, 12, ..., 1m. The quality management unit 31 stores the value of the quality of the request into the quality table 41. This value is evaluated by the quality management unit 31 and the composite element conversion unit 40, and then the above-described priority degree of the process is determined.

FIG. 4 shows an example of the condition table 42. The condition table 42 stores the items which do not depend on the end users with respect to each of these end users among the items determined at the time instant when the requests from the information acquiring computers 11, 12, ..., 1m are requested.

Upon receipt of the requests issued from the information acquiring computers 11, 12, ..., 1m, the execution management unit 30 request the condition management unit 32 to store the present date and the present time instant into the condition table 42. In case of the log-in request, the condition management unit 32 causes the condition table 42 to store the log-in time instant. In case of the service request, the condition management unit 32 causes the condition table 42 to store the service request time instant. The instant information includes instance, the power weather conditions, the load of the service providing computer 2, the load in service unit, the load of the network, death/alive of the information providing computer, or the load of the information providing computer. These values are updated regularly by the condition management unit 32, or when the event happens to occur in order that these values continuously becomes the latest values. The service management unit 4 will changes the service to be provided in accordance with these condition variables. For example, in the case that the weather is rain, it is possible to execute such a process operation that a ticket available only for today of an outdoor event is not recommendable. When the load on the information providing computer is increased, the service providing process is limited on the side of the service providing computer 2, so that the load on the information providing computer can be lowered. Furthermore, when the load of a specific service of the information providing computer is increased, the information providing computer can issue such a notification that the acceptance of this specific service is temporarily refused. Furthermore, the information providing computer may accept only the process requested by the gold member with a limitation. In such a case that the information providing computer A stops the function thereof, it is possible to execute the process operation such that the information acquiring request is not issued to the information providing computer A. The condition variable stored in the condition table 42 are evaluated by the condition management unit 32 and the composite element conversion unit 40 to realize the above-described process.

FIG. 5 represents an example of the static discriminating information table 43. The static discriminating information table 43 stores either fixed information or semi-fixed information, which depends upon the end user and the information acquiring computers 11, 12, ..., 1m, every end user. As the information related to the end user, there are a member level, a sex, an occupation, and purchase record of specific goods. As the information related to the information acquiring computers 11, 12, 000, 1m, there are a terminal function, a hardware arrangement, and a software arrangement. As the information related to the communication, there are a communication starting place, a protocol, and so on. For instance, in such a case that there are a general member and a gold member as a member level, the process is changed, so that it is possible to provide information with a high quality to the gold member. Also, as to a person whose hobby is a travel, it is possible to provide travel information with a priority. Otherwise, it is possible to provide a notification about a higher version of merchandise to the end user who bought this merchandise in the past. Further, it is possible to change the format of the providing information in connection with the function of the information acquiring computers 11, 12, ..., 1m. For example, only text information is provided to the information acquiring computers 11, 12, ..., 1m without the graphic function, and an image is not transmitted. For instance, when the end user makes up a contrast with the service providing computer 2, the information related to the end user among the static discriminating information is inputted in questionnaires format. Also, the information related to the end user may be requested from the service providing computer 2 to be inputted as information required when the end user accepts a certain service. A variable called as a purchase item is extracted by analyzing the service utilization history table 44 by the history analyzing unit 34, and then is stored in the static discriminating information table 43. The information related to the information acquiring computers 11, 12, . . . , 1m is judged by a terminal function code and a terminal information code, which are contained in the data from the end user. The information related to the communication is defined when the connection with the information acquiring computers 11, 12, . . . , 1m is established. The variables stored in the static discriminating information table 43 are evaluated by the individual management unit 33 and the composite element conversion unit 40, so that the above-described process is realized.

FIG. 6 represents an example of the service utilization history table 44. In the service utilization history table 44, the information is stored with respect to each of the users in unit of services utilized by the end users. The service utilization history table 44 owns fields named as a service sort, a utilization date/time, detailed information, a reservation number, and a name of an information providing computer. Every time the end user utilizes a certain service, the above-described information for specifying this service are stored by the individual management unit 33.

A service sort is a top category of a service provided by the service providing computer 2. The information for specifying a concrete service content of this service sort is stored in the detailed information field. For example, when the service sort corresponds to book selling, the detailed information corresponds to the ISBN number of the purchased book. When the service sort corresponds to an overseas travel, the detailed information corresponds to a summary of a travel, a schedule, a fee, a used air line, and a used hotel, which are stored. The formats of the detailed information field are different from each other, depending on the respective service sorts.

Both the reservation number and the information providing computer name are utilized as follows. In the case that after making a reservation, the end user cancels this reservation, the service providing computer 2 again accesses the information providing computer and specifies the service reserved by the reservation number so as to cancel this reservation.

The information stored in the service utilization history table 44 is analyzed by the history analysis unit 34, such information that a preset specific service has been utilized is stored in the static discriminating information table 43, and then the travel schedule and the event schedule such as a concert and a play are stored into the schedule table. The information stored in the service utilization history table 44 is evaluated by the individual management unit 33 and the composite element conversion unit 40.

FIG. 7 shows an example of the service utilization trend table 45. The service utilization trend table 45 stores the statistics information related to the utilization frequencies with respect to the constructural elements of the services. In this case, as the variables, the service utilization tread table 45 employs a service sort, an overseas travel/term, and an overseas travel/place/fee range, which are the conditions for specifying the service.

As the service sort corresponding to the top category, there are the overseas travel, the domestic travel, and the book selling. This service sort represents that the end user utilizes the overseas travels 5 times, the domestic travel 1 time, and the book selling 2 times. The meaning of "overseas travel" in the overseas travel/term describes the subsequent term, and indicates the travel term when the overseas travel service is utilized. Since the adjective such as "overseas travel" is added, the overseas travel/term can be discriminated from the domestic travel term and other terms. Since a term contains an infinite values in unit of day, this case, this term is classified into three stages such as a short term (1 day), a medium term (2 days to 6 days), a long term (more than 7 days). As described above, the variables having continuous values, for example, price and time may be classified into the finite number of categories by providing a plurality of boundaries.

Such a fact that the times of the variable values stored in the service utilization trend table 45 are larger than other values implies that the side of the service indicated by this value was utilized in the past. As a consequence, it is predictable that there are large possibilities that this service will be utilized in future. Therefore, since this service is positively proposed to the end user, the end user can have great satisfaction. The times of the variable values stored in the service utilization trend table 45 are counted by the individual management unit 33 when the use of the service is defined. The variable values stored in the service utilization trend table 45 are evaluated by the individual management unit 33 and the composite element conversion unit 40. As described above, the judgement is carried out based upon a simple large/small relationship, and further based on more complex logic, so that the above-described process can be realized.

FIG. 8 indicates an example of the system utilization history table 46. The system utilization history table 46 stores historical information of system utilizations equal to historical information, as viewed from the side other than the service. There are all connection times (log-in times), charging conditions, and credit utilization conditions. The all connection times (log-in times) are stored, or updated by the individual management unit 33 when the log-in is performed. The charging conditions are stored, or updated by the individual management unit 33 when the charging process is executed. The credit utilization conditions are stored, or updated by the individual management unit 33 when the notifications are regularly received from the credit card firm. It is possible to execute such a process for not accepting a further payment by a credit card, taking account of a charged amount and credit utilization conditions. The variable values stored in the system utilization history table 46 are evaluated by the individual management unit 33 and the composite element conversion unit 40.

Figure 9:
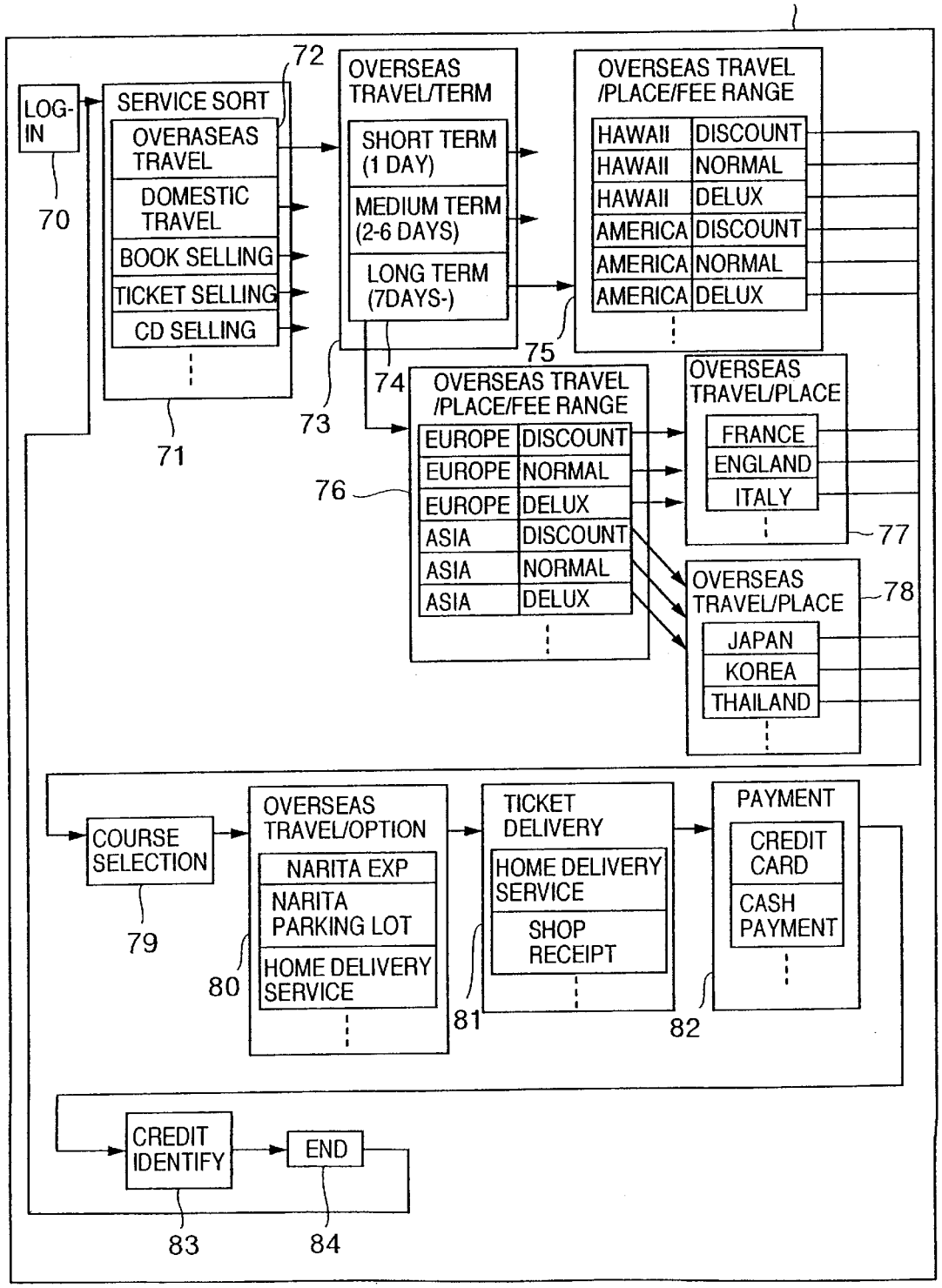
FIG. 9 is a conceptional diagram for denoting an example of relationship among application programs.

FIG. 9 represents a concept of an application programs relationship diagram 47. The application prorams relationship program 47 expresses relationships mong execution sequences and branches of the application rograms 415, 425, . . . , 4p5. The service management unit 4 determines the application programs 415, 425, . . . , 4p5 which will be subsequently executed with reference to this diagram.

Now, an example of a flow of service provision will be explained.

A log-in program 70 corresponds to a log-in application program.

A service sort determining program 71 is an application program for determining the service sort equal to the top category. The service sort is a variable capable of having values, namely, overseas travel, domestic travel, book selling, ticket selling, and CD selling. In the service sort determining program 71, the service sort most suitable to the end user is proposed based on the advice of the service management unit 4. Now, when an overseas travel 72 is selected, an over-seas/term decision 73 is subsequently executed. A period most suitable to the end user among the overseas travel terms is proposed based on the advice of the service management unit 4. Any one of the short term (1 day), the medium term (2 days to 6 days), and the long term (more than 7 days) is selected. When the long term (more than 7 days) is selected, either an overseas travel/place/fee range determining program 75 or an overseas travel/region/fee range determining program 76 is executed. The overseas travel/place/fee range determining program 75 may determine the proposed overseas travel by combining the place (mainly, country) with the fee range. The overseas travel/region/fee range determining program 76 determines the proposed overseas travel among candidates thereof by combining the region (plural countries, continental) with the fee range.

Since the place owns a high limitation than the region, the more discriminatable information can be provided when the proposal is made by the overseas travel/place/fee range determining program 75. However, as to the place, in the case that no specific feature cannot be obtained from the past history, there is less reason to propose the proper place. Accordingly, there is a risk that satisfaction of the end user is lowered. To the contrary, when the history is observed in view of another point (region) instead of the place, there is a specific feature. In this case, the proposal is made from the classification of the overseas travel/region/fee range determining program 76. As one example, in such a case that the end user has traveled the European countries, even when there cords for the individual countries are made, no specific feature is present. However, if the records are made for the regions such as Europe and Asia, then it can be understood that the end user owns the many travel experiences in the Europe. Then, since the European travel is proposed in this case, it is possible to provide the information discriminatable to the respective end users.

In the overseas travel/region/fee range determining program 76, when any one of the Europe discount, the Europe normal, and the Europe luxurious travels is selected, a determination is made of the place belonging to the Europe in the overseas travel/place determining program 77. Similarly, in the case that any one of the Asia discount, the Asia normal, and the Asia luxurious travels in the overseas travel/region/fee range determining program 76, a decision is made of the place belonging to the Asia in the overseas travel/place determining program 78. The overseas travel/place determining program 77 and the overseas travel/place determining program 78 are application programs for determining the places related to the overseas travels, the selection branches of which are limited to the places belonging to the Europe and Asia, respectively. The difference between these two application programs is such that proposal restriction information is transferred as the argument from the service management unit 4 to the application program.

The next course selecting program 79 is executed in such a manner that although the place, the fee range, and the term are limited, since the travel starting data is unclear, the end user is urged to enter the date. Otherwise, the end user sets the date within the coming two or three months and sets the concrete plan, and the service management unit 4 is required to transmit the information providing computer in order to check the elements for constituting this plan, for instance, empty information of an air line and a hotel. When the empty information is collected, the travel plan made by combining one combination among them is proposed to the end user. When the end user agree with this proposed plan, the service management unit 4 is again required to transmit the reservation request in order to reserve the air line and the hotel.

An overseas travel/option determining program 80 determines various options, for instance, a reservation for a domestic transportation means up to an air port, a reservation for a parking lot near air port, or a reservation for a baggage delivery service to air port.

A ticket delivery determining program 81 is to determine a method for delivering tickets and the like such as an air ticket.

A payment determining program 82 determines a payment way. Here, when a payment by a credit card is selected, a credit investigation is carried out by a credit investigating program 83 as to whether or not a payment among exceeds an allowable amount of this credit card owned by the end user, depending upon the payment amount.

The foregoing descriptions describes one example of the selling service for the overseas travel. When the end user can agree with all of the decision items in an end program 84, the service utilization is defined, and the process operation for storing the history and the like into the proper table is executed by the service management unit 4.

As previously explained, the service management unit 4 conducts the application programs 415, 425, . . . , 4p5 which should be subsequently executed from the application programs relationship diagram based upon an application code, an item code, and a selection code contained in the data received from the information acquiring computers 11, 12, . . . , 1m. Now, the above-described application code corresponds to a code for specifying such an application program which has transmitted the message to this information acquiring computers 11, 12, . . . , 1m in the previous time. Also, the item code is a code for specifying a variable value selected by the end user. The selection code is a code for indicating whether or not the end user can agree with the proposal of the application programs 41, 42, . . . , 4p. That is, if the selection code is YES, then this selection code indicates that the proposal of the application programs 415, 425, . . . , 4p5 can be agreed. If the selection code is NO, then this selection code indicates only such a fact of "disagree". When a value is set to the item code, the selection code indicates that not only the end user could not agree with the proposal, but also has selected other values. Also the service management unit 4 determines which program should be executed after the overseas travel/term determining program 73 based upon the past historical information, i.e., the overseas/place/fee range determining program 75 and the overseas/region/fee range determining program 76.

FIG. 10 shows an example of the selection variable temporal storage table 48. The selection variable temporal storage table 48 temporarily stores a value of a variable every time the end user agrees with this variable value proposed by the application program to this end user. The value of the variable to be stored can be judged based on the application code, selection item code, and selection code of the request received from the information acquiring computers 11, 12, . . . , 1m.

FIG. 11 shows an example of the request conversion management table 49. The request conversion management table 49 is used in such a case that when an information acquiring request is issued from the application programs 415, 425, . . . , 4p5 to the service management unit 4, a decision is made as to whether or not the information acquiring request is transmitted to any one of the information providing computers 21, 22, . . . , 2n. In other words, to satisfy the information acquiring request issued from the application programs 415, 425, . . . , 4p5, such information is set to the request conversion management table 49 by that which information providing computer is connectable. For example, the request conversion management table 49 indicated in FIG. 11 stores the request codes indicative of the sorts of the requests issued from the application programs 415, 425, . . . , 4p5, and also the names of the information providing computers 21, 22, . . . , 2n to be connected with respect to each of the user IDs. In this table, "air_tkt-NRT-LAX" set as the request code implies that vacuous seat information of air tickets between NARITA and Los Angeles is retrieved. To this setting, a user 100 is instructed to issue the request to three air lines of JL, NH, and UA. Also, another user 101 is instructed to issue the request only to the air line of UA. It should be noted that symbols JL, NH, UA indicate abbreviated symbols of the relevant air lines. Such a difference is set to each of the users based upon the quality of the request from the end user, the condition when the request is issued, and the discriminating information. Symbol "default" indicated in the user ID column implies the information providing computers 21, 22, . . . , 2n applied to other users not set to this table. It should also be noted that symbol "all" indicated in the user ID column represents all of the information providing computers 21, 22, . . . , 2n retrievable to the request code "air_tkt-NRT-LAX". For instance, a user 102 selects "all", and thus issues a request to all of the information providing computers 21, 22, . . . , 2n.

FIG. 12 shows an example of an information acquiring request record table 50. The information acquiring request record table 50 stores the names of the information providing computers 21, 22, . . . , 2n and the request code names when the service management unit 4 transmits the information acquiring request to the information providing computers 21, 22, . . . , 2n. To time-out time, time up to time-out is set. This time is monitored by a timer 8. When it becomes time-out time, the service management unit 4 produces a time-out event. Every time a response to the information acquiring request is received from the information providing computers 21, 22, . . . , 2n, the service management unit 4 deletes the name of the relevant information providing computers 21, 22, . . . , 2n of the information acquiring request record table 50. As a result, the following items can be grasped, namely the number of users who presently issue the information acquiring requests, the number of users with respect to each of services provided by the service processing computer 2, the number of users with respect to each of the information providing computers, and then the number of users with respect to each of services of the information providing computers. The service management unit 4 monitors these numbers, so that the service management unit 4 can grasp such a fact that the information acquiring requests are concentrated to a specific information providing computer, and a specific service of the specific information providing computer. In this case, the information acquiring requests transferred to the relevant information providing computer and the service provided by the information providing computer are temporarily stopped, so that the loads can be lowered.

FIG. 13 indicates an information providing computer management table 51. The information providing computer management table 51 stores information required to be connected to the information providing computers 21, 22, . . . , 2n, for example, a name of an information providing computer, an address of a server thereof, communication protocol, and transmission/reception formats. For instance, in FIG. 13, symbol "JL" is one of the information providing computers of the air line. An address of this server is "102.44.44.175". The communication protocol is "http". As to the protocol http, for example, the specification of this protocol is described in "Hypertext Transfer Protocol—HTTP/1.0" corresponding to INTERNET DRAFF by HTTP Working Group. In accordance with the protocol designated in this case, the content designated by the transmission format may be set into the data region of the message. It could be seen from this drawing that the transmission format is "d, f, t, n, w, c" as to the information providing computer "JL". In this case, symbol "d" indicates a departure day, symbol "f" shows a departure place, symbol "t" is a destination, symbol "n" indicates the number of traveler, symbol "w" shows either a one-way ticket or a round-trip ticket, and symbol "c" represents a seat class (economy class, or business class, or first class). The reception format indicates a content of a message received from an information providing computer. Similarly, paying an attention to the information providing computer "JL", the content thereof is "result, no, price, aircraft, dp-time". In this case, symbol "result" indicates as to whether or not a vacuous seat is left, symbol "no" shows a flight name, symbol "price" represents a price, symbol "aircraft" is a model of an aircraft, symbol "dp-time" shows departure time.

FIG. 14 shows an example of a reception data temporal storage table 52. The reception data temporal storage table 52 is a table for temporarily storing responses issued from the information providing computers 21, 22, . . . , 2n. The reception data temporal storage table 52 is formed by the service management unit 4. FIG. 14 shows an example of a reference result about vacuous seat information of an air ticket. This table is such an example that a flight name, a price of an air ticket, departure time, and a model of an aircraft are contained in the response data provided from the information providing computer. Since the content of the response data is different from each other, depending on the request code, the format of the reception data temporal storage table 52 is also different from each other with respect to each of the request codes.

FIG. 15 shows an example of an acquired information integration management table 53. The acquired information integration management table 53 provides a selection logic when one of the response data stored in the reception data temporal storage table 52 is selected and then is transferred to the application programs 415, 425, . . . , 4p5. In the acquired information integration management table 53, the logic employed for the respective end users in response to the request codes, namely the information selection rules transmitted from a plurality of information providing computers 21, 22, . . . , 2n are stored. For example, the acquired information integration management table 53 shown in FIG. 15 implies as follows: "response data of JL has priority to user 100", "only UA is selected to user 101", "cheapest ticket is selected to user 102", and "departure time in evening (after 4:00 PM) owns priority to user 103". These conditions are set to each of the users based on the quality of the request from the end user, the condition during request issuing, and the discriminating information.

Figure 16:
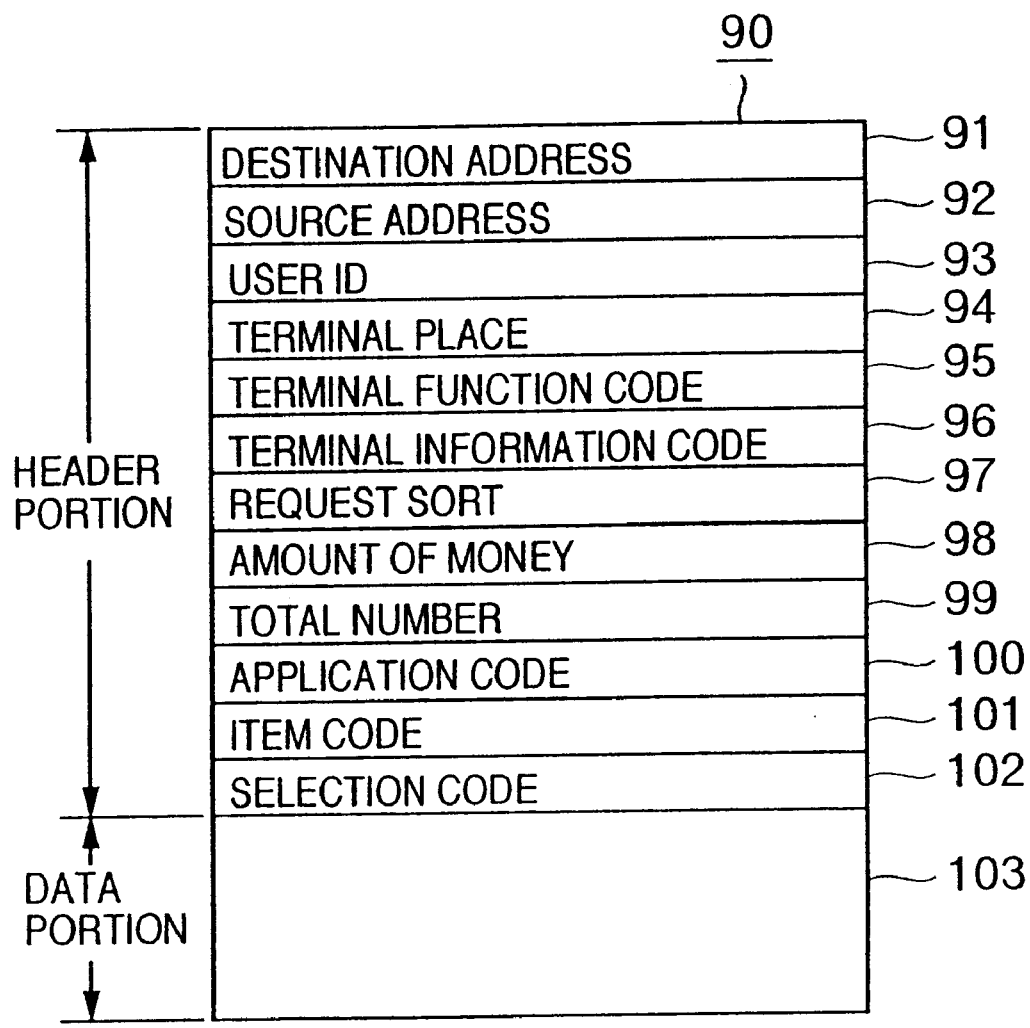
FIG. 16 is a format diagram of a message transmitted from an information acquiring computer to a service providing computer.

FIG. 16 is a format diagram of a message 90 transmitted from the information acquiring computers 11, 12, . . . , 1m to the service providing computer 2. The message 90 contains a destination address 91, a source address 92, a user ID 93, a terminal place 94, a terminal function code 95, a terminal information code 96, a request sort 97, an amount of money 98, a total number 99, an application code 100 item code 101, a selection code 102, and a data portion 103. In this case, the user ID93 is ID of an end user who uses the information acquiring computers 11, 12, . . . , 1m. The terminal place 94 corresponds to information for specifying the present place of the information acquiring computers 11, 12, . . . , 1m. The terminal function code 95 is a code for defining the functions of the information acquiring computers 11, 12, . . . , 1m. The terminal information code 96 is a code for defining the structural information of the hardwares/softwares of the information acquiring computers 11, 12, . . . , 1m. The request sort 97 corresponds to information indicative of the request sort of the end user. The amount of money 98 corresponds to information for indicating the money amount of the request from the end user. The total number 99 corresponds to information for representing a total number of requests from the end user. The application code 100 is a code for defining such an application program which has transmitted the message to this information acquiring computer 11, 12, . . . , 1m during the previous operation. The item code 101 is a code for defining a value of a variable selected by an end user. Also, the selection code 102 is a code for representing as to whether or not the end user can agree with the proposal of the application programs 415, 425, . . . , 4p5. The content of the data portion may depend upon the application programs 415, 425, . . . , 4p5.

Figure 17:
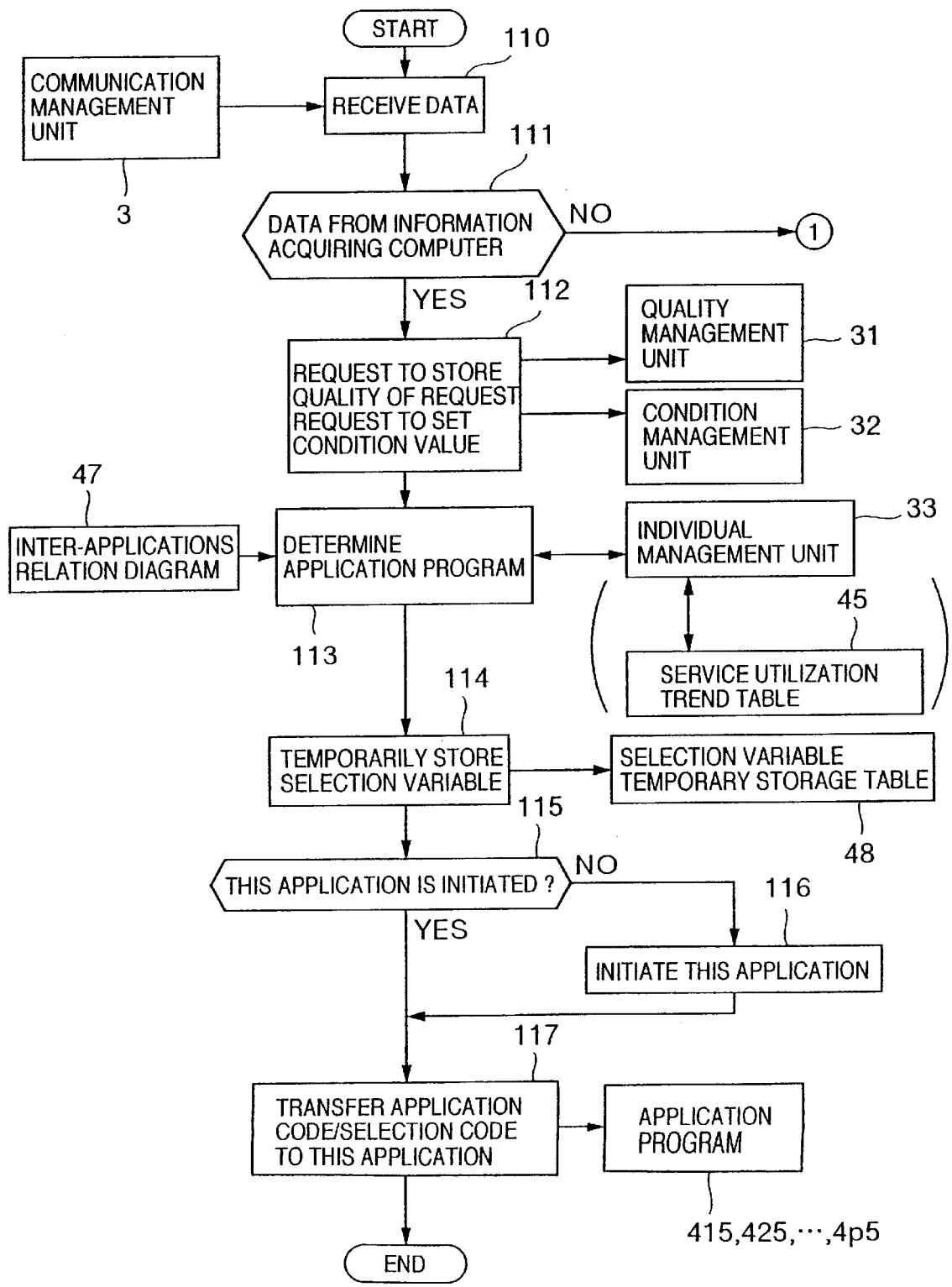
FIG. 17 is a process flow diagram for describing operations when a message is received from a communication management unit in an execution management unit.

FIG. 17 is a flow chart for showing a process flow when the execution management unit 30 receives the messages from the information acquiring computers 11, 12, . . . , 1m.

At this time, the process operations of the execution management unit 30 are mainly arranged by the below-mentioned process operations (1) to (8):

(1). A message is received from the communication management unit 3 (step 110).

(2). In a process 110, a judgement is made as to whether or not the message received from the communication management unit 3 corresponds to the message from the information acquiring computers 11, 12, . . . , 1m (step 111). If the message is transmitted from the information acquiring computers 11, 12, . . . , 1m, the process operation is advanced to a step 112. If No, then this message corresponds to another message from the information providing computers 21, 22, . . . , 2n. Accordingly, the process operation is advanced to a process flow executed when the message from the information providing computers 21, 22, . . . , 2n is received (will be discussed later).

(3). The application code 100, the item code 101, and the selection code 102 are derived from the received message, and are transferred to the quality management unit 31 so as to be stored in the quality table 41. The request sort 97, the money amount 98, and the total number 99 are transferred to the condition management unit 32, and then are stored in the condition table 42 (step 112).

(4). Referring to the application programs relationship diagram 47, an application program which should be subsequently executed is determined based on the application code 100 (step 113). Now, when the selection code 102 is "No", this implies that the previous proposal of the application program is refused by the end user. Therefore, the same application program as in the previous case is again initiated. In the case that there is a plurality of executable application programs, a calculation is made based on the values of the variables and the logic determined by the confidence degree of recommendation in the individual management unit 33. The variable values are used to recommend the application programs in the higher priority order, which is previously determined in the individual management unit 33. If this confidence degree does not exceed a predetermined threshold value in the individual management unit 33, then a similar process operation is carried out for the application program with the subsequent priority degree. If the confidence degree does not exceed any of the application programs, then a decision is made that the application program having the highest priority degree is initiated. The simplest logic among the logic employed in this case is such that the variable value with the largest time among the variable values stored in the service utilization trend table 45 is recommended, and the confidence degree thereof is a ratio of all counts. When for example, the service utilization trend table 45 shown in FIG. 7 is employed, assuming now that the value of the service sort and the times thereof are given as follows: overseas travel=5 times, domestic travel=1 time, book selling=2 times, and thereafter times=0, then the overseas travel is recommended under confidence degree of $5/8=0.625$.

(5). The values of variables agreed by the end user are stored into the selection variable temporal storage table 48 (step 114).

(6). Next, a check is done as to whether or not the application program to be executed has already been initiated (step 115). If the application program to be executed has already been initiated, then the process operation is advanced to a step 117. If the application program to be executed has not yet been initiated, then the process operation is advanced to a step 116.

(7). The application program is initiated (step 116).

(8). The selection code is transferred to the application program (step 117).

Figure 18:
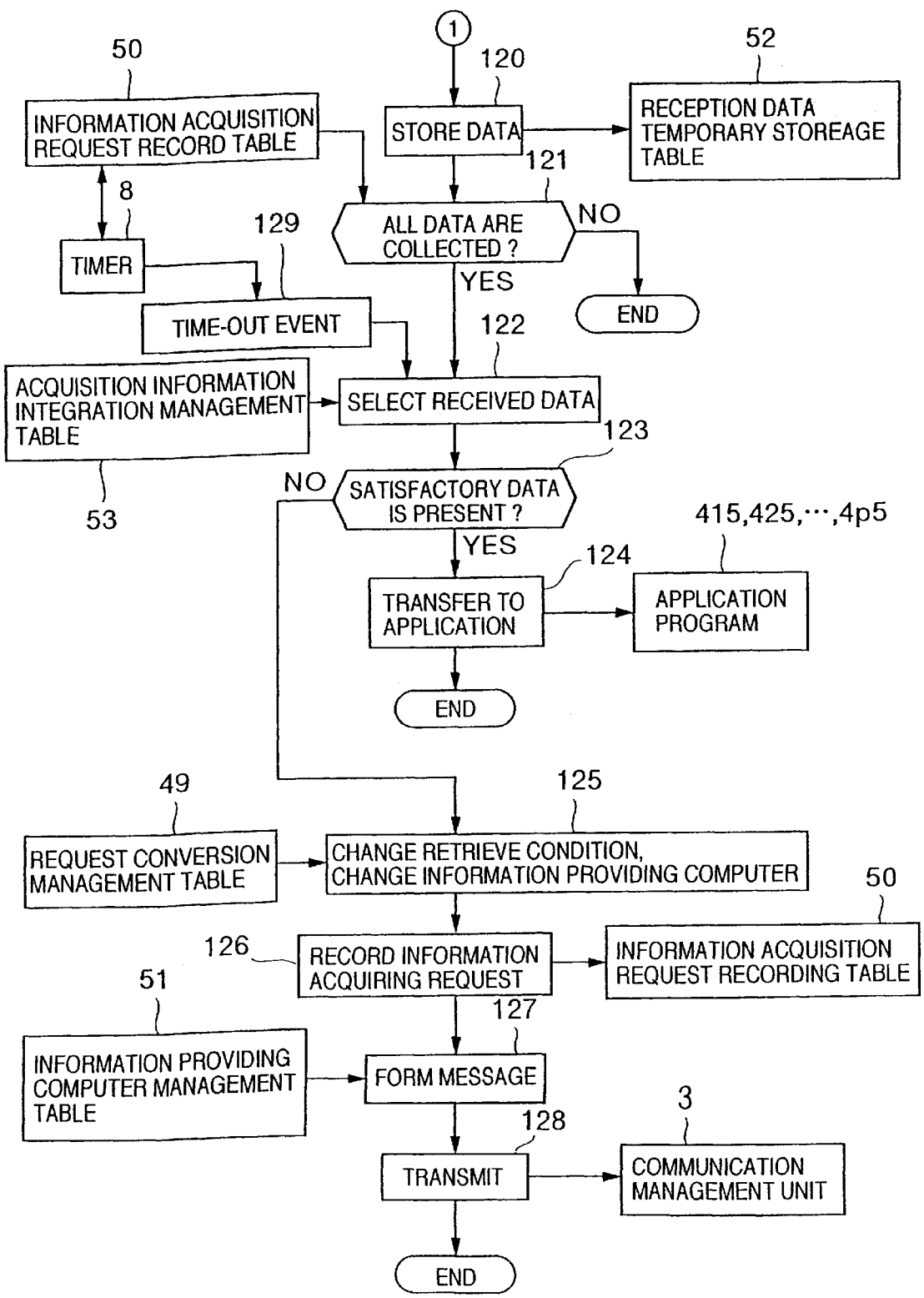
FIG. 18 is a process flow diagram for explaining operations when a message is received from the information providing computer in the execution management unit.

FIG. 18 is a flow chart for representing a process flow operation when the execution management unit 30 receives the message from the information providing computers 21, 22, . . . , 2n. The operations of the execution management unit 30 contain the following processes (9) to (17):

(9). The reception data is stored in the reception data temporal storage table 52 (step 120).

(10). Referring to the information acquiring request record table 50, a confirmation is made as to whether or not all responses of the information acquiring requests have been returned. If there is a message which has not yet been returned, then the process operation is accomplished. When all responses of the information acquiring requests have been returned, the process operation is advanced to a process operation 122 (step 121).

(11). Referring to the acquision information integration management table 53, the selection rules for the respective uses are applied, so that one of the reception data is selected (step 122). On the other hand, the time-out time for the respective requests, stored in the information acquisition request record table 50 is monitored by the timer 8. When it becomes the time-out time, the timer 8 produce a time-out event 129. The time-out event 129 initiates a step 122. As a consequence, at the step 122, even when all of the information acquisition requests are not returned, when it becomes the time-out time, the selection is made of only the received data.

(12). When the information satisfied by the application program is obtained by the selection at the step 122, the process operation is advanced to a step 124. If such information is not obtained, then the process operation is advanced to a step 125 (step 123).

(13). The selected information is transferred to the application program, and the process operation is ended (step 124).

(14). Referring to the request conversion management table 49, the information providing computer is changed into another computer (step 125). For instance, the information providing computer is changed into all of the information providing computers which have been registered as "all" in the request conversion management table 49. Otherwise, the preceding retrieve condition is changed by the fixed logic. As an example of this fixed logic, for example, if an air ticket is reserved, then a departure date is shifted. A seat class is changed.

(15). The determined information of the information providing computer is recorded on an information acquiring request recording table 50 (step 126).

(16). Referring to an information providing computer management table 51, a message is formed in accordance with the transmission format with respect to the respective information providing computers for requesting the information acquisition. It is set in such a manner that the message is transmitted to a correct address in a correct protocol (step 127).

(17). A transmission is requested to the communication management unit 3 (step 128).

Figure 19:
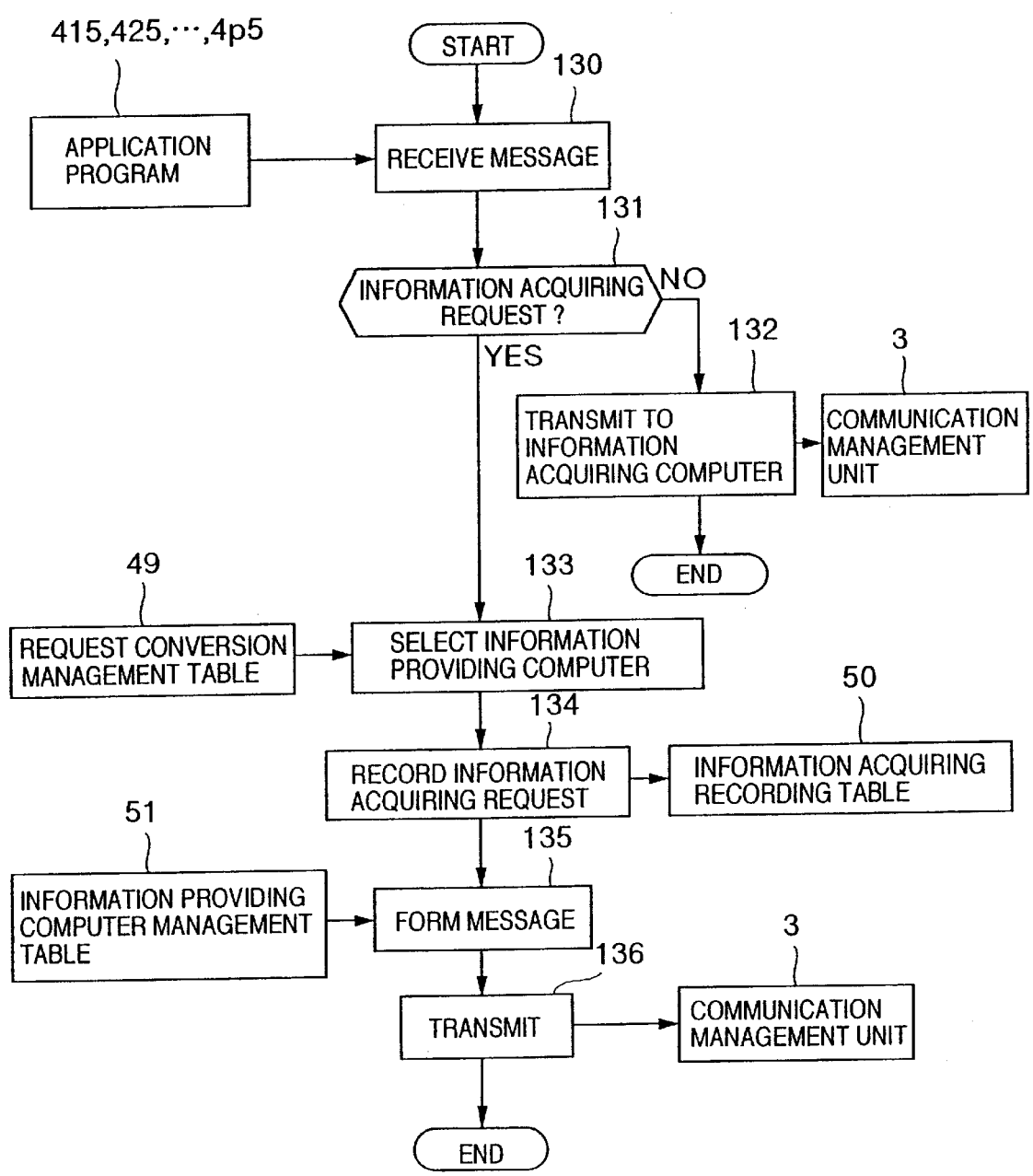
FIG. 19 is a process flow diagram for describing operations when a message is received from the application program in the execution management unit.

FIG. 19 is a flow chart for showing a process flow operation executed when the execution management unit 30 receives the messages from the application programs 415, 425, . . . , 4p5. In this case, the operations of the execution management unit 30 contain the following process operations (1) to (7):

(1). A message is received from the application programs 415, 425, . . . , 4p5 (step 130).

(2). If the received message is the information acquiring request, then the process operation is advanced to a step 133. If the received message is not the information acquiring request, then since this message is a message to be transmitted to the information acquiring computers 11, 12, . . . , 1m, the process operation is advanced to a step 132 (step 131).

(3). The communication management unit 3 is required to transmit the received message to the information acquiring computers 11, 12, . . . , 1m, and then this process operation is ended (step 132).

(4). Referring to the request conversion management table 49, a selection is made of an information providing computer to which the information acquisition is requested (step 133).

(5). The information of the selected information providing computer is recorded on the information acquiring request recording table 50 (step 134).

(6). Referring to an information providing computer management table 51, a message is formed in accordance with a transmission format with respect to each of the information providing computers for requesting the information acquisition. At this time, it is set to transmit the message at a correct address in a correct protocol (step 135).

(7). A transmission is requested for the communication management unit 3 (step 136).

Now, a description will be made of functions of other major portions.

First, a process operation of an individual management unit 33. The individual management unit 33 counts up the time value of the corresponding variable value of the service utilization trend table 45 based on the selection variable stored in the selection variable temporal storage table 48 when the service has been provided to the end user. To reflect the information of the selection variable temporal storage table 48 to the service utilization trend table 45, the individual management unit 33 executes the below-mentioned two process operations. As the first process operation, referring to a variable involving relationship table 54 shown in FIG. 20, it is assumed that the values of involving destination corresponding to the values of selected involving original are selected between the variables having the implication relationship. For example, a variable of "overseas travel/place" is equal to a destination place (mainly, countries) of the overseas travel. Another variable of "overseas travel/region" is to express destination place of the overseas travel in unit of continental. Since a place of England is involved in the Europe, when the value of "overseas travel/place" is England, the value of "overseas travel/region" is set to the Europe. That is, since the application program is branched, there is an application program not executed while executing the application program. The variable of such an application program is tried to be counted up. When "overseas travel/region" is selected as the Europe, and also "overseas travel/place" is not selected at all, it is assumed that all of the places corresponding to the Europe have been selected. As the second process, referring to a variable combination table 55 shown in FIG. 21, the values between the variables having the combination relationship are again set. For instance, when the variable of "overseas travel/place/fee range" is equal to "France discount", the "overseas travel/place" is France, and the "overseas travel/fee range" is selected as "discount". Conversely, this process is applied to the reverse case.

Also, the individual management unit 33 converts the value of the static discriminating information table 43 based upon the conversion logic stored in the static discriminating information conversion logic storage unit 38. The conversion result is stored in an action management table 56 shown in FIG. 22. FIG. 23 shows a static discriminating information-to-action corresponding table equal to an example of the conversion logic stored in the static discriminating information conversion logic storage unit 38. The static discriminating information-to-action corresponding table represents, namely, a rule how to convert the static discriminating information into the action variable. In FIG. 23, the first logic line indicates that when the member level is the gold level, the value of the ticket delivery variable is set to a free charge. The third logic line implies that when the sex is the male, it is set to "message 1=on". The message 1 variable is set, so that the application programs 415, 425, . . . , 4p5 provides a specific message only to the males. Also, since a valid term is set to this action, when the valid term expires, this action is erased by the static discriminating information conversion logic storage unit 38. Furthermore, as indicated in the fifth line, if the terminal function variable is "text-only", then it is set to "output=text-only". As a result, when the information is transmitted to the information acquiring computers 11, 12, . . . , 1m, the information can be constructed of only the character information format. Similarly, if the terminal function is "no-movie", then it is set as "output=no-movie", and it is possible not to transmit the moving picture information.

Furthermore, referring to the conversion logic stored in the history conversion logic storage unit 37, the individual management unit 33 converts the value of the service utilization history table 44, the value of the service utilization trend table 45, and the value of the system utilization history table 46, and then stores the converted values into the action management table 56. The history conversion logic storage unit 37 stores a rule how to convert the history information into the action variable. For example, when the values of the variables of the service sorts stored in the service utilization trend table 45 shown in FIG. 7 are stored in the action management table 56 in the order of large times, as represented in FIG. 22, the overseas travel is stored at the value 1 of the service sort, the book selling is stored at the value 2 thereof, and the domestic travel is stored at the value 3 thereof in the order of large times. The action management table 56 is the variable to be referred while the application program is executed, which may give influences to the operations of the application program.

Now, according to the present embodiment, storing and analyzing of the information about the history are not carried out with respect to all of the end users, but can be performed only to a specific end user. For example, the previously explained formations and analyses of the service utilization history table 44, the service utilization trend table 45, the system utilization history table 46, and the schedule table 57 are carried out only to such an end user whose member level is gold. Accordingly, cost required to save the information can be reduced. However, to accept a reservation cancel by an end user, the service utilization history table 44 must be formed and stored with respect to all of the end users. As previously explained with reference to FIG. 6, this is because the names of the information providing computers and the reservation numbers required to cancel the reservation have been stored in the service utilization history table 44.

Next, the condition management unit 32 will now be explained. Referring to the conversion logic stored in the condition conversion logic storage unit 36, the condition management unit 32 converts the values of the condition table 42 and stores the converted values to the action management table 56. The condition conversion logic storage unit 36 stores a rule how to convert the condition into an action variable. An action variable implies the variable stored in the action management table 56 which is referred while the application programs 415, 425, . . . , 4p5 are executed. FIG. 24 shows a condition-to-action corresponding table equal to an example of the condition conversion logic. In FIG. 24, when a today variable indicative of a today's date is "01/01" (January 1), it is set to message 10=on. As a result it is possible to send a greeting message of a new year to such a user who is connected to the network on a new year day.

The quality management unit 31 will now be explained. Referring to the quality conversion logic stored in the quality conversion logic storage unit 35, the quality management unit 31 converts the value of the quality table 41 (will be simply referred to as a "quality" in this case), and stores the converted quality into the action management table 56. The quality conversion logic storage unit 35 stores a rule how to convert the quality into the action variable. FIG. 25 indicates a quality-to-action corresponding table equal to one example of the quality conversion logic. The quality-to-action corresponding table indicated in FIG. 25 represents that when the attribute variable of the service is a proposal to purchase an article and also an amount of money exceeds 100,000 yen, a variable "pri" for operating the priority order of the process operation is set to pri=3. As a consequence, the process operation is carried out with a higher priority order than the normal service process operation.

The history analyzing unit 34 will now be explained. The history analyzing unit 34 analyzes the value of the service utilization history table 44, the value of the service utilization trend table 45, and the value of the system utilization history table 46, and then stores the analysis results into the static discriminating information table 43 and the schedule table 57. The information stored into the static discriminating information table 43 is either such information that a user purchases a specific article and a specific service, or static discriminating information of an end user derived from history information. For instance, since such an information that a wordprocessor of a certain maker is purchased is held, when this wordprocessor is up graded, this up grade is quickly reported. Since a ticket of a concert is purchased every week, it is to register such a nature that a user wants a concert. Thus, the information about concerts may be necessarily provided every time the log-in occurs. Information stored in a schedule table 57 shown in FIG. 26 is a schedule related to action of a user. The information concerning action of the user is extracted from the utilization services stored in the service utilization history information 44, and then such a schedule "when", "where", "what" is formed.

The composite element conversion unit 40 will now be explained. Referring to the composite element conversion logic stored in the composite element conversion logic storage 39, the composite element conversion unit 40 converts the values stored in a plurality of tables, and then stores the converted values into the action management table 56. These plural tables are the quality table 41, the condition table 42, the static discriminating information table 43, the service utilization history table 44, the service utilization trend table 45, the system utilization history table 46, and the schedule table 57. The composite element conversion logic implies a rule how to convert the values among a plurality of tables into the action variables. As an example of the composite element conversion logic, the following conversion logic may be conceived. Based upon the static discriminating information such that "a domestic travel is a hobby", the condition such that "today is the beginning of February", and the event information (one sort of condition) such that "the SAPPORO SNOW FESTIVAL is held from the beginning of February", such information is conducted "an end user likes a domestic travel as his hobby, and when the SAPPORO SNOW FESTIVAL is held after one week later, a travel to see the SNOW FESTIVAL is proposed".

The service management unit 4 stores the information received from the information providing computers 21, 22, . . . , 2n into a cache region 58 together with the attribute information required to specify this information, and manages this information. In the case that the information acquiring request is issued from the application program, if the attribute of this information is made coincident with the attribute of the information stored in the cache region 58, the service management unit 4 does not issue the information acquiring request to the information providing computer, but derives the information corresponding thereto from the cache region 58. As a result, both the time required to acquire the information, and the loads given to the network and the information providing computer can be greatly reduced. When the valid term of the owned information expires, the information of the cache region 58 is erased by the service management unit 4. Also, this information is overwritten by newly cached information to be erased.

In response to a request issued from an end user, the service management unit 4 not only can request the information providing computer to acquire the information, but also can request the information providing computer to acquire the information without any request of the end user. This may provide such a firm service that a utilization frequency of a certain service provided by the information providing computer is very high, the services with high possibilities which are required by the end users are previously acquired, so that there is no risk of sold out. Also, the time required to acquire the information can be shortened.

Furthermore, the service management unit 4 owns a journal file 59 for recording transactions related to the communications with the end users, the communications with the information providing computers, and the service executions provided by the service providing computer 2. A service evaluation management unit 60 forms, retrieves, and analyzes the journal file 59. When an error happens to occur, or the information acquiring computer is brought into power down, the service evaluation management unit 60 cancels the transactions, executes the transaction in a half way, or notifies the result to the information acquiring computer after executing the possible process.

Figure 27:
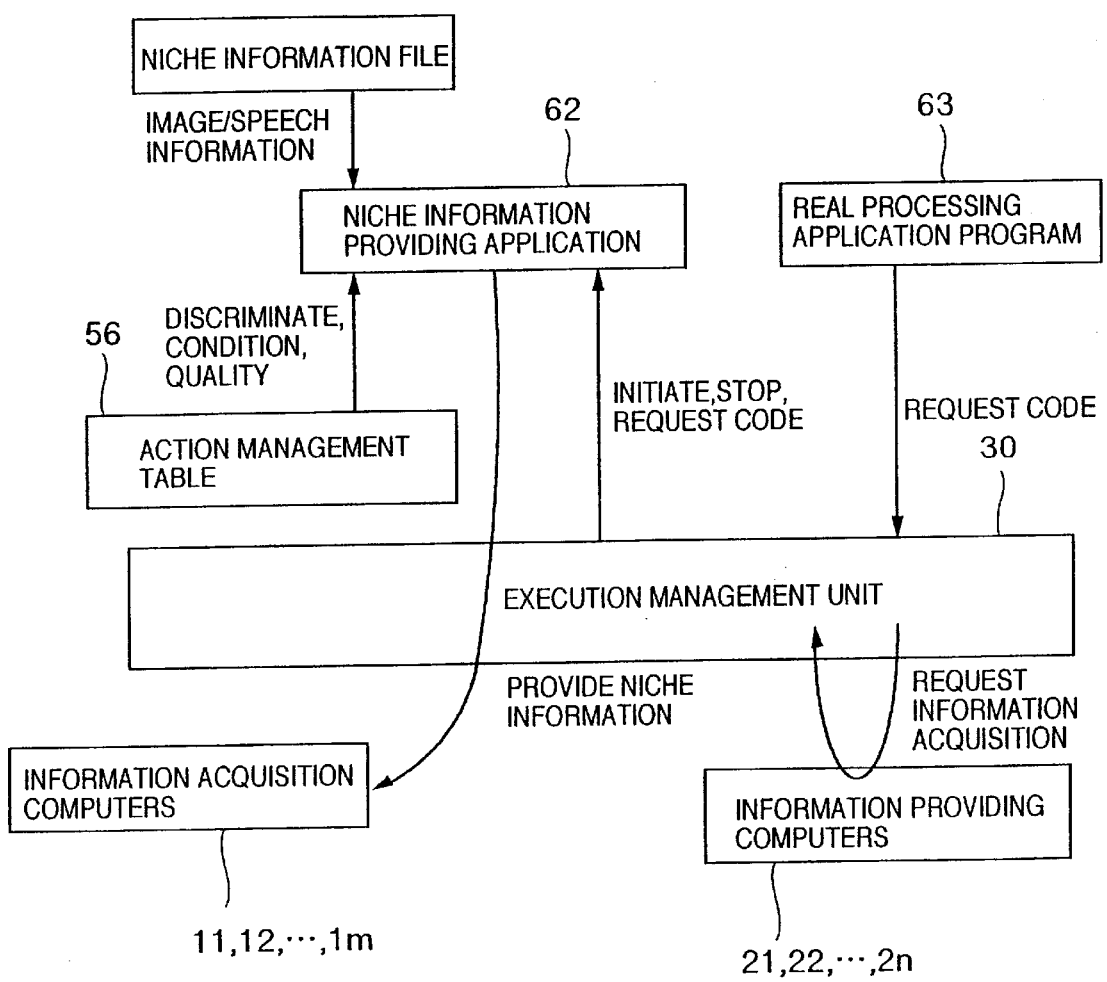
FIG. 27 is an conceptional operation diagram for explaining operations of a niche information supplying application program.

FIG. 27 is a conceptional diagram for explaining operations of the niche information providing application program 62. The niche information providing application program 62 provides information such as a moving picture, a still picture, a speech, and a character to the information acquiring computers 11, 12, . . . , 1m while a real processing application program 63 for providing the previously explained normal services issues the information acquiring request to the information providing computers 21, 22, . . . , 2n, and waits for a response. It should be noted that the niche information providing application program 62 and correspond to one of the application programs 415 to 4p5 contained in the application unit 5, respectively.

The real processing application program 63 issues the information acquiring request to the execution management unit 30. Upon receipt of the information acquiring request, the execution management unit 30 initiates the niche information providing application program 62. At this time both the request code and the user ID of the received information acquiring request are transferred to the niche information providing application program 62.

The niche information providing application program 62 recognizes the discriminating information and the conditions of the user with reference to the action management table 56. Also, the niche information providing application program 62 recognizes the content of the information under acquisition from the request code. Then, the niche information providing application program 62 derives the information such as the moving picture, the still picture, the speech, and the character, which is most suitable to be provided with the end user, from the niche information file 61 based on these discriminating information, conditions, and service content information. Thereafter, the derived information is properly processed, and the execution managing unit 30 is required to transmit the processed information to the information acquiring computers 11, 12, . . . , 1m.

When the execution management unit 30 receives response data from the information providing computer and transfers the response data to the real processing application program 63, the niche information providing application program 62 is stopped. As an example, sightseeing guide information of Italy is provided with a picture and speech with respect to the information acquiring computers 11, 12, . . . , 1m which are processing the reservation of a travel to Italy. Also, a notice from the service providing computer 2 may be provided.

Figure 28:
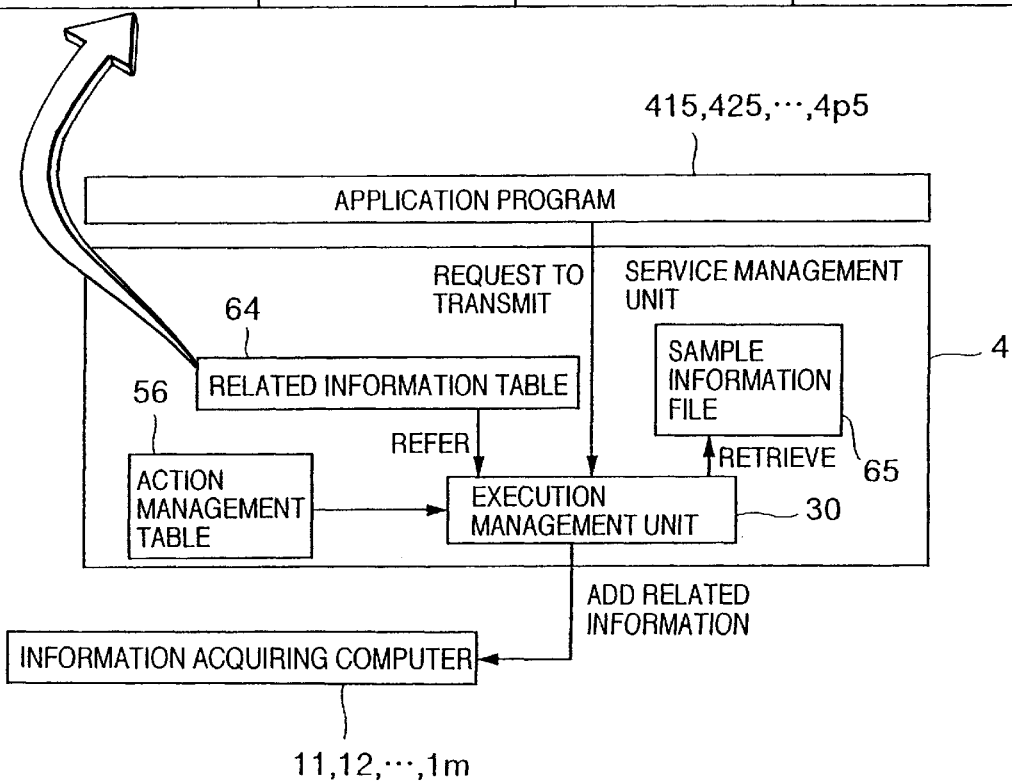
FIG. 28 is an explanatory diagram for explaining a relative information adding function.

FIG. 28 is an explanatory diagram for explaining a relative information adding function. The application programs 415, 425, . . . , 4p5 request the execution management unit 30 to transmit information to the information acquiring computers 11, 12, . . . , 1m. In contrast, the execution management unit 30 refers to a relative information table 64 while using as a key, a provided information code corresponding to a code for specifying a content of this information, and obtains the relative information code for specifying a content of information related to this provided information. For instance, if the provided information code is equal to "a trip to Italy", then as the relative information code, the following codes are obtained, i.e., "a shop capable of servicing delicious pasta", "shopping in Italian language", and "go to Italy to study" etc. Considering the information related to the discriminating information, the condition, and the quality of the end user obtained with reference to the action management table 56, the execution management unit 30 selects one of these relative information codes. Then, while using this relative information code as a key, a sample information file 65 is retrieved to acquire the relative information. This sample information file 65 is such a file for collecting the relative information related to the services provided by the service providing computer 2. The execution management unit 30 integrates the provided information with the relative information and transmits the integrated information to the information acquiring computers 11, 12, . . . , 1m.

Figure 29:
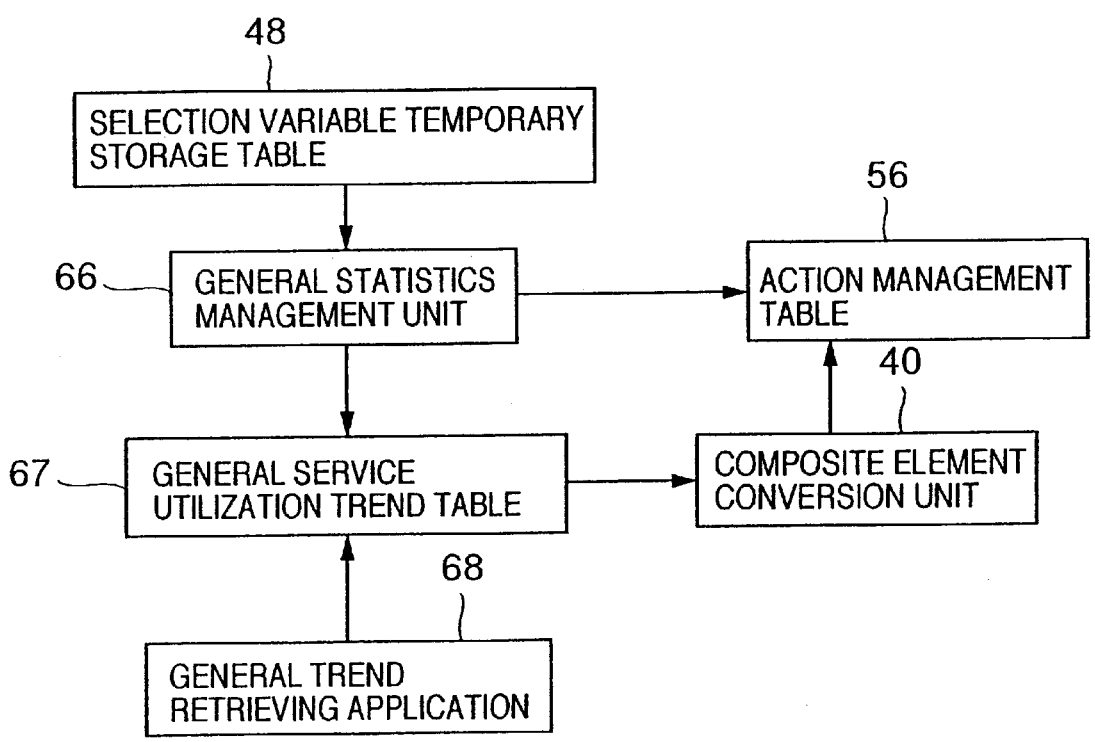
FIG. 29 is an explanatory diagram for explaining a function of a general statistics management unit.

FIG. 29 is an explanatory diagram for explaining operations of a general statistics management unit 66. In this embodiment, general information is statistics information based on the service utilization histories of all of the service users. This information is used when a service is provided with such an end user who does not have personal service utilization trend information. Instead of the personal history, a service is customized based on a general trend by the general statistics information. All of the end users store selected variables into the selection variable temporal storage table 48 in the stages for determining the services. When the service provision is completed, the values stored in the selection variable temporal storage table 48 are stored by the general statistics management unit 66 into a general service utilization trend table 67. The general service utilization trend table 67 stores the statistics information related to utilization frequencies with respect to each of the service structural elements. It should be noted that although the service utilization trend table 45 is counted up individually, in the general service utilization table 67, the content of the same table is counted up by all of the users. The times of the values of the general service utilization trend table 67 are converted by the general statistics management unit 66 and the composite element conversion unit 40, and the converted values are stored in the action management table 56.

A general trend retrieving application program 68 is such an application program which can be used by the end user so as to know the general trend. The end user retrieves the general trend information by using the general trend retrieving application program 68, so that the end user can see popular trends in the fields.

Figure 30:
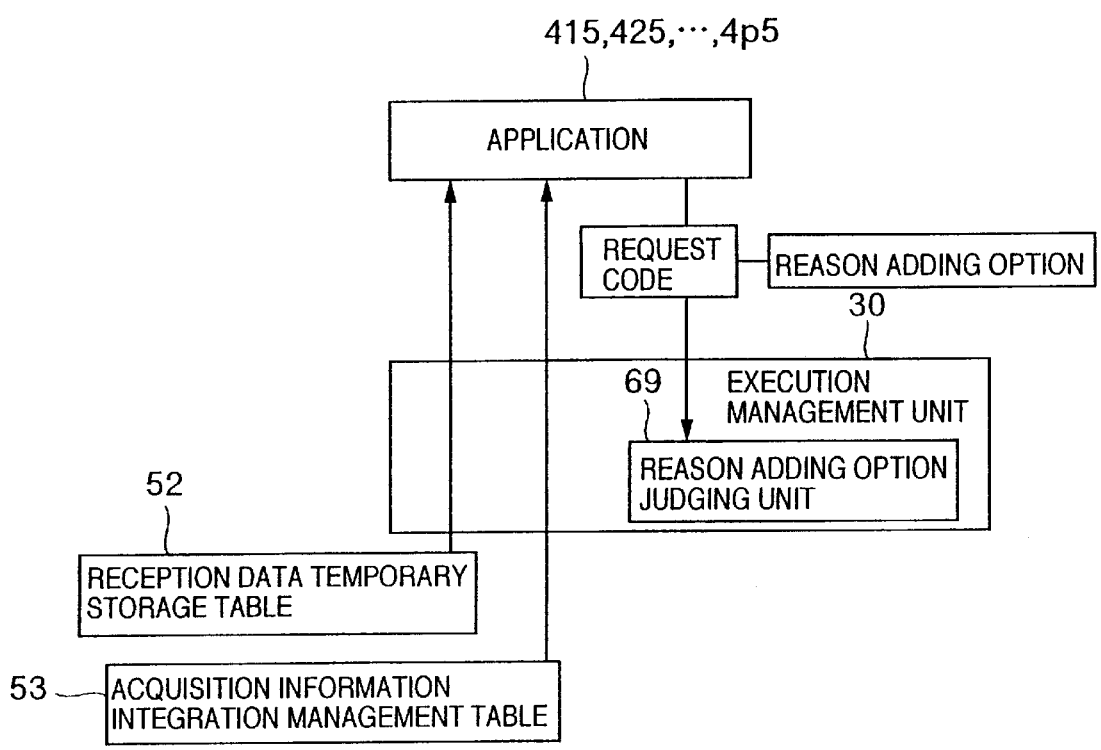
FIG. 30 is an explanatory diagram for explaining a selection reason adding function.

FIG. 30 is an explanatory diagram of a selection reason adding function. A selection reason adding function described in this specification corresponds to a function such that the execution management unit 30 which has received a plurality of information from the information providing computers 21, 22, . . . , 2n selects one reason based upon the acquired information integration management table 53 to provide the selected one reason to the end user. During information acquisition request, the application programs 415, 425, . . . , 4p5 transfers an information acquiring request in which a reason adding option is added to the request code to the execution management unit 30. Such a fact that the reason adding option is added to the request code is sensed by a reason load option judging unit 69 employed in the execution management unit 30. When the execution management unit 30 selects one of the plural information from the information providing computers 21, 22, . . . , 2n and transfers the selected one information to the application programs 415, 425, . . . , 4p5, the selection rules stored in the acquired information integration management table 53 is added to all of the received information stored in the reception data temporal storage table. The application programs 415, 425, . . . , 4p5 shape the transferred selection reason and the information to be selected as a subject, and then transmit the shaped reason/information to the information acquiring computers 11, 12, . . . , 1m.

Figure 31:
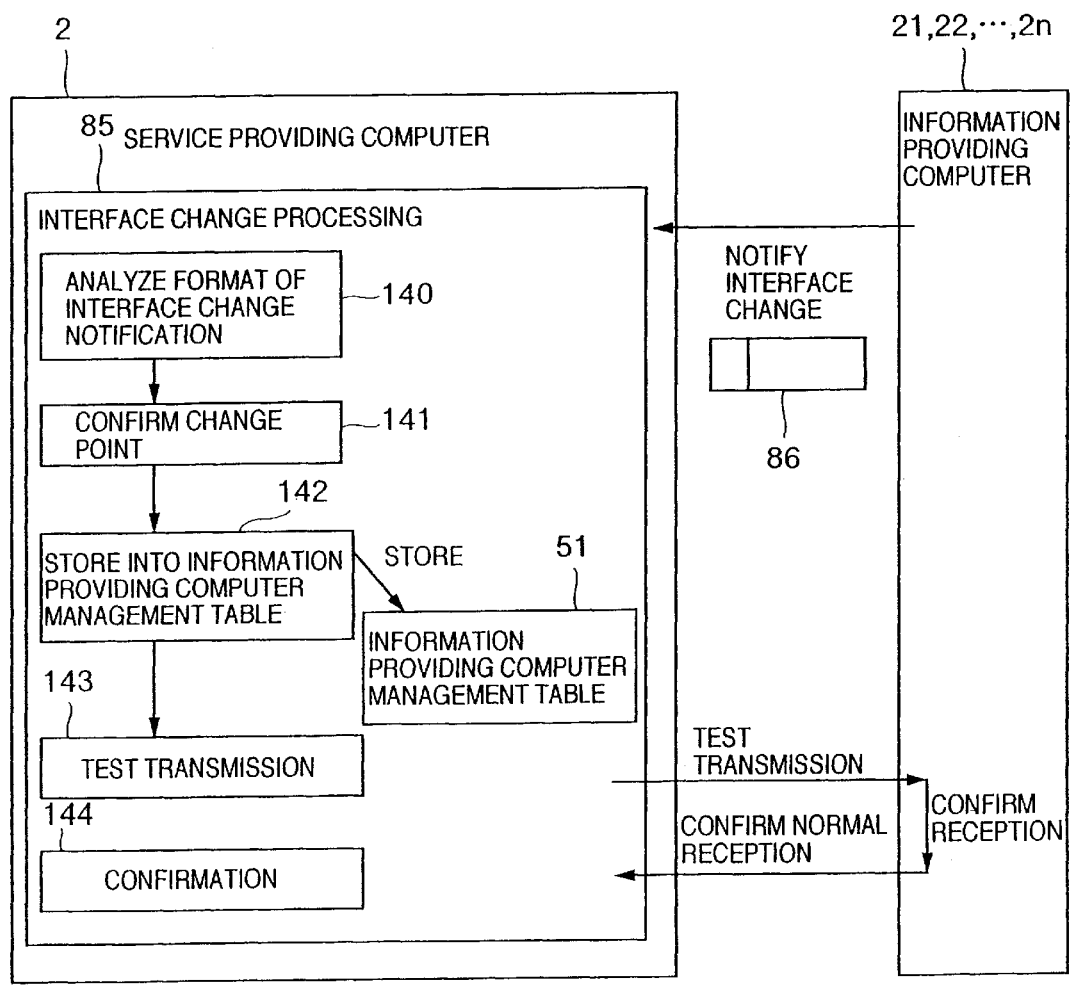
FIG. 31 is an explanatory diagram for explaining a method of changing an interface between the service providing computer and the information providing computer.

FIG. 31 is to explain a method for changing a communication interface between the service providing computer 2 and the information providing computers 21, 22, . . . , 2n. In this embodiment, the communication interface between the service providing computer 2 and the information providing computers 21, 22, . . . , 2n is absorbed on the side of the service providing computer 2. Concretely speaking, in an information providing computer management table 51, a name, an address, protocol, a transmission format, a reception format and the like are defined with respect to each of the information providing computers. As a consequence, in this embodiment, since an interface changing notice is sent from the information providing computers 21, 22, . . . , 2n, a process operation to change the interface between both sides is commenced.

When a message 86 functioning as the interface change notice is received by the service providing computer 2, the execution management 30 initiates the interface changing process operation owned as one function of this execution management unit 30. In FIG. 31, this function is indicated as an interface change processing unit 85. In this interface change processing unit 85, the format of the received interface change notice is first analyzed (process 140). Then, change points (address, protocol, format, service content) of the interface are recognized (process 141). Based on this recognition result, the change points are stored into the information providing computer management table 51 in a process 142. Thereafter, a test transmission for the information providing computer is carried out with a new interface (process 143). Finally, a normal receiving confirmation is received from the information providing computers 21, 22, . . . , 2n, and then the process operation is ended (process 144).

Figure 32:
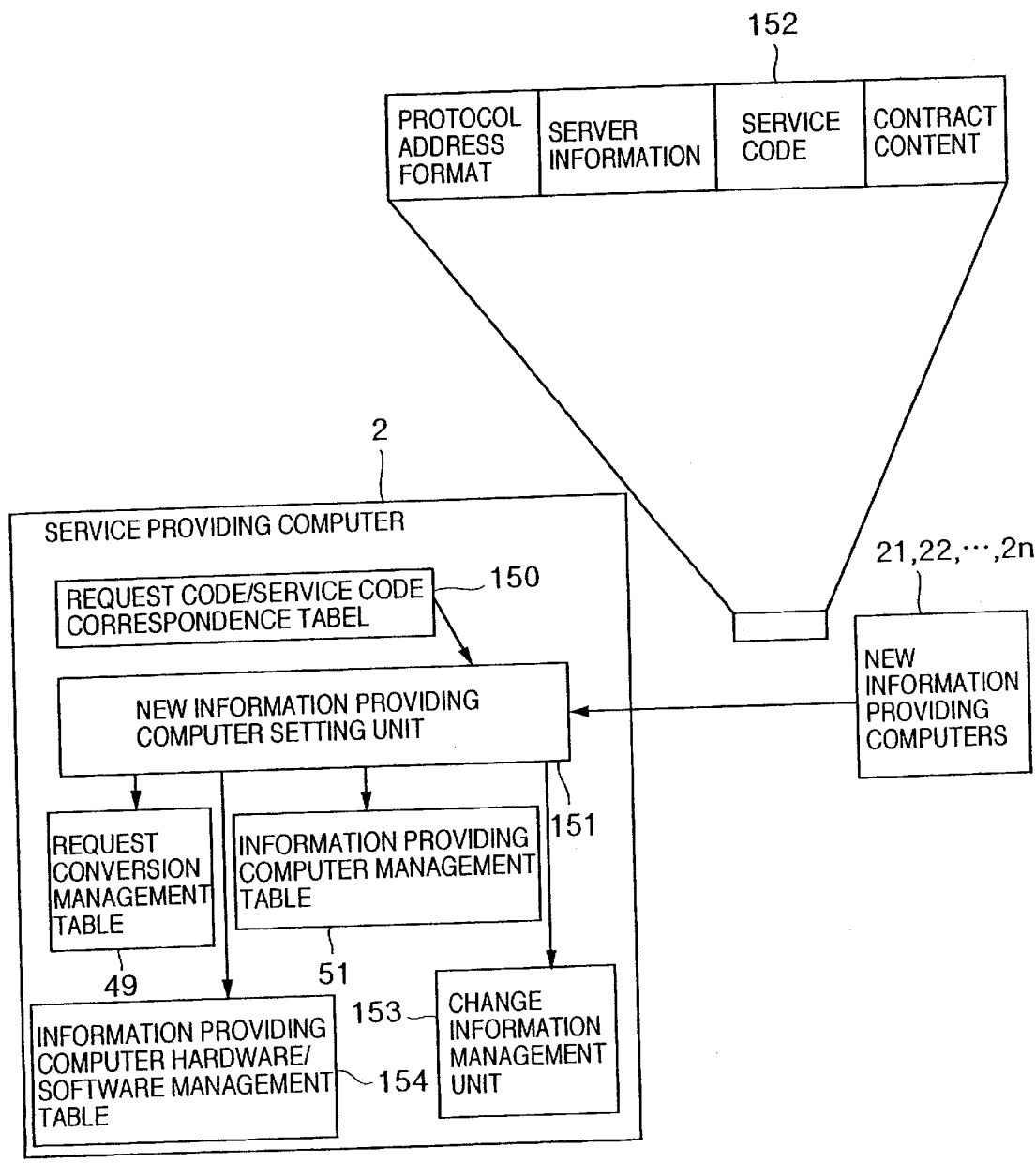
FIG. 32 is an explanatory diagram for explaining an automatic recognition method of a novel information providing computer.

FIG. 32 is a diagram for showing a method for automatically recognizing an information providing computer (new information providing computer) newly added to the system in the service providing computer. The new information providing computer transmits a service provision requiring message 152 to the service providing computer 2. The service provision message 152 contains information related to communications such as the communication protocol, address, transmission format, and reception format of the information providing computer; information related to the server information (for instance, hardware information such as model name, CPU type name, memory capacity, and disk capacity; and software information such as OS name and middleware name); a service code corresponding to a notation method for classifying a content of a service to be provided; and information related to a contact engaged with the service providing computer.

In the service providing computer 2, a new information providing computer setting unit 151 receives the service provision requiring message 152 to interpret the content of the service provision requiring message 152, and then sets the new information providing computer to the corresponding table. For instance, the information related to the communication protocol, the address, the transmission format, and the reception format is stored into the information providing computer management table 51. As to the server information, this information is stored in an information providing computer hardware/software management table 154. It should be noted in this embodiment that the new information providing computer setting unit 151 may be realized as one function of the execution management unit 30.

Referring to a request code/service code correspondence table 150, the new information providing computer setting unit 151 additionally sores the corresponding relationship between the new information providing computer and the information acquiring request into the request conversion management table 49 by observing the corresponding relationship between the request code issued when the application program issues the information acquiring request, and the service code for representing the content of the service provided by the information providing computer. Also, the information related to the contract established between the service providing computer 2 such as the charging information and the information providing computer is stored into a charging information management unit 153.

Operations of this system will now be described, while assuming a concrete example.

First, in order that the service providing computer 2 can provide the service, the application programs 415, 425, . . . , 4p5 are formed, and the various sorts of tables stored in the service management unit 4 are initialized. The application programs relation diagram 47 is formed at the same time when the application programs 415, 425, . . . , 4p5 are formed. Both the variable value involving relationship table 54 and the variable combination table 55 are also formed at the same time when the application program is formed, and perform the adjustments among the necessary variables so as to correctly count the histories in view of the sequential relationship of the application program. As previously explained, the various sorts of information are stored into the information providing computer management table 51, the acquired information integration management table 53, the quality conversion logic storage unit 35, the condition conversion logic storage unit 36, the history conversion logic storage unit 37, the static discriminating information conversion logic storage unit 38, and the composite element conversion logic storage unit 39. The rule how to convert the static discriminating information into the action variable must be stored. Also, such a rule that all of the values of the variables are directly used as the default into the action variables may be stored into the quality conversion logic conversion logic storage unit 36, the history conversion logic storage unit 37, and the static discriminating information conversion logic storage unit 38.

Next, considering such a case that MR. MATSUMOTO is newly connected with the service providing computer 2. It is assumed that MR. MATSUMOTO engages a contract as a gold member. The service providing computer 2 has not yet owned the information related to MR. MATSUMOTO. Thus, when the contract is established as the member, various questions are made in the questionnaires form, so that the static discriminating information such as the address, the name, the edge, the occupation, and the hobby as indicated in FIG. 5 is acquired. Since the service cannot be provided with only the static discriminating information, the service utilization trend information based on the entre statistics information is utilized.

It is now assumed that the relationship diagram as shown in FIG. 9 is formed as the application programs relationship diagram 47. After the log-in program 70, a service sort determining program 71 for determining a service sort equal to a top category is initiated.

At this time, in general, a popular service is proposed.

It is now assumed that the service providing computer 2 proposes "book selling" in the beginning, and since MR. MATSUMOTO has no interest in book selling, he refuses this proposal. Then, subsequently, the service providing computer proposes "ticket selling" having a second high utilization degree. Now, it is assumed that MR. MATSUMOTO finally selects "overseas travel". At this time, in the message format shown in FIG. 16, "service sort decision" is set to the application code, "overseas travel" is set to the item code, and "Yes" is set to the selection code.

Referring now to the application programs relationship diagram 47, the execution management unit 30 initiates the overseas travel/term determining program 73 when the overseas travel 72 is selected in the service sort determining program 71. At this time, the execution management unit 30 stores "overseas travel" into the value of the service sort of the selection variable temporal storage table 48.

The overseas travel/term determining program 73 refers to the value of the overseas travel/term of the action management table 56. In this table, "long term (more than 7 days)" is set which is the value obtained from the general statistics information. Accordingly, the overseas travel/term determining program 73 proposes "long term (more than 7 days)" to MR. MATSUMOTO unless this determining program 73 owns other logic.

When this proposal can be accepted by MR. MATSUMOTO, "overseas travel/term decision" is sent as the application code, "long term (more than 7 days)" is sent as the item code, and a message set by "Yes" is sent as the selection code to the service providing computer 2. The execution management unit refers to the application programs relationship diagram based on the content of this message, so that the execution management unit recognizes two programs, i.e., the overseas travel/place/fee range determining program 75, and the overseas travel/region/fee range determining program 76, which should be subsequently initiated. Before initiating these application programs, the execution management unit 30 stores "long term (more than 7 days) to the value of the overseas travel/term" of the selection variable temporal storage table 43. Although there are various sorts of logic so as to determine which program is initiated among the two recognized application programs, it is preferable that the variables proposed by the initiated application program may be accepted within 1 time. In other words, this system intends to propose the application program which is wished by the end user. Accordingly, the execution management unit 30 seeks such a variable which will be proposed in the first time when the respective application programs are initiated. Then, the execution management unit 30 compares firmness of these variables with each other, and thus initiated such an application program capable of selecting the variable with higher firmness. It is practically difficult to select the variable as follows. That is, the system owns the logic every application program, and then the execution management unit 30 recognizes all of the above-described logic. Therefore, it is utilized such a fact that as the most useful logic, the logic which has been selected many times in the past owns high probability in the present selection. In other words, the variable which has been selected many times from the variables of the overseas travel/place/fee range determining program 75 is selected from the service utilization trend table 44 (since the general trend is utilized in this time, the general service utilization trend table 67 is selected). A similar selection is applied to the overseas travel/region/fee range determining program 76. As a result, two variables and the times are obtained. Various sorts of logics are conceivable as the logic for selecting the application program initiated by the information obtained in this case. In this case, as simple logic, a selection is made of such a logic having a large ratio of the obtained times to a total time. As a result, "Hawaii discount" of the overseas travel/place/fee range determining program 75 is selected, and this selection is agreed by MR. MATSUMOTO. The execution management unit 30 stores "Hawaii discount" into the value of the overseas travel/place/fee range of the selection variable temporal storage table 48.

Next, the execution management unit 30 initiates the course selection program 79. The course selection program 79 makes up a more detailed concrete propose about "Hawaii discount travel more than 7 days", and determines a travel plan while inquiring the information providing computers to adjust the schedule, and checks the vacant seat information about the air line and the hotel.

Thereafter, an option is selected by the overseas/option determining program 80. Since there is no sufficient information about MR. MATSUMOTO, a popular option, for example, a reservation of a parking lot near an air port is first proposed from the general statistics information. In this case, MR. MATSUMOTO requests a reservation of a train up to the air port ("NARITA EXP" is selected).

Next, the execution management unit 30 initiates the ticket delivery determining program 81. The ticket delivery determining program 81 determines how to receive the air ticket and the like by MR. MATSUMOTO. By this ticket delivery determining program 81, such a message "a free home delivery service is available to a gold member" is sent to the information acquiring computer used by MR. MATSUMOTO.

When the ticket receiving method is selected, the execution management unit further initiates the payment determining program 82. In this payment determining program 82, a payment way is determined. It is now assumed that MR. MATSUMOTO selects the payment by the credit card. Next, since the credit condition of the credit card owned by one general member is confirmed, the execution management unit 30 initiates the credit inquiring program 83. However, since MR. MATSUMOTO is the gold member, the execution management unit 30 skips the initiation of the credit inquiring program 83, and initiates the ending program 84 to make a final confirmation.

Since the service provision is determined by carrying out the above-described process operations, the service providing computer commences such a process operation that the value of the selection variable is stored into the service utilization history table, which is temporarily stored in the selection variable temporal storage table 48 by the individual management unit 33. Referring to the variable combination table 55, the service providing computer gives values to two variables such as "overseas travel/place" and "overseas travel/fee range" from "overseas travel/place/fee range" before commencing this process operation. In other words, since the value of "overseas travel/place/fee range" is equal to "Hawaii discount", "Hawaii" is entered into "overseas travel/place", and "discount" is entered into "overseas travel/fee range". In the overseas travel/place/fee range determining program 75, since the "Hawaii discount travel" is selected, the two variables are determined one time. That is, in addition to such a fact that the "trip to Hawaii" is selected, the "cheap overseas travel" is selected. As a result, the values are entered into the two variables, i.e., overseas travel/place and overseas travel/fee range. When the value is entered into the overseas travel/place, it is defined in the variable involving relationship table 54 to also enter the value into the overseas travel/region. Thus, since "Hawaii" is located in the Pacific Ocean, the individual management unit 33 enters "the Pacific Ocean" into the overseas travel/region. Then, referring again to the variable combination table 55, the individual management unit 33 can enter the values into "overseas travel/region/fee range" from "overseas travel/region" and "overseas travel/fee range", and can confirm that this value is equal to "the Pacific Ocean/discount". This fact can be necessarily understood from the user of such variables equal to the involving relationship between the place and the region, and also the branch structure of the application program. In this case, the individual management unit 33 stores both the presently entered value, and the value of the selection variable temporarily stored in the selection variable temporal storage table 48. Also, the service sort, the purchase date, the detailed information, the reservation numbers of the air ticket and the hotel, and the name of the information providing computer are recorded in the service utilization history table 45.

Thereafter, every time MR. MATSUMOTO utilizes this system, the service providing computer 2 acquires the above-described history, and stores this acquired history into the service utilization history table 44, the service utilization trend table 45, and the system utilization history table 46. When the history information is accumulated, his favor of MR. MATSUMOTO can become obvious as the times of the values of the selected variables, so that the service providing computer 2 can provide the services which are well used by MR. MATSUMOTO to MR. MATSUMOTO.

In this case, proposals of the services are made based on the factors of not only the history, but also other reasons. That is, a quality of a request by an end user, condition when the request is issued, and static discriminating information of the end user many give influences. A quality of a request by an end user implies an attribute of a service requested by the end user. For instance, a priority degree of a process operation is changed, depending upon either a service with a payment or a service without a payment. Also, there is a difference in handling of process operations, depending upon either an important request or an unimportant request. If a transaction with a large amount of money is performed, then this transaction is important, so that this transaction is processed with a top priority. A value related to a quality is stored in the quality table 41. On the other hand, a condition is such an item determined by a log-in time instant. For instance, the following conditions may be conceived when the log-in operation is performed, daytime or night, summer or winter, week day or holiday, which event occurs, weather when this event occurs, social condition, economical condition, or load of network, load of service providing computer 2, otherwise content of service presently provided by information providing computer. A value related to a condition is stored in the condition table 42. The static discriminating information corresponds to personal information about an end user, and information about an information discriminating information table 43. A value related to the static discriminating information is stored in the static discriminating information table 43. The history analysis unit 34 analyzes the contents of the service utilization history table 44 (histories for respective services), the contents of the service utilization trend table (selection times of variables for constituting services), and the contents of the system utilization history 46 (utilization history as system) to derive the static discriminating information. Otherwise, the history analysis unit 34 produces the schedule table 57 in order to manage a travel schedule and an event such as a birthday by analyzing the above-described tables.

The application program does not directly refer to these tables. This is because these tables are such tables belonging to the middleware. As a consequence, according to this embodiment, as a table to which the application program can refer, there is provided the action management table 56. The action management table 56 is produced by employing solely the previously listed tables, or combining there tables with each other. For instance, where there are historical information and event information (condition) such as "there is a person who always goes to see soccer", and "events where observation tickets can be gotten by lottery occur every week", since these information is combined with each other, a notice of events can be issued as a message to this person.

It is now assumed that the utilizing times of the service providing computer 2 by MR. MATSUMOTO are considerably increased, and then the content of the service utilization trend table 45 by MR. MATSUMOTO is given as shown in FIG. 7. Under this situation, when the log-in operation is performed by MR. MATSUMOTO, the service providing computer 2 may recognize from the service utilization trend table 45 that, for instance, there are the largest numbers of the overseas travels as the service sorts, and then may propose as follows: "Hollow MR. MATSUMOTO, Thank you for your continuous services, How about your overseas travel soon?". At this time, MR. MATSUMOTO has traveled to Italy 4 times, and Hawaii once by utilizing the services provided by this system. Thus, it is assumed that since there are many trips to Italy as the historical information, the static discriminating information "he likes Italy" is registered.

When MR. MATSUMOTO can agree with a proposal of "overseas travel", since only "long term" is counted as the overseas travel/term, the service providing computer 2 proposes "long term" as the presently proposed term. Next, as to the count value of the overseas travel/place/fee range, "Italy/discount" is 4 and "Hawaii/discount" is 1. As to the count value of the overseas travel/region/fee range, "Europe/discount" is 4 and "Pacific Ocean/discount" is 1. In this case, "Italy/discount" and "Europe/discount" are counted as the same times, and the ratios thereof are the same. As to the place and the region, the service for the place is further limited. Therefore, if the place is proposed with a top priority, then the service providing computer 2 proposes "Italy/discount" of the overseas travel/place/fee range in this case.

Subsequently, in the course selection program 79, both the air line and the hotel which are usually used are judged from the history and then are selected with a top priority. In the overseas travel/option determining program 80, since there are many cases that the train is used as the transportation means to the air port, such a proposal is made "Is NARITA EXP reserved as usual?". Furthermore, in the ticket delivery determining program 81, the free delivery is selected, and in the payment determining program 82, the card is selected and the credit identification is omitted. As described above, when the utilizing times of this system are increased, since the accumulated historical information is utilized, the process operation can be smoothly proceed, as compared with that of the first item. It should be understood that the discount trip to Italy selected in this case is stored into the lowermost column of the service utilization history table of FIG. 6. Also, such a schedule table shown in FIG. 26 is formed based on the history analysis unit 34.

Next, it is conceived that, for instance, while MR. MATSUMOTO trips to Italy, he will utilize the service providing computer 2. When MR. MATSUMOTO executes the log-in operation, the service providing computer 2 enters the date of this log-in operation into the date of the condition table 42, for example, "1996/02/11". The composite element conversion unit 40 compares the schedule table 57 with the date "1996/02/11" of the condition table 42, and thus can recognize that MR. MATSUMOTO is under travel to Italy, and stays in Roma. It is predictable that since the log-in operation occurs during travel to Italy, there are large possibilities that the system using purpose is directed to the item of the present travel. Then, the service providing computer 2 displays the following traveling message in the application program initiated subsequent to the log-in program, i.e., "How are you MR. MATSUMOTO?, Are you enjoying your trip?, You stay in Roma. 1: schedule change, 2: emergent matter, 3: sightseeing guide". While various sorts of information required for the travel are previously selected, the application program capable of displaying such a message is previously prepared. Alternatively, other situations may be extended by neglecting the contents of the normal application programs relationship diagram, depending upon the specific conditions. Also, it is possible to specify the place of the user irrelevant to the schedule table by employing such a manner that a field 94 of a terminal place is present in a message format from the information acquiring computer to the service providing computer, and the place of the terminal is entered into this field by employing a certain method.

With respect to the information managed by the service management unit 4, another basis of this classification will now be explained. The quality of the request by the end user, the condition when the request is received and/or the discriminating information of the end user, which constitute the judging material for determining the service provided by the service management unit 4 may be classified into the individual information related to the information acquiring computer, the individual information related to the information providing computer, and the environmental condition information about the above-described respective apparatuses, namely the information acquiring computer and the information providing computer for the management purposes. Furthermore, each of the above-explained information may be classified based on a time domain. The individual information related to the information acquiring computer contains information extracted from a fact and a history in the past related to a user of the information acquiring computer, temporal information in the present time, and a future schedule. The fact related to the user of the information acquiring computer contains such static discriminating information related to an end user among the static discriminating information. The information extracted from the past history related to the user of the information acquiring computer contains the management information in unit of the utilized service, the statistics information related to the utilization frequency with respect to each of the service structural elements, and other service utilization historical information. The present temporal information related to the user of the information acquiring computer contains log-on date/time, service request date/time, a difference between service request date/time and service execution date/time, and static discriminating information related to the information acquiring computer among the static discriminating information. Also, the future schedule information related to the user of the information acquiring computer contains a service use schedule and a payment schedule of an end user, and also an action schedule of the end user.

On the other hand, the individual information related to the information providing computer involves a fact concerning the information providing computer, information extracted from a history in the past, present temporal information, and a future schedule. The fact concerning a provider of the information providing computer contains the conditions when the request is received, which are related to the information providing computer itself, and the service to be provided. The information which can be extracted from the past history of the provider for the information providing computer involves frequently accessed service sorts, frequently accessed service types, frequently used seasons/terms, frequently used places, frequently used amounts, frequently used fee ranges, frequently used information providers, frequently used payment ways, frequently used service delivery ways, frequently used week day, and frequently used time range. The present temporal information about the provider of the information providing computer contains load condition of the information providing apparatus, death/alive information of the information providing apparatus, and sorts of services available in the present time.

Furthermore, the environmental condition information about the respective apparatuses contains environmental facts of the respective apparatuses, information extracted from the past histories, the present temporal information, and the future schedule. The environmental facts about the respective apparatuses contain network band widths, and calendar information. The information which can be extracted from the environmental past histories of the respective apparatuses contains either information in the past, and exchange rates in the past. The environmental present temporal information of the respective apparatuses contains network loads, present weather, and exchange rates in the present time. Also, the environmental future schedule information about the respective apparatuses contains weather forecast information, exchange rate predictions, event exhibition schedule information, and newly connection schedules for information providers.

Figure 63:
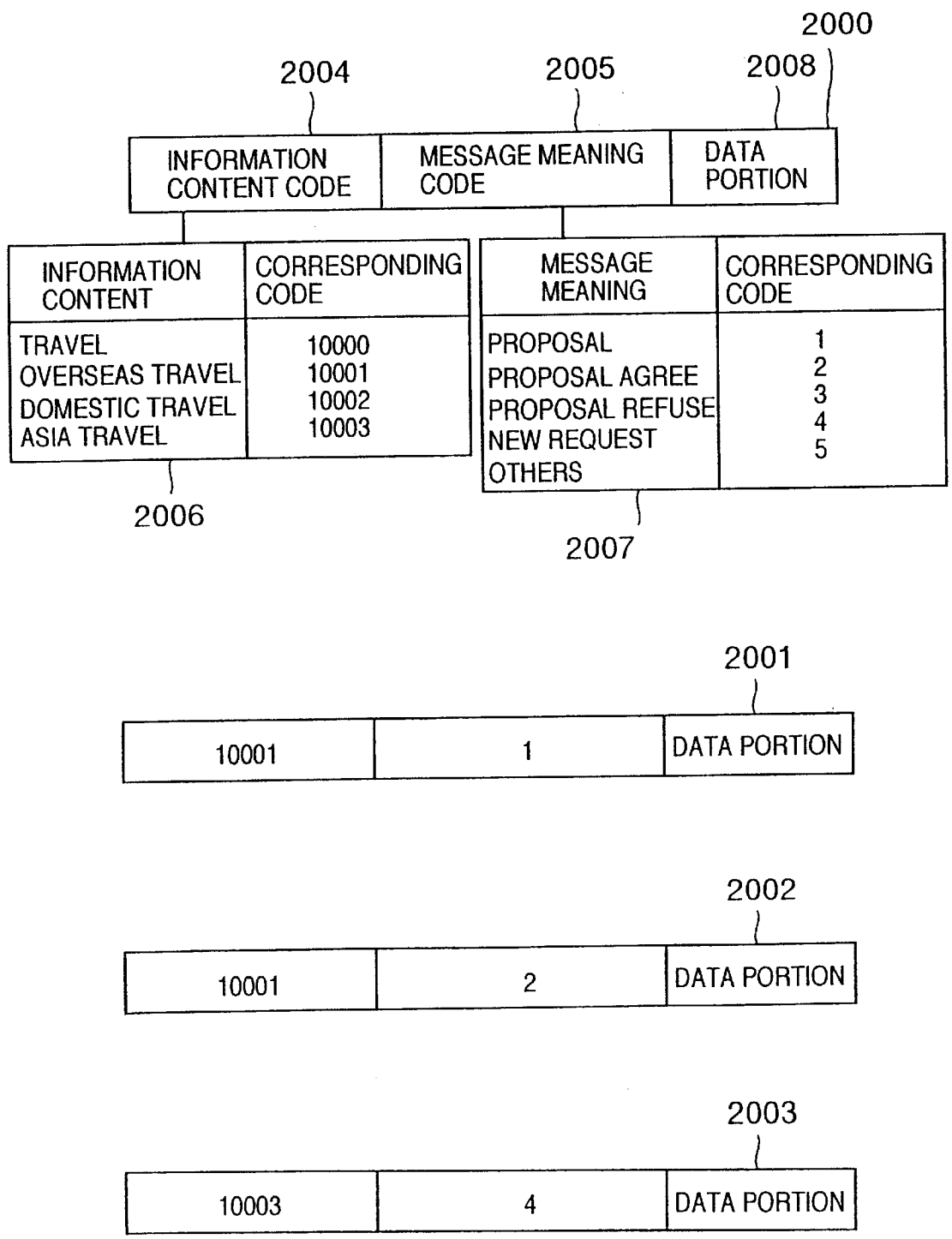
FIG. 63 is an explanatory diagram for explaining an initiative information request issued from the information acquiring computer.

Then, referring now to FIG. 63, a description will be made of another requesting method when information acquisition is requested from the information acquiring computers 11, 12, . . . , 1m to the service providing computer 2.

A message 2000 contains an information content code 2004, a message meaning code 2005, and a data portion 2008, and this message 2000 is used in the case that the provided information is proposed from the service providing computer 2 to the information acquiring computers 11, 12, . . . , 1m, and also in the case that the information acquisition computers 11, 12, . . . , 1m send the response thereto. The information content code 2004 indicates a content of information stored in the data portion 2008. As shown in a list 2006, "1000" indicates travel information, and "1001" indicate overseas travel information. The message meaning code is a code indicative of a meaning of this message. As indicated in a list 2007, "1" indicates a propose made from the service providing computer 2; "2" indicate an agreement by the information acquiring computer in response to this propose; "3" denotes a refusal made by the information acquiring computer in response to this proposal; and "4" indicates an information request voluntarily issued by the information acquiring computer. For instance, a message issued when the service providing computer 2 proposes the overseas travel to the information acquiring computers 11, 12, . . . , 1m becomes a message 2001. A message issued when the information acquiring computer agrees with this proposal becomes a message 2002. There is another case that the information acquisition is requested without issuing any proposal to the information acquiring computer from the service providing computer 3 other than the above-described proposal by the service providing computer 2, and the provided information determining stages by repeating either the agreement or the refusal. In this case, this message corresponds to, for instance, a message 2003. The message 2003 is an example of a message for requesting information about a trip to the Asia.

[EMBODIMENT 2]

Figure 33:
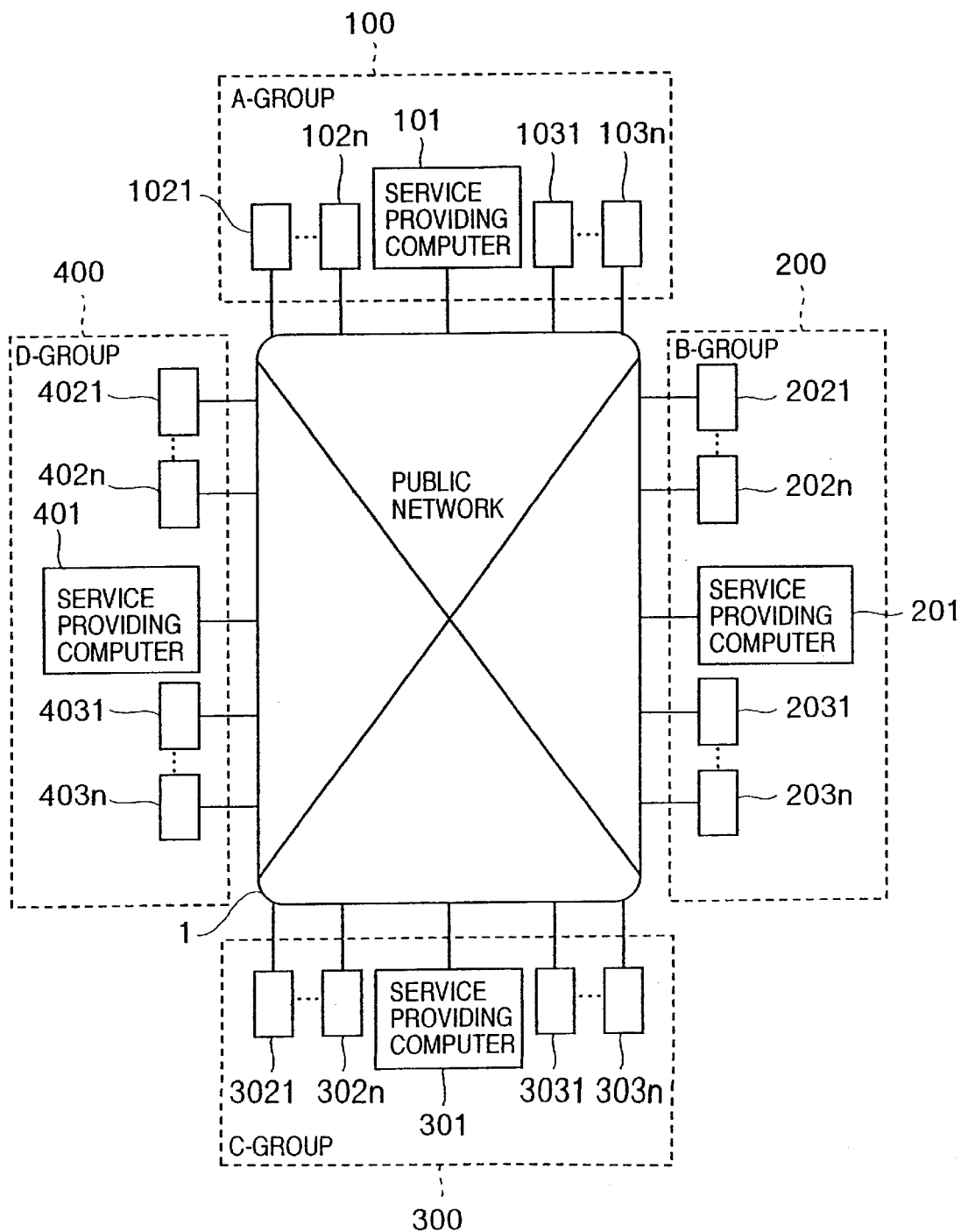
FIG. 33 is a system structural diagram of an information providing system according to a second embodiment of the present invention.

FIG. 33 is a structural diagram of an information providing system according to a second embodiment of the present invention.

In this embodiment, a service providing computer, an information acquiring computer, and an information providing computer belong to any one of four groups, i.e., an A-group 100, a B-group 200, a C-group 300, and a D-group 400. The groups are subdivided by a place, a region, a function, a service, and the like. For instance, when this system is a system for the Europe, the group is subdivided into Germany, France, Italy, and England. When the group is subdivided by the function, for example, this group is subdivided into a travel service, a music information service, a newspaper service, and a stock price information. A total number of groups may be freely selected to be more than 1.

The A-group 100 is constituted by a single service providing computer 101, a plurality of information acquiring computers 1021 to 102n, and a plurality of information providing computers 1031 to 103n. Other groups are arranged in a similar manner. In this case, an information acquiring computer corresponds to an end user computer, namely such a computer used to acquire information by an end user. As the information acquiring computer, there are mainly employed a workstation, a desk top type personal computer, a notebook type personal computer, and a PDA etc. An information providing computer corresponds to a computer for providing information to an end user. The most information providing computer owns a database, and voluntarily provides information in response to a request. A service providing computer is interposed between the information acquiring computers and the information providing computers, receives a request from an information acquiring computer to be connected to the proper information providing computer. Also, this service providing computer integrates the information of the information providing computers and returns the integrated information to the information acquiring computer. The respective computers are connected to each other via network (public network) 1. As the network, the public line network, the B-ISDN network, the packet network, and the private line may be used.

Figure 34:
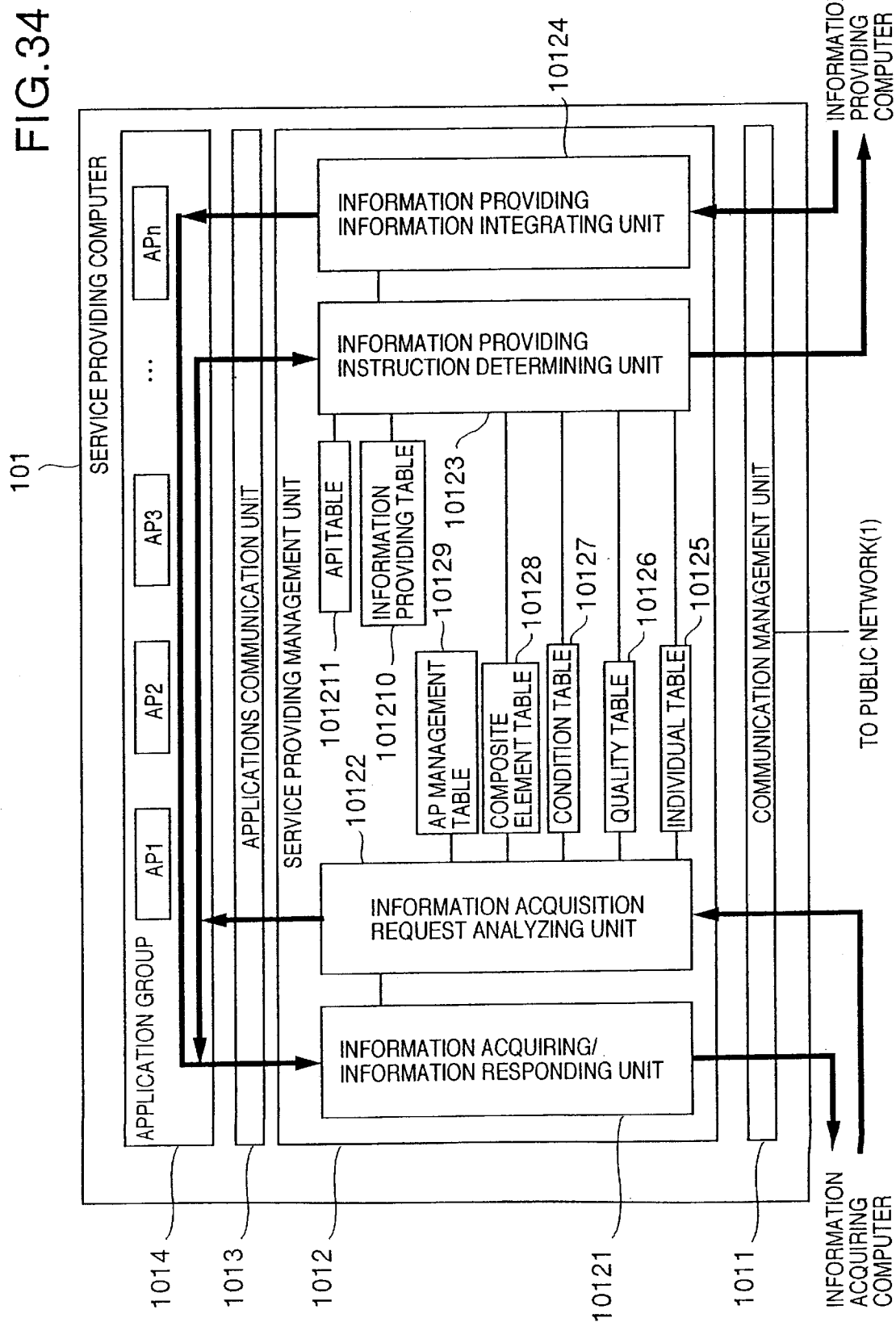
FIG. 34 is a block diagram for representing an arrangement of a service providing computer.

FIG. 34 is a block diagram for showing a functional arrangement of the service providing computer 101.

A communication management unit 1011 manages transmission/reception between the service providing computer and the public network 1.

An application group 1014 contains a plurality of application programs (AP1, AP2, . . . , APn). These application programs are executed by a service providing management unit 1012, and perform communications via the service providing management unit 1012 and an applications communication management unit 1013.

The service providing management unit 1012 includes an information acquiring/information responding unit 10121, an information acquisition request analyzing unit 10122, an information providing instruction determining unit 10123 an information providing/information integrating unit 10124, an individual table 10125, a quality tale 10126, a condition table 10127, a composite element table 10128, an AP (application) management table 10129, an information providing table 101210, and an application interface (API) table 101211. Precisely speaking, the individual table 10125 contains the static discriminating variable definition table shown in FIG. 35, the static discriminating variable table shown in FIG. 36, the dynamic discriminating variable definition table shown in FIG. 37, and the dynamic discriminating variable table shown in FIG. 38. The quality table 10126 contains the quality/variable definition table shown in FIG. 39, and the quality definition table shown in FIG. 40. The condition table 10127 contains the condition variable definition table indicated in FIG. 41, and the condition definition table indicated in FIG. 42. The composite element table 10128 contains the composite element variable definition table shown in FIG. 43, and the composite element definition table shown in FIG. 44. The AP management table 10129 contains the application management variable definition table shown in FIG. 45, and the application management variable table shown in FIG. 46. The information providing table 101210 includes the information providing variable definition table shown in FIG. 47, the information providing variable table shown in FIG. 48, and the information provision determining table shown in FIG. 51. The API table 10121 includes the API variable definition table shown in FIG. 49 and the API variable table shown in FIG. 50.

Before describing operations of the applications and the service providing management, preset items will now be explained.

First, either a manager of the service providing management unit or an application group former defines a static discriminating variable. FIG. 35 shows an example of a static discriminating variable definition table 5200. The static discriminating variable according to this embodiment represents a fixed personal attribute and a semi-fixed personal attribute related to an individual user who tries to utilizes a service through an information acquiring terminal. As a variable 5201, a user name, a user address, a user member level, and a user telephone number are set with respect to each of user IDs. As to a reservation/designation 5202, "reservation" is set to a variable defined by the manager of the service providing management unit, and also "designation" is set to a variable defined by the application group former. The "reservation" variable defined by the manager of the service providing management unit does not depend upon, but corresponds to a common variable for all of the application programs. Actually, this reservation variable is an apparently existing variable. This variable is present as a default unless the manager of the service providing management unit intentionally deletes this variable. The "designation" variable defined by the application group former is effective only in this application group in the normal condition. For instance, even when both a music information providing application group and a travel service application group are present as the applications as the same providing management unit, the both variables cannot refer to each other in the default. Alternatively, both the variables may refer to each other as a common variable. An available value 5203 of the table indicates a range allowable to this value. In accordance with this definition, a name of a variable 5302 and a value thereof 5303 are stored in the static discriminating variable table 5200 in correspondence with a user ID 5301.

FIG. 37 shows an example of a dynamic discriminating variable definition table for defining a dynamic discriminating variable. Even in the dynamic discriminating variable definition table 5400, a reservation/designation 5402 and an available value 5403 are defined every definition of a variable 5401. The dynamic discriminating variable corresponds to a historical variable. In other words, not only the present value but also the past value are saved in the table, and the times are counted every time the variable has the same value. As shown in FIG. 38, in correspondence with a user ID 5501, a name of a variable 5502 and a value thereof 5503 are stored in a dynamic discriminating variable table

5500. Then, a mark is made in a present 5504 when a value thereof 5503 is equal to the present value. Also, the times when the value set to the value 5503 are indicated in times 5505. For instance, a variable "service sort" of a person of a user ID "100" presently owns a value called as "music", and it can be seen that 35 times including present time occur when the variable takes this value. When the application program refers to the variable "service sort" of the person of the user ID "100", this application program can refer to the present value, the past value obtained in the largest times, and the second largest value under various conditions.

FIG. 39 shows an example of a quality variable definition table for defining a quality variable. Both a reservation/designation 5602 and an available value 5603 are defined in a quality definition table 5600 every quality variable 5601 to be used. A quality variable implies a temporal variable in a service session such as a term from log-in operation to log-out operation, and a term from a service start to a service end, and indicates a variable not requiring a history. In particular, a value of a quality variable is designed so as to give an influence to a quality priority degree, reliability of a service. As indicated in FIG. 40, a quality variable 5702 and a value thereof 5703 are set into a quality variable table 5700 with respect to each of the user IDs 5701.

FIG. 41 shows an example of a condition variable definition table for defining a condition variable. Both a reservation/designation 5802 and a value 5803 available to a condition variable are defined in the condition variable table 5800 every condition variable 5801. A condition variable is not equal to an attribute of a user, but equal to a variable which constitutes an external factor for the user. It should be noted that this external factor does not give similar effects to all users. To a certain user, such a fact that today is February 13 owns a very important implication, but does not have a very important meaning to other persons. As shown in FIG. 42, in accordance with the definition of the condition variable definition table 5800, both a condition variable 5901 and a value 5902 indicative of this condition are set into the quality variable table. In this case, it should be noted that variables are not present with respect to the user as to the condition variable.

FIG. 43 represents an example of a composite element variable definition table for definiting a composite element variable. A composite element corresponds to such a variable determined in relation to a value of at least one variable (discriminating, quality, condition) which has been so far defined. To this end, a reservation/designation 6002, a value 6003 available for this variable, and further logic 6004 for determining a value are defined in a composite element variable definition table 600 with respect to the respective variables 6001. The logic 6004 is given as a function such that at least one variable becomes an input. A variable 6102 and a value 6103 thereof are set to a composite element variable table 6100 every user ID 6101. A value determined by the logic 6004 is se to this value 6103.

FIG. 45 shows an example of an application management variable definition table. Also, in an application management variable definition table 6200, a reservation/designation 6202 and a value 6203 available to this variable are defined every variable 6201. In an application management variable table 6300, a variable 6302 and a value 6303 thereof are set in accordance with the definition made therein every application ID (AP-ID) 6301. As a result, a condition when an application program is initiated, and an argument supplied thereto are defined. For example, such an application program that AP-ID 6301 is equal to "3003# is initiated by using a dynamic discriminating variable "music-type" and a static discriminating variable "log-in address" as an argument when the previously executed application program is the log-in program, and the service sort is music, and further the music-service sort is a concert.

FIG. 47 indicates an example of an information providing (ID) variable definition table. An information providing (IP) variable definition table 6400 defines a reservation/designation 6402 and a value 6403 available to this variable every variable 6401 used to provide information. An information providing (IP) variable table 6500 defines an information providing service in detail in accordance with this definition. In this information providing (IP) variable table 6500, both a variable 6502 for determining a detailed content of a service, and a value 6503 thereof are set every ID (information ID) 6501 of information to be provided. As to the service provided by the information providing computer, the precise and concrete contents of the service contain a providing place, an access ID (communication port number etc.) capable of uniquely discriminating a service within the providing place, an input variable, an output variable, an application interface (interface between application and information providing instruction determining unit), and information conversion logic for absorbing a difference in the interfaces of the information providing computers.

FIG. 49 shows an example of an application interface (API) conversion definition table. An API variable definition table 6600 mainly indicates a variable of an input, a variable of an output, and a service using fee. These items have a close connection with the above-described information providing definition. These items are defined by taking account of a plurality of resembling information providing definitions. For example, in an IP variable table 6500 shown in FIG. 48, as to the information provision of the information ID "20001", there is "char date" (date in character) in the output variable, whereas as to the information provision of the information ID "20002", a similar output variable becomes "dint date-time" (date and time instant in double integer). Considering these items, API is set to "char date" (date in character) as indicated in FIG. 50.

FIG. 51 shows an example of an information provision determining table. In an information provision determining table 6800, an information ID 6803, logic 6804, and integration logic 6805 are set with respect to a combination of a user ID 6801 and an application interface (API) ID 6802. Based on this table, for instance, based upon a request of a user who owns "100" as the user ID 6801, when an API ID 6802 calls a "10001" API, a decision is made as to which information provider may be called. Concretely speaking, a decision is dynamically made as to which available information providing computer should be connected based on the functions registered in the logic 6804 during request. Also, another decision is made as to which information should be provided to the user among the obtained information based on the integration logic.

Next, operations of the service providing management unit 1012 when the application is executed will now be explained. It should be understood that the following descriptions are made, assuming now that conditions of the respective tables are indicated as in FIG. 35 to FIG. 51.

A first case will now be condition in which a user executes a log-in operation through the information acquiring computer 1021 of the A-group 100 (see FIG. 33). In the information acquiring computer 1012, a client application (browser) for executing a man-machine interface process. First, when the information acquiring computer 1021 is initiated, a connection request is issued from the information acquiring computer (browser) via the public network 1 to the service providing computer 101. There are one case that when the information acquiring computer 1021 is initiated, the connection request is automatically issued, and the other case that the connection request is issued by user operation.

Figure 53:
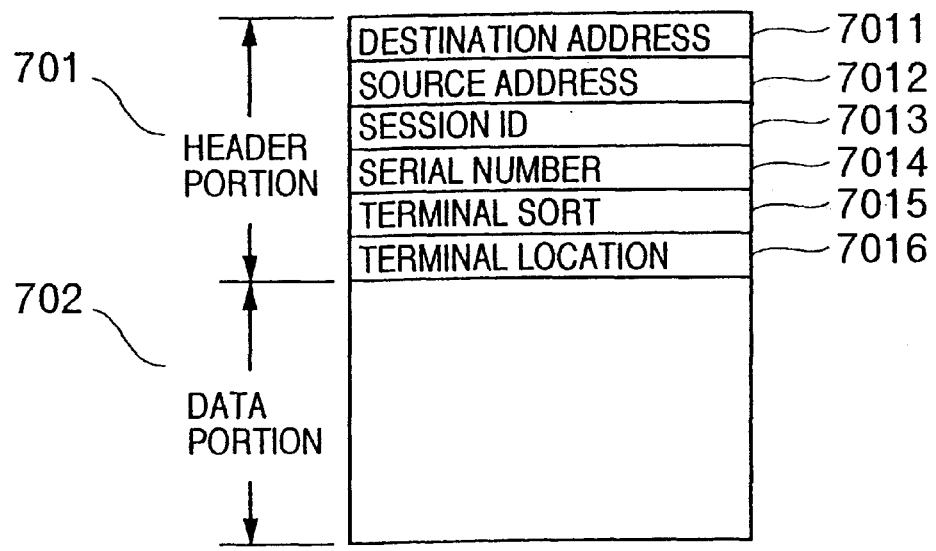
FIG. 53 is a format diagram of a message transmitted/received between the information acquiring computer and the service providing computer.

In FIG. 53, there is shown a format of a message transmitted/received between the information acquiring computer and the service providing computer. The message contains a header portion 701 and a data portion 702. The header portion 701 contains a destination address 7011, a source (sender) address 7012, a session ID 7013 capable of uniquely discriminating a session start to an end from the client application (browser), namely a combination with an address (for instance, IP address+port) and a time instant, a serial number 7014 within a session, a terminal sort 7015 for indicating a type of a terminal, and a present location 7016 of a terminal. Among them, the terminal sort 7015 and the terminal location 7016 are not the necessary elements, but may provide better services to users. When a connection request is issued, the connection request is inputted into the data portion 702. This connection request is received so as to be analyzed by the information acquiring request analyzing unit 10122 employed in the service providing computer 101.

Based on the message data, variables of "login terminal sort" and "log-in date/time" are set. At this time, since the session has just commenced, there is no application program which has been so far executed. From the application management variable table 6300, it becomes "preceding application N/A (none)". As a result, the information acquiring request analyzing unit 10122 initiates the log-in program to thereby set a value "log-in" into a variable "preceding application".

When the log-in program is initiated, this log-in program transfers such an output for requesting the user ID and the password to the information acquiring information responding unit 10121. The information acquiring information responding unit 10121 sends this output via the public network 1 to the information acquiring computer 1021. The information acquiring computer 1021 requests the user to input the user ID and the password in response to the request sent from the service providing computer 101.

Next, when the user enters the user ID, for example, "100" and the password, this user ID and the password are set to the data portion 702 of the message, which is sent to the service providing computer 101, this request is received so as to be analyzed by the information acquiring request analyzing unit 10122.

First, the information acquiring request analyzing unit 10122 confirms the user ID and the password based on the static discriminating table 5300. Next, the application management variable table 6300 is checked, and since the value of the variable "preceding application" is equal to "log-in", the variable "service sort" is subsequently checked. A maximum time is checked from the dynamic discriminating variable table 5500, it is set to "service sort=music". Furthermore, the information acquiring request analyzing unit 10122 refers to the application management variable table 6300, and since the value of the variable "preceding application" is equal to "log-in" and the value of the variable "service sort" is equal to "music", the information acquiring request analyzing unit 10122 investigates another variable "music-service sort" and sets the variable to "music-service sort=concert" in a similar manner to the above case. An application program "music concert identification" is initiated by the application management variable table 6300.

The application program "music concert identification" acquires the information as follows:

The "music concert identification" program calls a music concert identification API (FIG. 50) of APIID=10001. To this end, an argument "char genre, char address" must be set. As a consequence, referring to the dynamic discriminating variable "music-type" and the static discriminating variable "log-in address", each of these variables is set to the argument. Thereafter, the music concert identification API is called. This call is transferred to the information providing instruction determining unit 10123. The information providing instruction determining unit 10123 checks the information provision determining table 6800, and operates a logic function "Logic__11", since "user ID=100" and "APIID= 1001". Since the logic function depends upon the discriminating variable, the quality variable, the condition variable, and the composite element variable, different results from each other are obtained for the individuals. As a result, as the variable "information ID", values "20001" and "20002" are obtained. First, based on the variable "information ID=20001", referring to the information providing variable table 6500, a variable "information input", namely an argument is set. At this time, the "information conversion logic" is employed if necessary. Then, while "information address= 133.144.8.176" and "information access ID" are used as the base, a message is formed, and then an information providing request is transmitted to the information providing computer. Also, as to the variable "information ID=20002", a message is similarly formed, and then an information providing request is transmitted.

Figure 54:
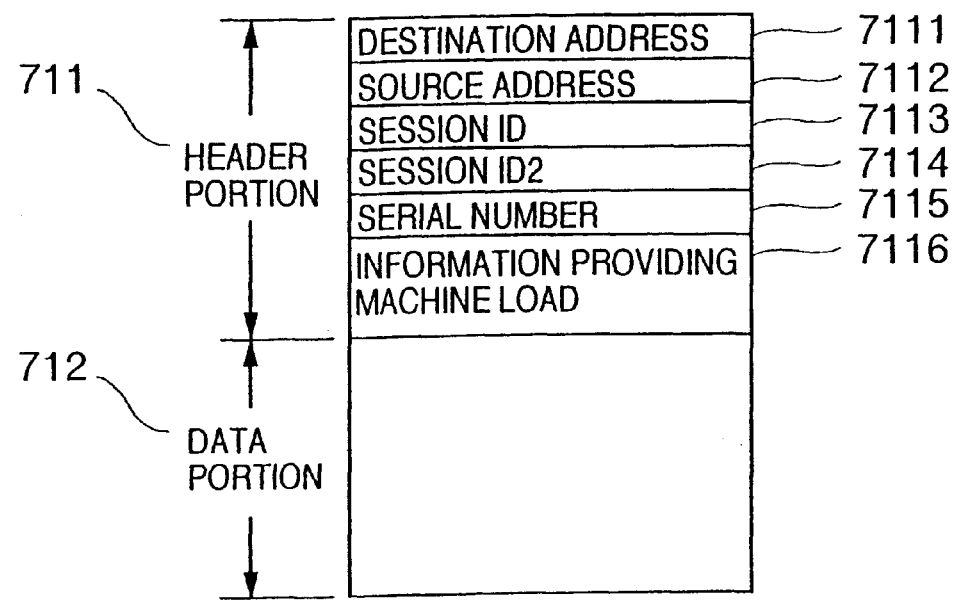
FIG. 54 is a format diagram of a message transmitted/received between the information acquiring computer and the service providing computer.

In FIG. 54, there is shown a format of a message transmitted/received between the information providing computer and the service providing computer and the service providing computer. The message between the information providing computer and the service providing computer also has a header portion 711 and a data portion 712. The header portion 711 further contains a destination address portion 7111, a source address portion 7112, a session ID portion 7113, a session ID 2 portion 7114, a serial number portion 7115, and an information providing machine load portion 7116. As a session ID set to the session ID portion 7113, such a session ID used in the communications between the information acquiring computer and the service providing computer is employed. As a session ID set to the session ID portion 7114, when the service providing computer is connected to the different information providing computer, such a session ID different from the session ID set to the session ID portion 7113 is set. When the message is returned from the information providing computer to the service providing computer, the load of this information providing computer is set to the information providing machine load portion 7116. The value of "information input" with respect to the information providing computer is set to the data portion.

The information providing computer which has received the information providing request returns each of the access results. The response from the information providing computer is received by the information providing information integration unit 10124.

First, the information providing information integration unit 10124 users the "information conversion logic" of the information providing variable table 6500 to convert the received data into data having a model of "AP information output" adapted to the API. Then, the integration logic of the information provision determining table is executed to all of the converted data, so that information suitable for the user is selected. Since the integration logic depends upon the discriminating variable, the quality variable, the condition variable, and the composite element variable, the different selections from each other are made with respect to each person. The selected "AP information output" is returned to an application program "music concert introduction", and then is outputted via the information acquiring information responding unit 10121 to the information acquiring computer.

As described above, since the service providing management unit manages the information used to discriminate the users, the conditions, and the information concerning the quality, the service providing management unit can voluntarily provide the customized service to the user, and also, the application can escape from the cumbersome work to manage the above-described information.

In such a case that no reply is made from any one of the information providing computers with respect to the information providing request message of the information providing instruction determining unit, or no data useful to the user is provided, the following process operation is carried out. In such a case, the information providing integration unit 10124 notifies such a fact to the information providing instruction determining unit 10123. That is, no reply is made from any one of the information providing computers, or no data useful to the user is provided. The information providing instruction determining unit 10123 sends an information providing assistant request to the neighbor service providing computer, for instance, the service providing computer 201 of the B-group. At this time, a message format is similar to that shown in FIG. 54. However, an ADIID and a value of "AP information input" of an AP, namely an input argument value (in this case, char genre, char address) of the API are set to the data portion 712 of this message format. This information providing assistant request is received by the information providing integration unit 10124 of the service providing computer 201 on the request receiving side.

The information providing integration unit 10124 transfers the received message to the information providing instruction determining unit 10123. The information providing instruction determining unit 10123 can understand from the message that, for instance, the variable "ADIID" is equal to "10001", and then transmits an information providing request to an information provider (information providing computer) of the B-group 200 in a similar process manner to that executed in the service providing computer 101. The result received by the service providing computer 201 from the information provider of the B-group 200 is converted based on the "information conversion logic", and then the converted result is transferred to the service providing computer 101 of the A-group 100. In the service providing computer 101, a selection is performed based on the "integration logic", and the output is transferred to the application.

Next, another case will now be considered. That is, in the system shown in FIG. 33, a user who usually accesses through the information acquiring computer 1021 of the A-group will access through another group, e.g., the information providing computer 2021 of the B-group 200. In this case, the information providing computer 2021 of the B-group 200 is connected to the service providing computer 201 of the B-group 200. However, since when both the user ID and the password during log-in operation are confirmed, the service providing computer 201 does not hold the static discriminating information of this user, this log-in operation is not allowed under present situation. In this case, the information acquiring request analysis unit of the ser20 vice providing computer 201 may recognize that the identification fails due to no existence of the user ID, and then notifies this recognition to the information acquiring/information responding unit. The information acquiring/information responding unit requests the service providing computer which has issued this user ID to verify the user ID and the password. As a consequence, it is conceivable that a rule how to establish the user ID is made, and information capable of discriminating the service providing computer for managing this user ID is contained in a portion of the user ID in such a manner that, for instance, this information is a numeral (character) indicative of an arbitrary numeral (character)+service providing computer. Alternatively, the request may be broadcasted to all of the service providing processors. When the user identification is performed in the service providing computer which has issued the user ID, the application program is executed in the service providing computer which has carried out this identification. In this case, such a service providing computer firstly connected owns an obligation only to transfer the input/output to the information acquiring computer.

As previously described, according to this embodiment, the user (information providing computer) can receive the service by merely connecting this user to the near service provider. As a consequence, it is possible to extract the information/service suitable for the own user from a large amount of information distributed over the wide range, while suppressing the communication cost to low values.

Figure 55:
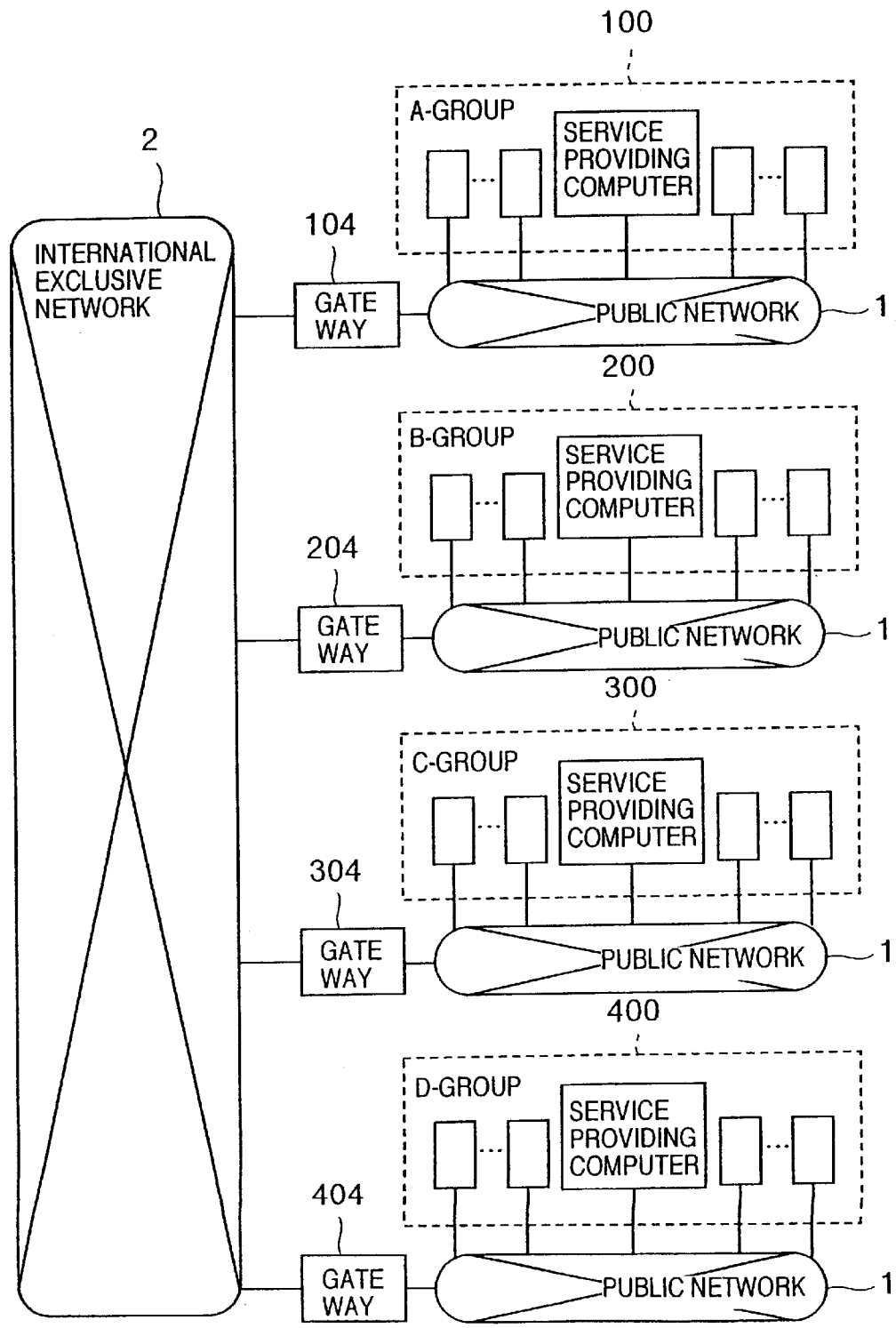
FIG. 55 is a system structural diagram for showing another system structure according to the second embodiment of the present invention.

It should be noted that the above-explained embodiment may be similarly realized even in a system arrangement as shown in FIG. 55. In the system shown in FIG. 55, a service providing computer, information acquiring computers, and information providing computers, belong to each of groups, are connected via a public network 1 to each other. These groups are mutually connected by way of an international exclusive network 2 connected via gateways 104, 204, 304, 404. In this case, even when there are differences in communication protocol among the groups, and/or there are differences in protocol between the international exclusive network 2 and the public network 4 of each of these groups, the above-described operations can be carried out without any problem by absorbing these protocol differences by the gateways.

[EMBODIMENT 3]

Figure 56:
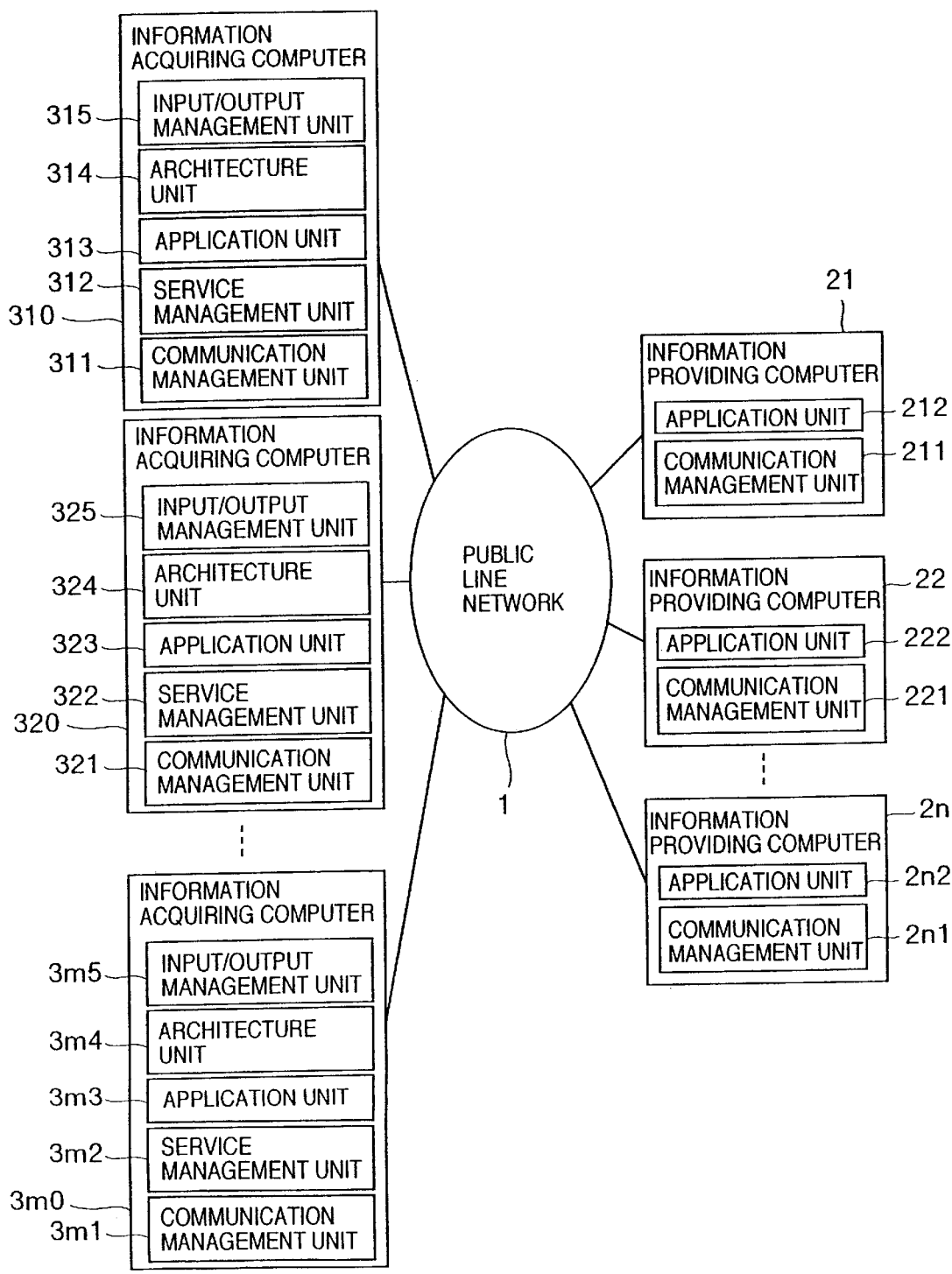
FIG. 56 is a system structural diagram of an information providing system according to a third embodiment of the present invention.

FIG. 56 is a structural diagram of a network system according to a third embodiment of the present invention.

In this system at least more than one information acquiring computers 310, 320, . . . , 3m0, and at least more than one information providing computers 21, 22, . . . , 2n are connected to a public line network 1.

The information acquiring computer 11 includes a communication management unit 311, a service management unit 312, an application unit 313, an architecture unit 314, and an input/output management unit 315. It should be noted that this arrangement is similar to those of the information acquiring computers 320, . . . , 3m0. The information providing computer 21 includes a communication management unit 211 and an application unit 212. It should also be noted that this arrangement is similar to those of the information providing computers 22, . . . , 2n.

The information acquiring computer 310 transmits requests via the public line network 1 to the service providing computers 21, 22, . . . , 2n, and receives information from the service providing computers 21, 22, . . . , 2n. As an example of the information acquiring computer 310, there are an exclusive-use terminal, a personal computer, a workstation, a multimedia kiosk, a personal portable terminal (PDA) and so on. As an example of the information providing computer 21, there are a database server, a World Wide Web (WWW) server, an FTP server, a WAIS server, a Gopher server and a so on.

The service providing computer 310 determines a sort of information to be provided with an end user based upon a quality of a request content, individual information and past historical information of the end previously stored inside the information acquiring computer 310, and various sorts of conditions when the request is received. The quality of the request is entered via the input/output management unit 315 by a subject (will be referred to as an "end use" hereinafter) which issues request to the information acquiring computer 310. The information acquiring computer 310 transmits an information acquiring request to such an information providing computer capable of acquiring a necessary sort of information among the information providing computers 21, 22, . . . , 2n. Further, the information acquiring computer 310 determines information to be provided with the end user based on the information received from the information providing computers 21, 22, . . . , 2n, and also the owned information, and then transmits this determined information from the input/output management unit 315 to the end user.

Figure 57:
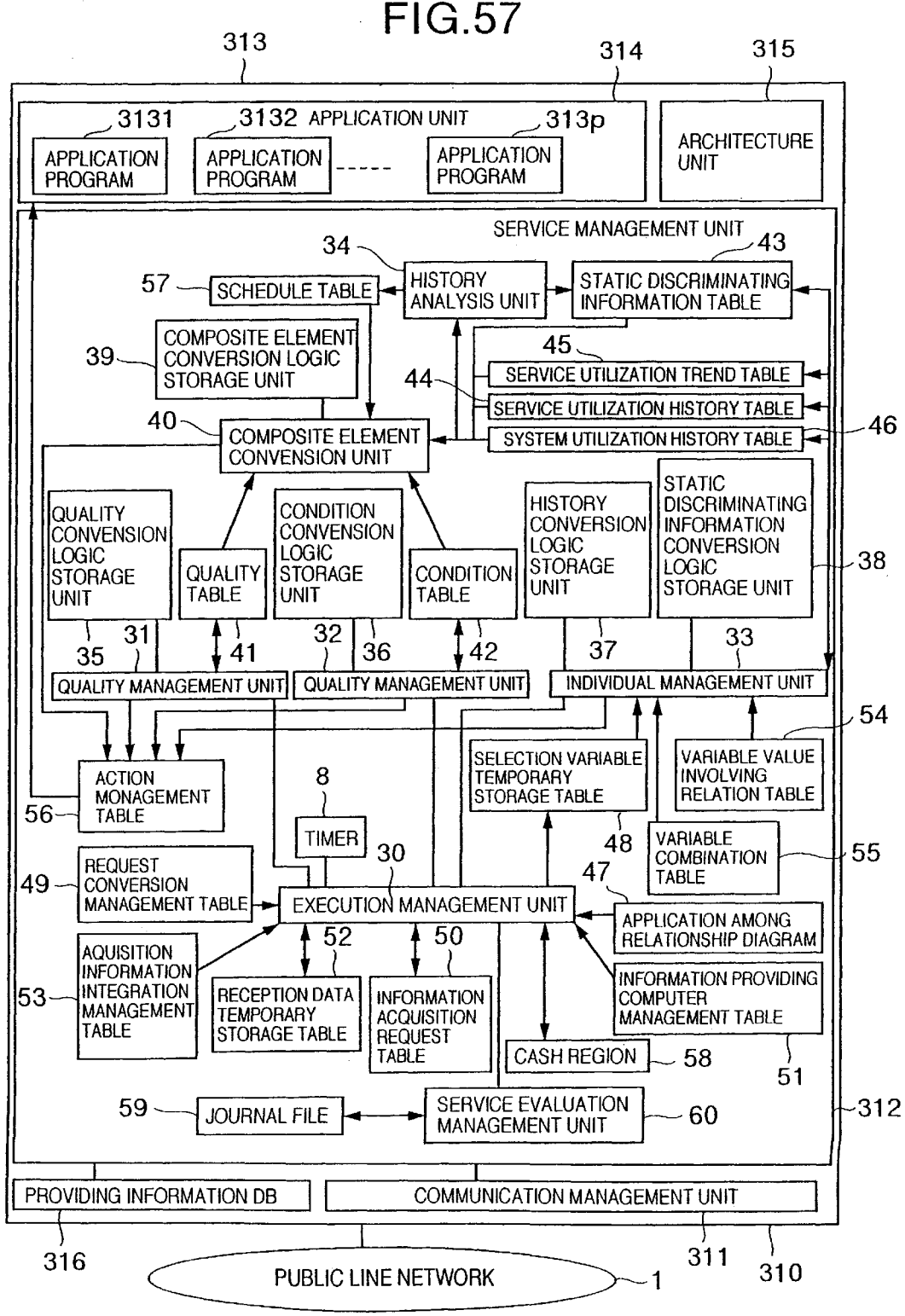
FIG. 57 is a block diagram for indicating an arrangement of the information acquiring computer.

FIG. 57 shows the arrangement of the information acquiring computer 30.

The communication management unit 311 is connected to the public line network 1, and receives a message transmitted from the service management unit 312 and the application unit 313, and then transfers the message to the proper information providing computers 21, 22, . . . , 2n via the public line network 1. The communication management unit 311 receives via the public line network 1 the message transferred from the information providing computers 21, 22, . . . , 2n and transfers the message to the service management unit 312 and the application unit 313.

The service management unit 312 includes process units, and a plurality of tables for storing process results of these process units, and to which these process units refer while executing the process operations. The process units are constructed of an execution management unit 30, a quality management unit 31, a condition management unit 32, an individual management unit 33, a history analysis unit 34, a quality conversion logic storage unit 35, a condition conversion logic storage unit 36, a history conversion logic storage unit 37, a static discriminating information conversion logic storage unit 38, a composite element conversion logic storage unit 39, and a composite element conversion unit 40. These tables are similar to those employed in the embodiment 1.

A description will now be made of a quality of a request transmitted by an end user, a condition when the request is received, and discriminating information of the end user, which are used as a judgement material when the service management unit 312 manages the providing service.

A quality of a request by the end user corresponds to an attribute of a service requested by the end user among the services provided by the information acquiring computer 310. The service management unit 312 changes a priority degree of this process based on the quality of the request and a predetermined rule, and executes an additional process. A condition when the request is inputted corresponds to an item having no relationship with the end user among items determined at the time when the end user inputs the request from the input/output management unit 315. A condition during reception corresponds to an item having a relation with a day/time, and items related to various states of networks such as the service providing computer 2, the information providing computers 21, 22, . . . , 2n, and the public line network 1. Based upon the condition during input and a predetermined rule, the service management unit 4 changes the quantities of the information providing computers 21, 22, . . . , 2n, and changes the providing information, or the amount of providing information, limits the providing service, and also changes the priority order of the process. The discriminating information of the end user corresponds to information depending upon the end user and the information acquiring computer 310, and contains static discriminating information such as fixed information or semi-fixed information, and also the service utilization history information of the end user changed every time the end user utilizes the service. Based upon the above-described discriminating information and a predetermined rule, the service management unit 312 changes the providing information, the number of information providing computers 21, 22, . . . , 2n to be connected, the amount and modes of the providing information, or the priority order of processing. As the service utilization historical information of the end user, there are management information in unit of utilized service, statistics information related to utilization frequency every constructural elements of services, and other service utilization historical information.

The process operations of the service management unit 312 will now be summarized. The service management unit 312 executes the process in conjunction with the application unit 313. The service management unit 312 initiates the properly selected application programs 3131, 3132, . . . , 313p as to the information acquiring request entered by the end user from the input/output management unit 315 based on the quality of this request, the condition during reception, and the discriminating information of the end user. Also, the service management unit 312 provides the conditions for determining the content of the information to be provided with the end user to the application programs 3131, 3132, . . . , 313p based on the above-described quality, condition, and discriminating information. The initiated application programs 3131, 3132, . . . , 313p determine a content of providing information based upon the conditions for determining the content of the providing information indicated by the service management unit 12. In the case that the application programs 3131, 3132, . . . , 313p do not own the information required to execute the process, the acquisition of this information is requested to the service management unit 312. The service management unit 312 selects at least more than one proper information providing computers 21, 22, . . . , 2n in order to acquire the necessary information based on the above-described quality, condition, and discriminating information, and then transmits the information acquisition request to the selected information providing computers 21, 22, . . . , 2n. Upon receipt of the information from the information providing computers 21, 22, . . . , 2n, the service management unit 312 combines the acquired information with each other based on the above-described quality, condition, and discriminating information to thereby form the information to be provided to the end user, and then transfers the formed information to the application programs 3131, 3132, . . . , 313p. The application programs 3131, 3132, . . . , 313p transfers the received information from the input/output management unit 315 to the end user. Now in a series of the above-explained processes, the service managing unit 312 selects the condition of the information to be indicated to the application programs 3131, 3132, . . . , 313p based on the above-explained quality, condition, and discriminating information. Also, the service management unit 312 selects a sort and a total number of information providing computers 21, 22, . . . , 2n to be connected. Otherwise, the service management unit 312 changes the priority degrees of these processes.

Further, upon completion of providing of the information, the service management unit 312 stores the service utilization historical information of the end user into a table within the service management unit 312. This historical information is utilized as one of the discriminating information in the subsequent service providing operations to the end user.

Now, tables contained in the service management unit 312 will now be briefly explained. It should be noted that the same explanations about the tables with the same reference numerals shown in FIG. 2 in the first embodiment may be applied to the tables of this embodiment, and therefore detailed descriptions thereof are omitted as to the concrete structures of the respective tables.

The quality table 41 stores values of qualities of requests with respect to tach of the users, which correspond to attributes of services and degrees of services requested by the users. The execution management unit 30 request the quality management unit 31 to store the quality of the request into the quality table 41 upon receipt of the requests issued from the input/output management unit 315. The quality management unit 31 stores the value of the quality of the request into the quality table 41. This value is evaluated by the quality management unit 31 and the composite element conversion unit 40, and then the above-described priority degree of the process is determined.

The condition table 42 stores the items which do not depend on the end users with respect to each of these and users among the items determined at the time instant when the requests from the input/output management unit 315 are requested. Upon receipt of the requests issued from the input/output management unit 315, the execution management unit 30 request the condition management unit 32 to store the present date and the present time instant into the condition table 42. In case of the log-in request, the condition management unit 32 causes the condition table 42 to store the log-in time instant. In case of the service request, the condition management unit 32 causes the condition table 42 to store the service request time instant.

The static discriminating information table 43 stores either fixed information or semi-fixed information, which depend upon the end user and the information acquiring computer 31, and also the communication. As the information related to the end user, there are a member level, a sex, an occupation, and purchase record of specific goods every end user. As the information related to the information acquiring computer 310, there are a terminal function, a hardware arrangement, and a software arrangement. As the information related to the communication, there are a communication starting place, a protocol, and so on. The variables stored in the static discriminating information table 43 are evaluated by the individual management unit 33 and the composite element conversion unit 40. As a consequence, it is possible to change the modes of information to be provided in accordance with the functions of the information acquiring computer 310. For instance, in such a case that the information acquiring computer 310 is not equipped with a memory capable of sufficiently executing a graphic representation, only text information is provided with the input/output management unit 315, and no image display is performed.

In the service utilization history table 44, the information is stored with respect to each of the users in unit of services utilized by the end users. The service utilization history table 44 owns fields named as a service sort, a utilization date/time, and detailed information. Every time the end user utilizes a certain service, the above-described information for specifying this service are stored by the individual management unit 33. In this case, a service sort is a top category of a service provided by the information acquiring computer 310. The information for specifying a concrete service content of this service sort is stored in the detailed information field. The as information stored in the service utilization history table 44 is evaluated by the individual management unit 33 and the composite element conversion unit 40.

The service utilization trend table 45 stores the statistics information related to the utilization frequencies with respect to the constructural elements of the services. The times of the variable values stored in the service utilization trend table 45 are counted by the individual management unit 33 when the user of the service is defined. The variable values stored in the service utilization trend table 45 are evaluated by the individual management unit 33 and the composite element conversion unit 40, and then, the judgement is carried out based upon a simple large/small relationship, and further based on more complex logic.

The system utilization history table 46 stores historical information of system utilizations equal to historical information, as viewed from the side other than the service. There are all connection times (log-in times), charging conditions, and credit utilization conditions. This variable values stored in the system utilization history table 46 are evaluated by the individual management unit 33 and the composite element conversion unit 40.

The application programs relationship program 47 expresses relationships among execution sequences and branches of the application programs 3131, 3132, . . . , 313p. The service management unit 312 determines the application programs 3131, 3132, . . . , 313p which will be subsequently executed with reference to this diagram.

The selection variable temporal storage table 48 temporarily stores a value of a variable every time the end user agrees with this variable value proposed by the application program to this end user, namely, since the value of the variable agreed or selected by the end user can be grasped from the application code of the request inputted from the input/output management unit 315, the selection item code, and the selection code.

The request conversion management table 49 is used in such a case that when an information acquiring request is issued from the application programs 3131, 3132, . . . , 313p to the service management unit 312, a decision is made as to whether or not the information acquiring request is transmitted to any one of the information providing computers 21, 22, . . . , 2n. The request conversion management table 49 stores the request codes indicative of the sorts of the request issued from the application programs 3131, 3132, . . . , 313p, and also the names of the information providing computers 21, 22, 2n to be connected with respect to each of the user IDs.

The information acquiring request record table 50 is used to store the names of the information providing computers 21, 22, . . . , 2n when the service management unit 312 transmits the information acquiring request to the information providing computers 21, 22, . . . , 2n. To time-out time, time up to time-out is set. This time is monitored by a timer 8. When it becomes time-out time, the service management unit 312 produces a time-out event. Every time a response to the information acquiring request is received from the information providing computers 21, 22, . . . , 2n, the service management unit 312 deletes the name of the relevant information providing computers 21, 22, . . . , 2n of the information acquiring request record table 50.

The information providing computer management table 51 stores a name of an information providing computer, an address of a server thereof, communication protocol, and transmission/reception formats.

The reception data temporal storage table 52 is a table for temporarily storing responses issued from the information providing computers 21, 22, . . . , 2n. Since the content of the response data is different from each other, depending on the request code, the format of the reception data temporal storage table 52 is also different from each other with respect to each of the request codes.

The acquired information integration management table 53 provides selection logic when the response data stored in the reception data temporal storage table 52 is selected and then is transferred to the application programs 3131, 3132, . . . , 313p. In the acquired information integration management table 53, the logic employed for the respective end users in response to the request codes is stored. These conditions are set to each of the users based on the quality of the request from the end user, the condition during request issuing, and the discriminating information.

Figure 58:
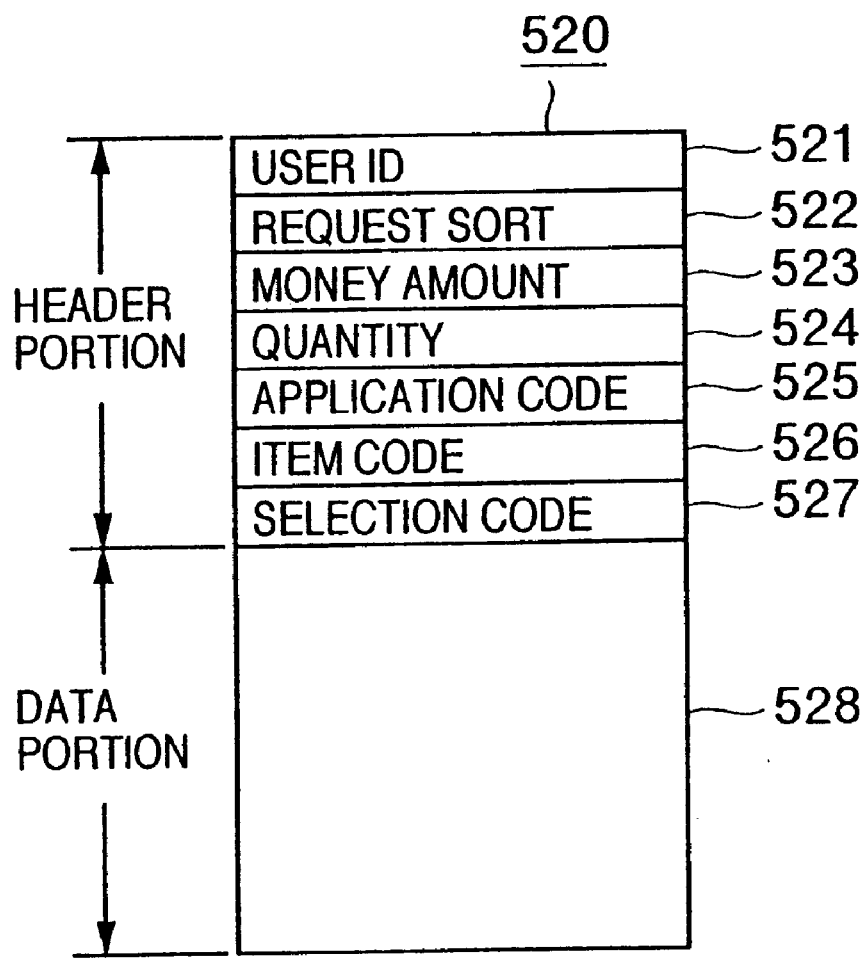
FIG. 58 is a format diagram for a message transmitted from an input/output management unit to a service management unit.

FIG. 58 represents a format of a message transmitted to the service management unit 312 when the end user enters the request from the input/output management unit 35. The message 520 contains a header portion and a date portion 528. The header portion contains a user ID 521 of an end user who uses the information acquiring computer 310, a request sort 522 indicative of a sort of a request by an end user, an amount of money 523 for representing a money amount of the request by the end user, and a quantity 524 for indicating a quantity of the request by the end user. This header portion further includes an application code 525 corresponding to a code for specifying an application program which sent the message to this information acquiring computer 310 in the previous time, an item code 526 corresponding to a code for specifying a value of a variable selected by the end user, and also a selection code 527 corresponding to a code for indicating as to whether or not the end user has agreed the proposals of the application programs 3131, 3132, . . . , 313p. The data portion 528 corresponds to the content of the message. The content of the data portion 528 depends upon the application programs 3131, 3132, . . . , 313p.

Figure 59:
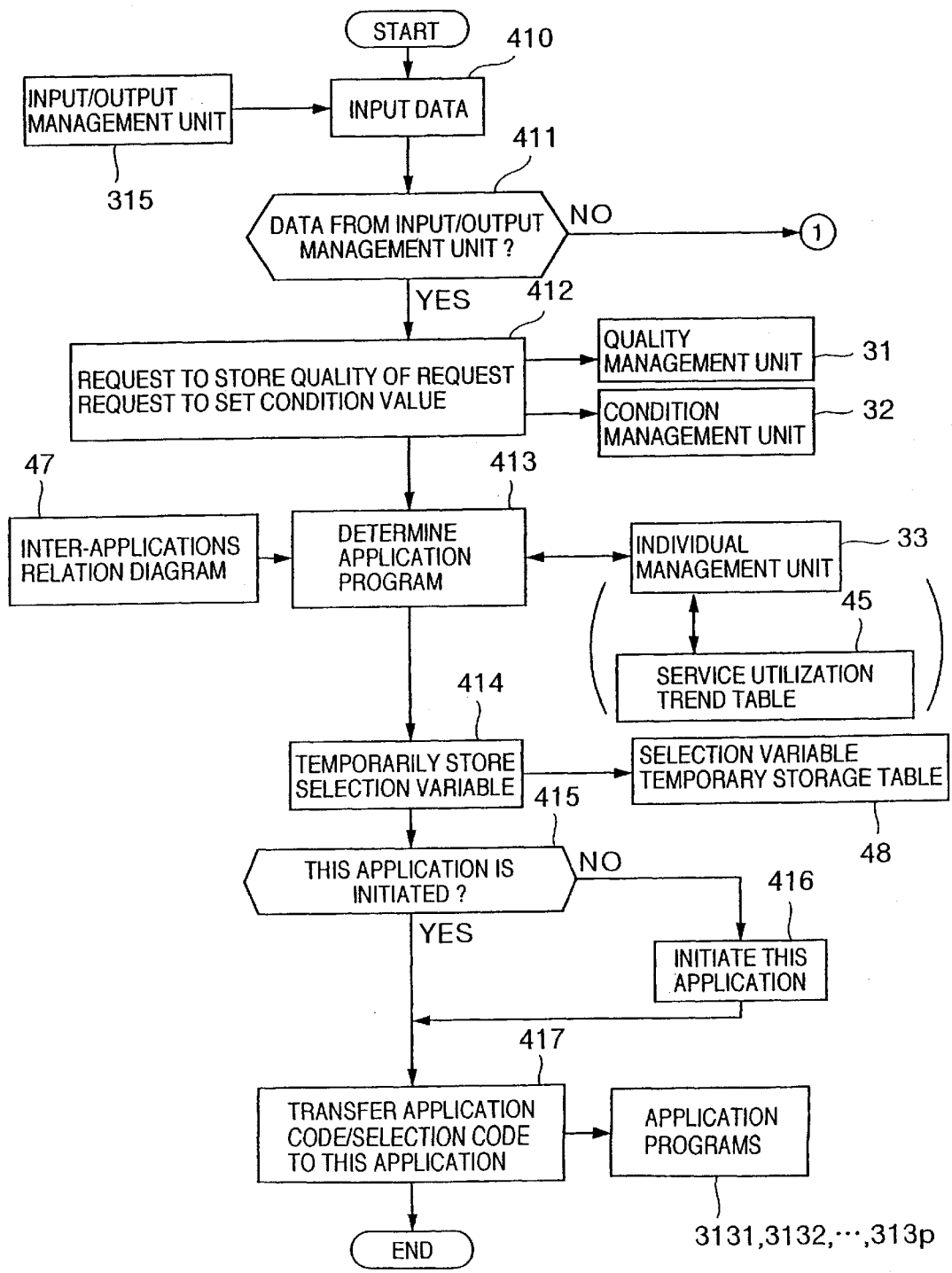
FIG. 59 is a process flow chart for describing operations when the message from the input/output management unit is received in the execution management unit.

FIG. 59 is a flow chart for describing operations executed when the execution management unit 30 receives the request user of the end user from the input/output management unit 315. The operations of the execution management unit 30 include the following processes (1) to (8):

(1). A message is received from the input/output management unit 315 (step 410).

(2). In a step 410, a judgement is made as to whether or not the received message corresponds to the message from the input/output management unit 315 (step 411). If the message is transmitted from the input/output management unit 315, the process operation is advanced to a step 412. If No, then this message corresponds to another message from the information providing computers 21, 22, . . . , 2n. Accordingly, the process operation is advanced to a process flow executed when the message from the information providing computers 21, 22, . . . , 2n is received (will be discussed later).

(3). The application code 525, the item code 526, and the selection code 527 are derived from the received message, and are transferred to the quality management unit 31 so as to be stored in the quality table 41. The request sort 522, the money amount 523, and the total number 524 are transferred to the condition management unit 32, and then are stored in the condition table 42 (step 412).

(4). Referring to the application programs relationship diagram 47, an application program which should be subsequently executed is determined based on the application code 525 (step 413). Now, when the selection code 527 is "No", this implies that the previous proposal of the application program is refused by the end user. Therefore, the same application program as in the previous case is again initiated. In the case that there is a plurality of executable application programs, a calculation is made based upon the values of the variables and the logic determined by the confidence degree of recommendation in the individual management unit 33. The variable values are used to recommend the application programs in the higher priority order, which is previously determined in the individual management unit 33. If this confidence degree does not exceed a predetermined threshold value in the individual management unit 33, then a similar process operation is carried out for the application program with the subsequent priority degree. If the confidence degree does not exceed any of the application programs, then a decision is made that the application program having the highest priority degree is initiated. The simplest logic among the logic employed in this case is such that the variable value with the largest time among the variable values stored in the service utilization trend table 45 is recommended, and the confidence degree thereof is a ratio of all counts.

(5). The values of variables agreed by the end user are stored into the selection variable temporal storage table 48 (step 414).

(6). Next, a check is done as to whether or not the application program to be executed which is determined at the step 413 has already been initiated (step 415). If the application program to be executed has already been initiated, then the process operation is advanced to a step 417. If the application program to be executed has not yet been initiated, then the process operation is advanced to a step 416.

(7). The application program determined at the step 413 is initiated (step 416).

(8). The selection code is transferred to the application program (step 417).

Figure 60:
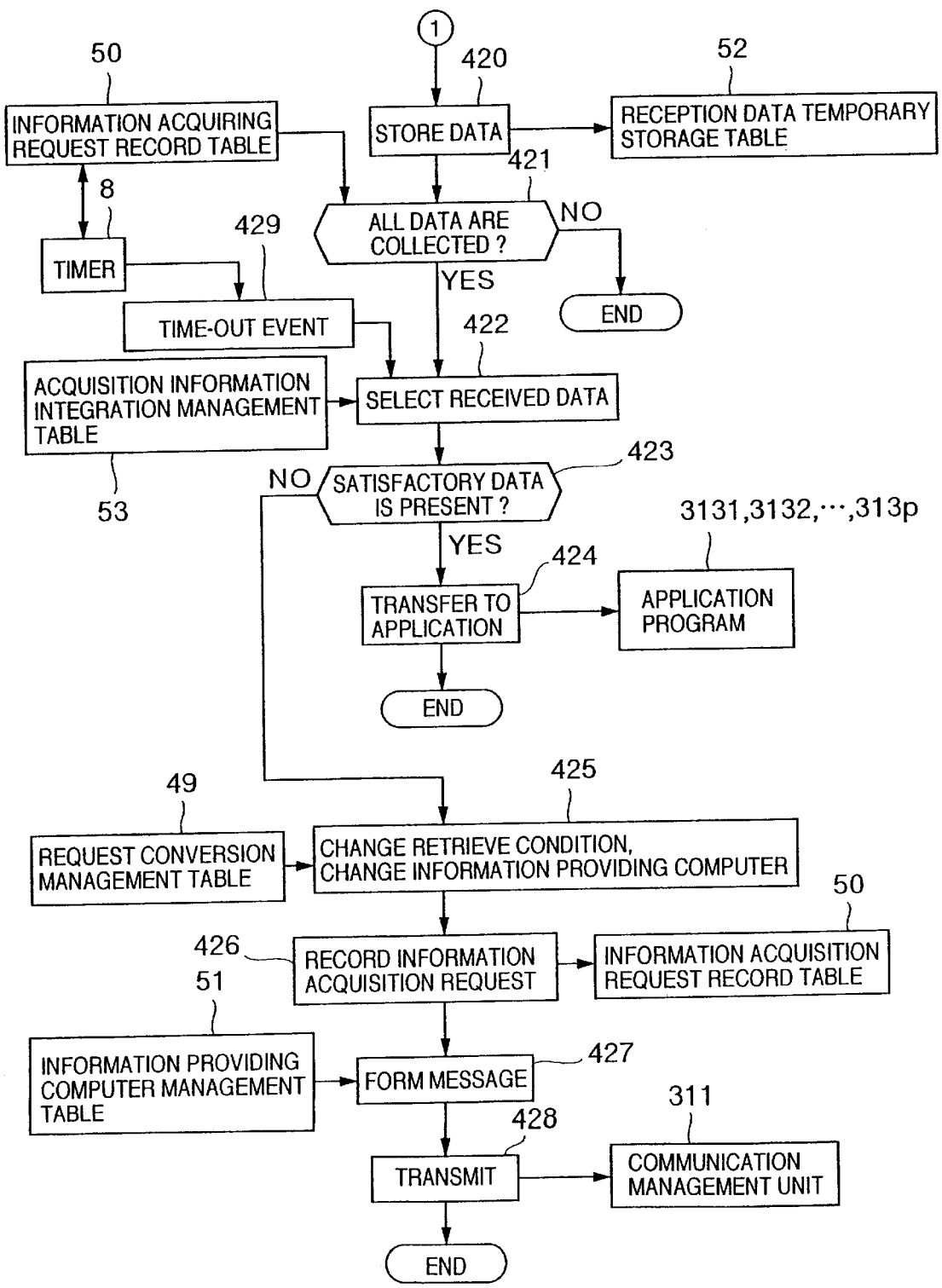
FIG. 60 is a process flow chart for describing operations when the message from the information providing computer is received in the execution management unit.

FIG. 60 is a flow chart for representing a process flow operation when the execution management unit 30 receives the message from the information providing computers 21, 22, . . . , 2n. The operations of the execution management unit 30 contain the following processes (9) to (17):

(9). The reception data is stored in the reception data temporal storage table 52 (step 420).

(10). Referring to the information acquiring request record table 50, a confirmation is made as to whether or not all responses of the information acquiring requests have been returned (step 421). If there is a message which has not yet been returned, then the process operation is accomplished. When all responses of the information acquiring requests have been returned, the process operation is advanced to a step 422.

(11). Process 422: Referring to the acquisition information integration management table 53, the selection rules for the respective uses are applied, so that one of the reception data is selected (step 422). On the other hand, the time-out time for the respective requests, stored in the information acquisition request record table 50 is monitored by the time 8. When it becomes the time-out time, the timer 8 produce a time-out event 429. The process at the step 422 is also initiated by the time-out event 429. As a consequence, even when all of the information acquisition requests are not returned, when it becomes the time-out time, the selection is made of only the received data.

(12). A check is made as to whether or not the information satisfied by the application program is obtained by the selection at the step 422 (step 423). If Yes, then the process operation is advanced to a step 424. If such information is not obtained, then the process operation is advanced to a step 425.

(13). The information selected at step 422 is transferred to the application program, and the process operation is ended (step 424).

(14). When the satisfactory data could not be obtained at step 423, referring to the request conversion management table 49, the information providing computer is changed into another computer (step 425). For instance, the information providing computer is changed into all of the information providing computers which have been registered as "all" in the request conversion management table 49. Otherwise, the preceding retrieve condition is changed by the fixed logic.

(15). The determined information of the information providing computer is recorded on an information acquiring request recording table 50 (step 426).

(16). Referring to an information providing computer management table 51, a message is formed in accordance with the transmission format with respect to the respective information providing computers for requesting the information acquisition. It is set in such a manner that the message is transmitted to a correct address in a correct protocol (step 4279.

(17). A transmission of the message formed at the step 427 is requested to the communication management unit 311 (step 428).

Figure 61:
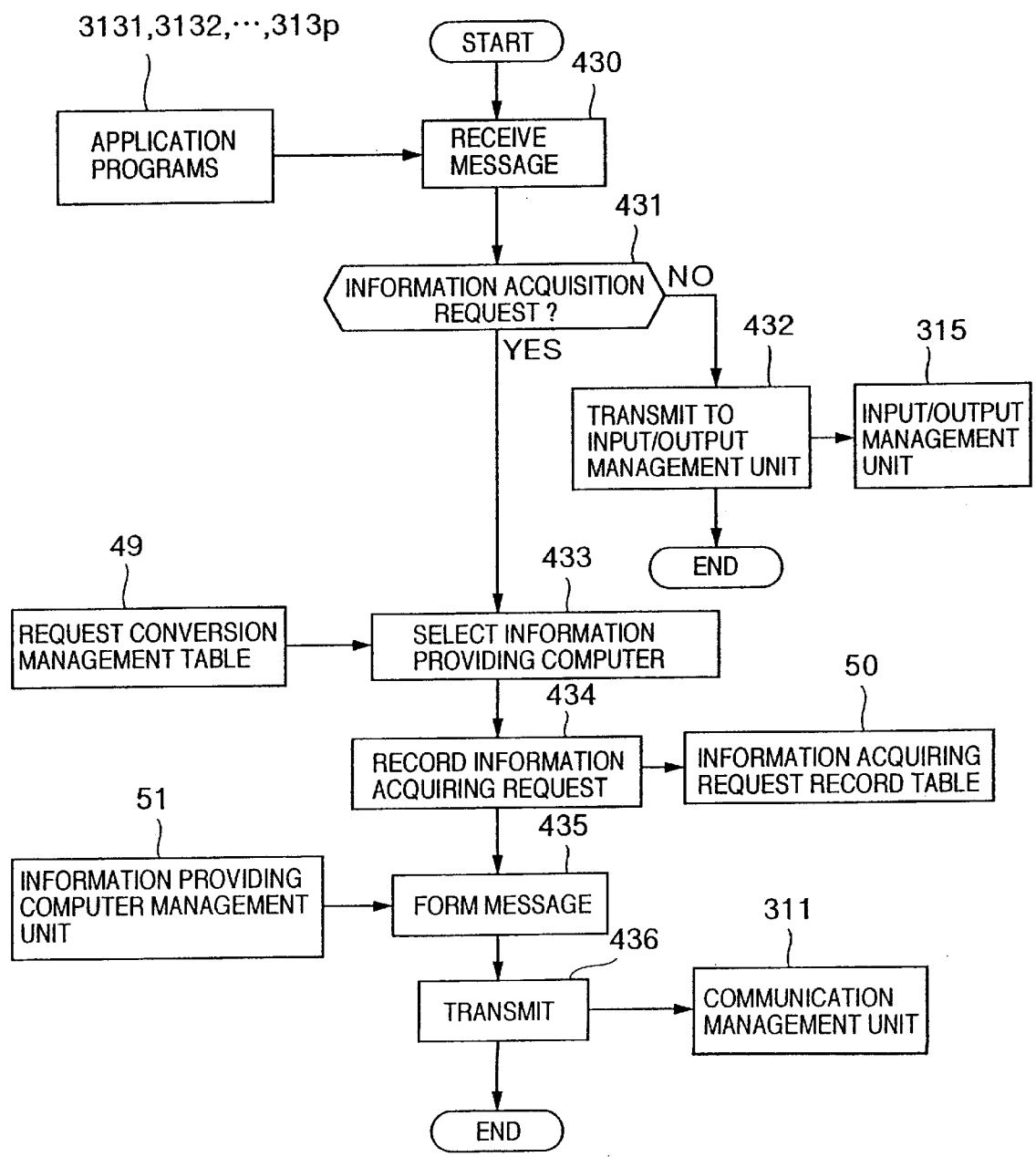
FIG. 61 is a process flow chart for describing operations when the message from the application program is received in the execution management unit.

FIG. 61 is a flow chart for showing a process flow operation executed when the execution management unit 30 receives the messages from the application programs 3131, 3132, . . . , 313p. In this case, the operations of the execution management unit 30 contain the following process operations (1) to (7):

(1). A message is received from the application programs 3135, 3132, . . . , 313p (step 430).

(2). If the received message is the information acquiring request, then the process operation is advanced to a step 433. If the received message is not the information acquiring request, then since this message is a message to be transmitted to the input/output management unit 315, the process operation is advanced to a step 432 (step 431).

(3). To the input/output management unit 315, the received message is transmitted and then this process operation is ended (step 432).

(4). Referring to the request conversion management table 49, a selection is made of an information providing computer to which the information acquisition is requested (step 433).

(5). The information selected at the step 433 of the information providing computer is recorded on the information acquiring request recording table 50 (step 434).

(6). Referring to an information providing computer management table 51, a message is formed in accordance with a transmission format with respect to each of the information providing computers for requesting the information acquisition. At this time, it is set to transmit the message at a correct address in a correct protocol (step 435).

(7). A transmission of the message formed at the step 435 is requested for the communication management unit 311 (step 436).

With respect to the process operations executed by the individual management unit 33, the condition management unit 32, the quality management unit 31, the history analysis unit 34, and the composite element converting unit 40 in this embodiment, since these process operations are similar to those of the functional units (indicated by same reference numerals in FIG. 2) equipped in the service providing computer, no further explanations thereof are made in this embodiment.

Next, a description will now be made of functions owned by the service management unit 312 in this embodiment.

The service management unit 312 stores the information received from the information providing computers 21, 22, . . . , 2n into a cache region 58 together with the attribute information required to specify this information, and manages this information. In the case that the information acquiring request is issued from the application program, if the attribute of this information is made coincident with the attribute of the information stored in the cache region 58, the service management unit 312 does not issue the information acquiring request to the information providing computers, but derives the information corresponding thereto from the cache region 58. As a result, both the time required to acquire the information, and the loads given to the network and the information providing computers can be greatly reduced. When the valid term of the owned information expires, the information of the cache region 58 is erased by the service management unit 312. Also, this information is overwritten by newly stored information in the cache region 58.

Furthermore, the service management unit 312 owns a journal file 59 for recording transactions related to the input/output with the end users, the communications with the information providing computers, and the service executions. Concretely speaking, a service evaluation management unit 60 forms, retrieves, and analyzes the journal file 59. When an error happens to occur, or the information acquiring computer is brought into power down, the service evaluation management unit 60 cancels the transactions, executes the transaction in a half way, or notifies the result to the information acquiring computer after executing the possible process. The architecture unit 314 corresponds to a developing tool for initializing the respective tables used by the service management unit 311 when the application program is formed.

Figure 62:
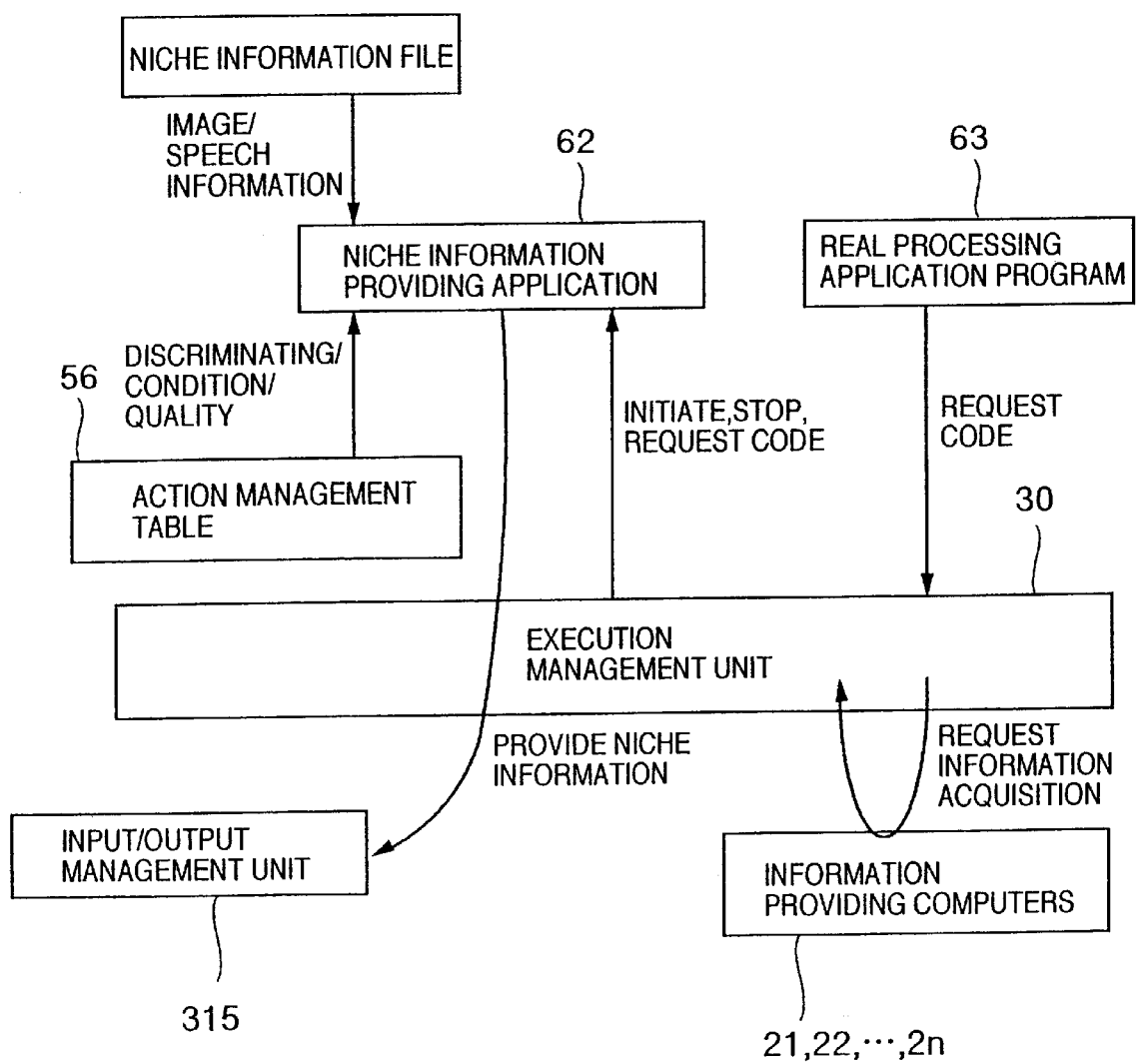
FIG. 62 is a conceptional operation diagram for explaining operations of a niche information providing application program.

FIG. 62 is a conceptional operation diagram of a niche information program and a real processing application program, which are employed as one application program contained in the application program group 313.

The real processing application program 63 is an application program used to issue the information acquiring request to the service management unit 312. The niche information providing application program 62 provides information such as a moving picture, a still picture, a speech, and a character to the input/output management unit 315 while the real processing application program 63 for providing the previously explained normal services issues the information acquiring request to the information providing computers 21, 22, . . . , 2n, and waits for a response. Upon receipt of the information acquiring request, the execution management unit 30 initiates the niche information providing application program 62. At this time both the request code and the user ID of the received information acquiring request are transferred to the niche information providing application program 62. The niche information providing application program 62 recognizes the discriminating information and the conditions of the user with reference to the action management table 56. Also, the niche information providing application program 62 recognizes the content of the information under acquisition from the request code. Then, the niche information providing application program 62 derives the information such as the moving picture, the still picture, the speech, and the character, which is most suitable to be provided with the end user, from the niche information file 61 based on these discriminating information, conditions, and service content information. Thereafter, the derived information is properly processed, and the executed managing unit 30 is required to transmit the processed information to the input/output management unit 315. When the execution management unit 30 receives response data from the information providing computer and then transfers the response data to the real processing application program 63, the niche information providing application program 62 is stopped.

As readily understood from the above-explained certain concrete embodiments, according to the present invention, the individual desirable matters and utilization histories of the end users are evaluated in correspondence with the service contents requested by the end users, and thus the services capable of satisfacting with these items can be selected to be provided to the end users. In response to the requests of the end users, it is possible to provide such services very fitted to these requests. In the case that the contents of the services provided by the information providing computers are changed and/or added, the resultant services to be provided with the users can be readily changed in accordance with the contents of the charged/added services. Also, the services to be provided with the end uses may be changed in accordance with the system environments and the qualities of the service/information. Furthermore, the workloads of the end users when the services of the plural information providing computers are integrated and received may be substituted by the information providing computers. As a result, it is possible to more effecWe

We claim:

1. A method for providing a service from a first computer to a third computer via a plurality of a second kind of computers, said method comprising the steps of:

receiving a request from said third computer in said first computer;

dividing said received request into a plurality of service requests;

selecting at least two of said plurality of second kind of computers having said plurality of service requests corresponding to said request based on a characteristic of said request, a condition during reception of said request, and service utilization history information regarding said third computer;

transmitting said plurality of service requests from said first computer to said selected at least two of said second kind of computers;

integrating information provided from said selected at least two of said second kind of computers in response to said plurality of service requests, in said first computer; and transmitting the integrated information from said first computer to said third computer;

wherein said request includes an attribute of said service corresponding to said request, and wherein said characteristic of said request includes a payment amount and a purchase quantity, and said condition during reception of said request includes operation conditions of said plurality of second kind of computers, said operation conditions include environmental conditions.

2. A service providing system for providing service from a first computer to a third computer, via a plurality of a second kind of computers, said service providing system comprising:

receiving means for receiving a request from said third computer in said first computer;

dividing means for dividing said received request into a plurality of service requests;

selecting means for selecting at least two of said second kind of computers having said plurality of service requests corresponding to said request based on a characteristic of said request, a condition during reception of said request, and service utilization history information of said third computer;

transmitting means for transmitting said plurality of service requests from said first to said selected at least two of said second kind of computers;

means for integrating information provided from said selected at least two of said second kind of computers in response to said plurality of service requests, in said first computer; and means for transmitting the integrated information from said first computer to said third computer;

wherein said request includes an attribute of said service corresponding to said request, and wherein said characteristic of said request includes a payment amount and a purchase quantity, and said condition during reception of said request includes operation conditions for said plurality of second kind of computers, said operation conditions include environmental conditions.

3. A service providing system according to claim 2, further comprising sending means for sending integrated information, sent by said selected at least two of said second kind of computers, from said first computer to said third computer.

4. A service providing system, comprising:

a third computer which issues a request;

a plurality of a second kind of computers each having a plurality of services; and a first computer for providing a service corresponding to said request;

wherein said first computer receives said request from said third computer; divides said received request into a plurality of service requests; selects at least two of said second kind of computers having said plurality of service requests corresponding to said request based on a characteristic of said request, a condition during reception of said request, and service utilization history information regarding said first computer; transmits said request from said third computer to said selected at least two of said second kind of computers;

wherein said first computer integrates information provided from said selected at least two of said second kind of computers in response to said service requests, and transmits the integrated information to said third computer;

wherein said request includes an attribute of said service corresponding to said request; and wherein said characteristic of said request includes a payment amount and a purchase quantity and said condition during reception of said request includes operation conditions of said plurality of second kind of computers, said operation conditions include environmental conditions.

* * * * *